United States Patent
Lee et al.

(10) Patent No.: US 11,470,619 B2
(45) Date of Patent: Oct. 11, 2022

(54) COVERAGE ENHANCEMENTS OF LOW COST MTC DEVICES IN UPLINK/DOWNLINK DECOUPLED SCENARIO

(71) Applicant: INTERDIGITAL PATENT HOLDINGS, INC., Wilmington, DE (US)

(72) Inventors: Moon-il Lee, Melville, NY (US); Janet A. Stern-Berkowitz, Little Neck, NY (US); J. Patrick Tooher, Montreal (CA); Nobuyuki Tamaki, Melville, NY (US); Pouriya Sadeghi, San Diego, CA (US); Virgil Comsa, Montreal (CA); Samian Kaur, Plymouth Meeting, PA (US); Stephen E. Terry, Northport, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 14/910,434

(22) PCT Filed: Aug. 7, 2014

(86) PCT No.: PCT/US2014/050211
§ 371 (c)(1),
(2) Date: Feb. 5, 2016

(87) PCT Pub. No.: WO2015/021318
PCT Pub. Date: Feb. 12, 2015

(65) Prior Publication Data
US 2016/0192376 A1 Jun. 30, 2016

Related U.S. Application Data

(60) Provisional application No. 62/021,207, filed on Jul. 6, 2014, provisional application No. 61/863,328, filed on Aug. 7, 2013.

(51) Int. Cl.
*H04W 24/08* (2009.01)
*H04W 72/08* (2009.01)
(Continued)

(52) U.S. Cl.
CPC ......... *H04W 72/085* (2013.01); *H04W 24/08* (2013.01); *H04W 48/20* (2013.01); *H04W 72/0406* (2013.01)

(58) Field of Classification Search
CPC . H04W 24/08; H04W 48/20; H04W 72/0406; H04W 72/085
See application file for complete search history.

(56) References Cited

U.S. PATENT DOCUMENTS 9,060,351 B2  6/2015  Verma et al.
2008/0212467 A1*  9/2008  Hsieh .................... H04L 1/1812
                                                             370/229
(Continued)

FOREIGN PATENT DOCUMENTS

CN  103179681 A  6/2013
EP  2608607 A2  6/2013
(Continued)

OTHER PUBLICATIONS

3rd Generation Partnership Project (3GPP), TS 36.211 V10.5.0, "Technical Specification Group Radio Access Network, Evolved Universal Terrestrial Radio Access (E-UTRA), Physical Channels and Modulation (Release 10)", Jun. 2012, pp. 1-101.

(Continued)

*Primary Examiner* — Khaled M Kassim
*Assistant Examiner* — Zhaohui Yang
(74) *Attorney, Agent, or Firm* — Condo Roccia Koptiw LLP

(57) ABSTRACT

Systems, methods, and instrumentalities are disclosed to describe cell selection in low cost machine type communi- (Continued)

cation (LC-MTC) devices. An LTC-MC device may measure a plurality of downlink signals from a plurality of cells. The LTC-MC may detect a channel condition, e.g., by determining a cell with better uplink coverage than a downlink cell. The detection of the channel condition may include measuring an uplink pathloss. The LTC-MC may report the channel condition as a decoupled channel condition, e.g., when an uplink cell is identified with uplink coverage better than the downlink cell. The channel condition may be reported, e.g., via a set of Physical Random Access Channel (PRACH) preambles. The set of PRACH preambles may be predefined. The channel condition may be reported via a higher layer signaling.

21 Claims, 13 Drawing Sheets

(51) Int. Cl.
*H04W 48/20* (2009.01)
*H04W 72/04* (2009.01)

(56) References Cited

U.S. PATENT DOCUMENTS

| | | | | |
|---|---|---|---|---|
| 2013/0039195 A1* | 2/2013 | Weng | H04W 48/20 | 370/252 |
| 2013/0083759 A1* | 4/2013 | Rong | H04W 48/20 | 370/329 |
| 2013/0322308 A1* | 12/2013 | Yu | H04W 16/14 | 370/280 |
| 2014/0177601 A1* | 6/2014 | Nishio | H04W 72/02 | 370/332 |
| 2014/0213316 A1* | 7/2014 | Liu | H04W 52/10 | 455/522 |
| 2014/0241272 A1* | 8/2014 | Griot | H04W 74/0833 | 370/329 |
| 2014/0349582 A1* | 11/2014 | Xiao | H04W 64/00 | 455/67.11 |
| 2014/0355568 A1* | 12/2014 | Gunnarsson | H04W 72/085 | 370/331 |
| 2015/0036663 A1* | 2/2015 | Kilpatrick, II | H04W 36/245 | 370/332 |
| 2015/0055521 A1* | 2/2015 | Seo | H04L 5/001 | 370/280 |
| 2015/0304088 A1* | 10/2015 | Seo | H04L 5/0055 | 370/277 |
| 2016/0029265 A1* | 1/2016 | Li | H04W 36/0061 | 455/436 |
| 2016/0105818 A1* | 4/2016 | Lu | H04W 24/10 | 370/229 |
| 2016/0112946 A1* | 4/2016 | Yi | H04W 48/20 | 370/280 |

FOREIGN PATENT DOCUMENTS

| | | |
|---|---|---|
| EP | 2667652 A1 | 11/2013 |
| WO | WO 2012/110006 A1 | 8/2012 |
| WO | 2012/177207 A1 | 12/2012 |
| WO | WO 2013/109172 A1 | 7/2013 |

OTHER PUBLICATIONS

3rd Generation Partnership Project (3GPP), TS 36.212 V10.5.0, "Technical Specification Group Radio Access Network, Evolved Universal Terrestrial Radio Access (E-UTRA), Multiplexing and channel Coding (Release 10)", Mar. 2012, pp. 1-79.

3rd Generation Partnership Project (3GPP), TS 36.213 V10.5.0, "Technical Specification Group Radio Access Network, Evolved Universal Terrestrial Radio Access (E-UTRA), Physical Layer Procedures (Release 10)", Mar. 2012, pp. 1-125.

3rd Generation Partnership Project (3GPP), R1-131401, "Enhancement to Small Cells for MTC", Qualcomm Incorporated, TSG-RAN WG1 #72bis, Chicago, USA, Apr. 15-19, 2013, 6 pages.

3rd Generation Partnership Project (3GPP), R1-132704, "TP for Section 7.1.2 and 7.1.3 on Potential Solutions in 7.1 Solutions for Co-Channel Scenarios", Qualcomm, TSG RAN WG1 Meeting #73, Fukuoka, Japan, May 20-24, 2013, 11pp.

3rd Generation Partnership Project (3GPP), TS 36.331 V10.5.0, "Technical Specification Group Radio Access Network, Evolved Universal Terrestrial Radio Access (E-UTRA), Radio Resource Control (RRC); Protocol specification (Release 10)", Mar. 2012, pp. 1-302.

3rd Generation Partnership Project (3GPP), TS 36.321 V10.5.0, "Technical Specification Group Radio Access Network, Evolved Universal Terrestrial Radio Access (E-UTRA), Medium Access Control (MAC) protocol specification (Release 10)", Mar. 2012, pp. 1-54.

* cited by examiner

ABSTRACT

COVERAGE ENHANCEMENTS OF LOW COST MTC DEVICES IN UPLINK/DOWNLINK DECOUPLED SCENARIO

CROSS-REFERENCE TO RELATED APPLICATIONS

This application is the National Stage entry under 35 U.S.C. § 371 of Patent Cooperation Treaty Application PCT/US2014/050211, filed Aug. 7, 2014, which claims the benefit of U.S. Provisional Application No. 61/863,328, filed Aug. 7, 2013, and U.S. Provisional Application No. 62/021,207, filed Jul. 6, 2014, the disclosures of which are hereby incorporated herein by reference in their entirety.

BACKGROUND

Low cost machine type communication (LC-MTC) devices may enable machines to communicate with each other or with humans. Examples of LC-MTC devices may include smart meters, home automation devices, consumer products, etc. One or more LC-MTC devices may communicate with MTC servers over mobile networks using a Third Generation Partnership Project (3GPP) network. Due to various reasons, compared to regular 3GPP devices (e.g., Long Term Evolution (LTE) devices), LC-MTC devices may suffer higher received Signal to Interference Noise Ratio (SINR) losses. Mechanisms for communicating provided for connecting the regular devices may not be adequate for the LC-MTC devices.

SUMMARY

Systems, methods, and instrumentalities are disclosed to describe cell selection in low cost machine type communication (LC-MTC) devices. An LTC-MC device may measure a plurality of downlink signals from a plurality of cells. The LTC-MC may detect a channel condition, e.g., by determining a cell with better uplink coverage than a downlink cell. The detection of the channel condition may include measuring an uplink pathloss.

The LTC-MC may report the channel condition as a decoupled channel condition, e.g., when an uplink cell is identified with uplink coverage better than the downlink cell. The channel condition may be reported, e.g., via a set of Physical Random Access Channel (PRACH) preambles. The set of PRACH preambles may be predefined. The channel condition may be reported, e.g., via a higher layer signaling (e.g., Radio Resource Control (RRC)).

A wireless transmit/receive unit (WTRU) may include a processor that comprises processor-executable instructions. When the processor-executable instructions are executed, the WTRU may measure a downlink signal from a downlink cell. The WTRU may detect a channel condition at least in part by determining a cell with better uplink coverage than the downlink cell. The WTRU may communicate uplink data with a first node associated with the determined cell and may communicate downlink data with a second node associated with the downlink cell.

The channel condition may be reported as a partially decoupled channel condition when control (e.g., a Physical Downlink Control Channel (PDCCH)) associated with the uplink data is used in the first node. The channel condition may be reported as a fully decoupled channel condition when control associated with the uplink data is used in the second node. The uplink data may include a Physical Uplink Shared Channel (PUSCH), a Physical Hybrid Automatic Repeat Request Indicator Channel (PHICH), and/or a PDCCH. The downlink data may include a Physical Downlink Shared Channel (PDSCH), a Physical Uplink Control Channel (PUCCH), and/or a PDCCH. A low power node (LPN) may be discovered using a LPN list and/or a PRACH preamble. Hybrid automatic repeat request (HARQ) feedback may be sent to an LPN. The channel condition may be reported using a higher layer signaling.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
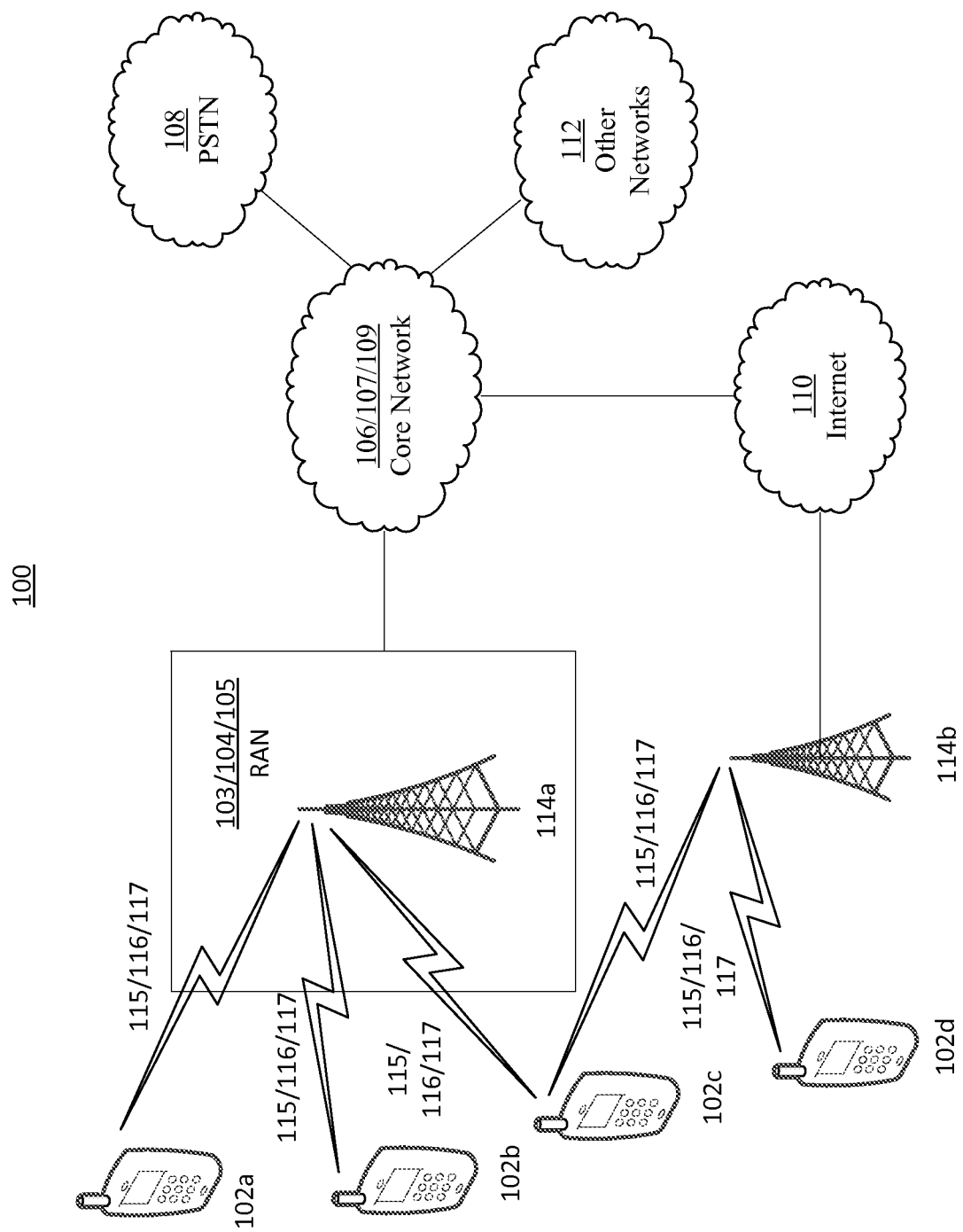
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102*a*, 102*b*, 102*c*, and/or 102*d* (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d* may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114*a* and a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the core network 106/107/109, the Internet 110, and/or the networks 112. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 103/104/105, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, e.g., one for each sector of the cell. In another embodiment, the base station 114*a* may employ multiple-input multiple output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
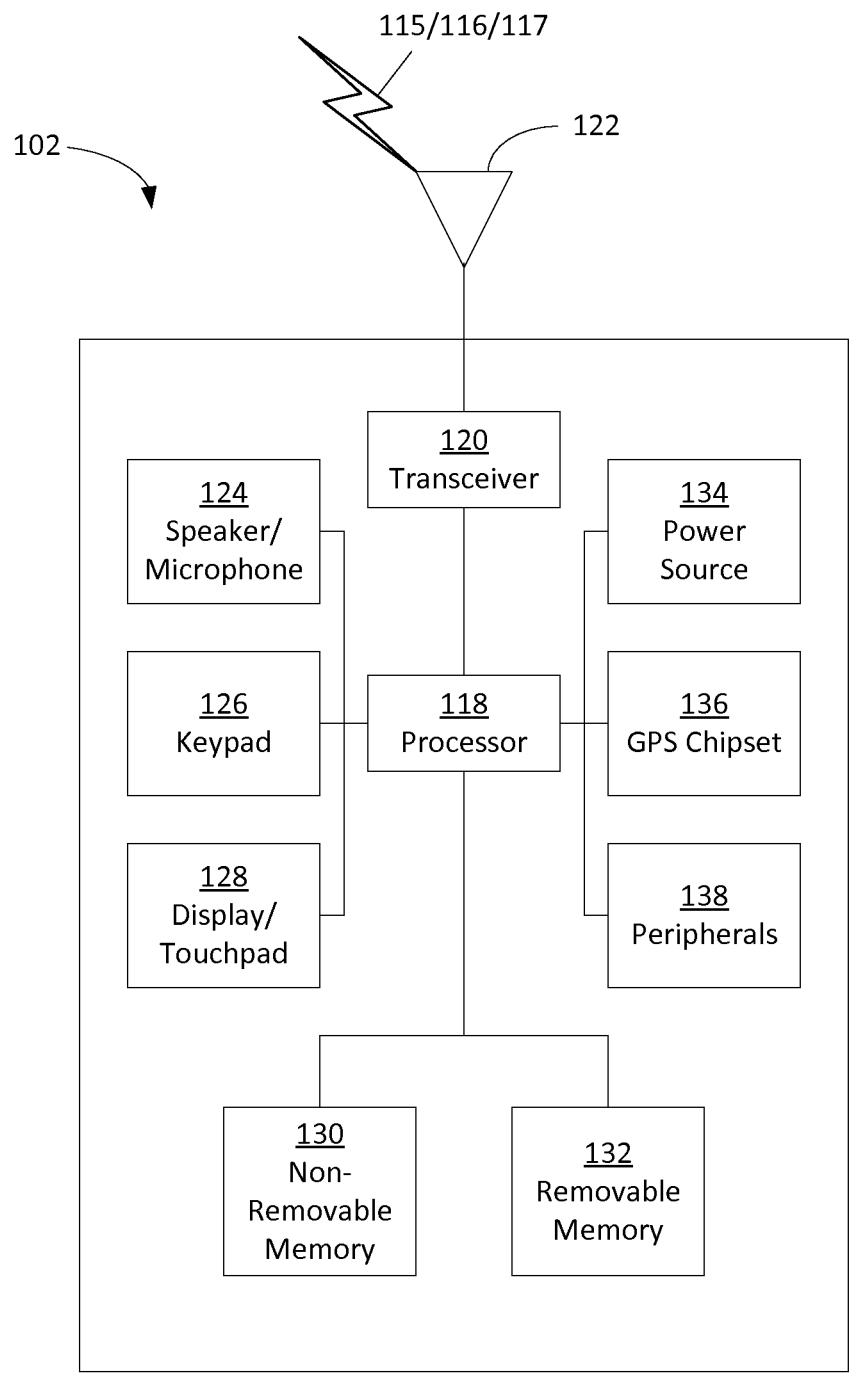
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
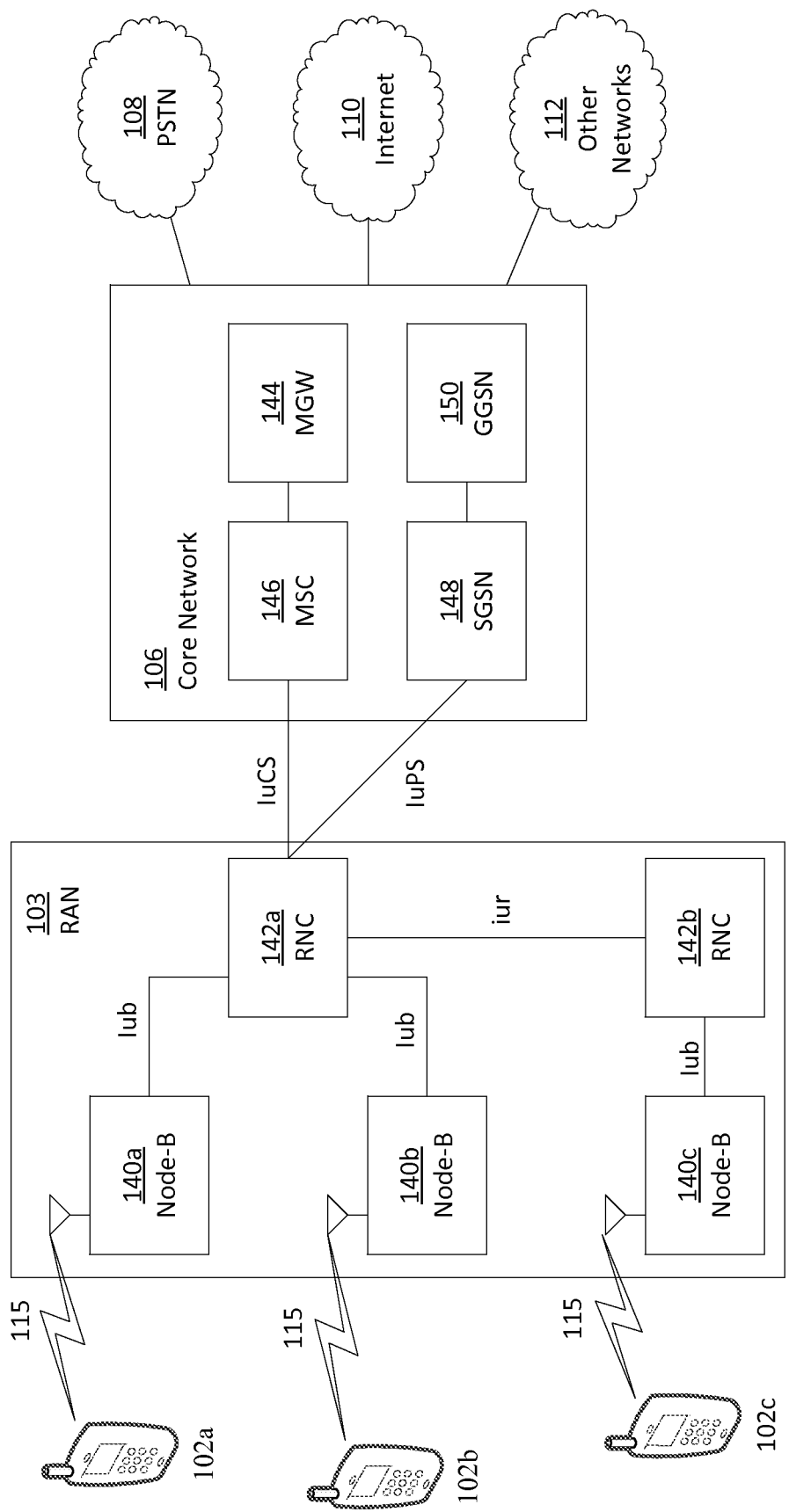
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
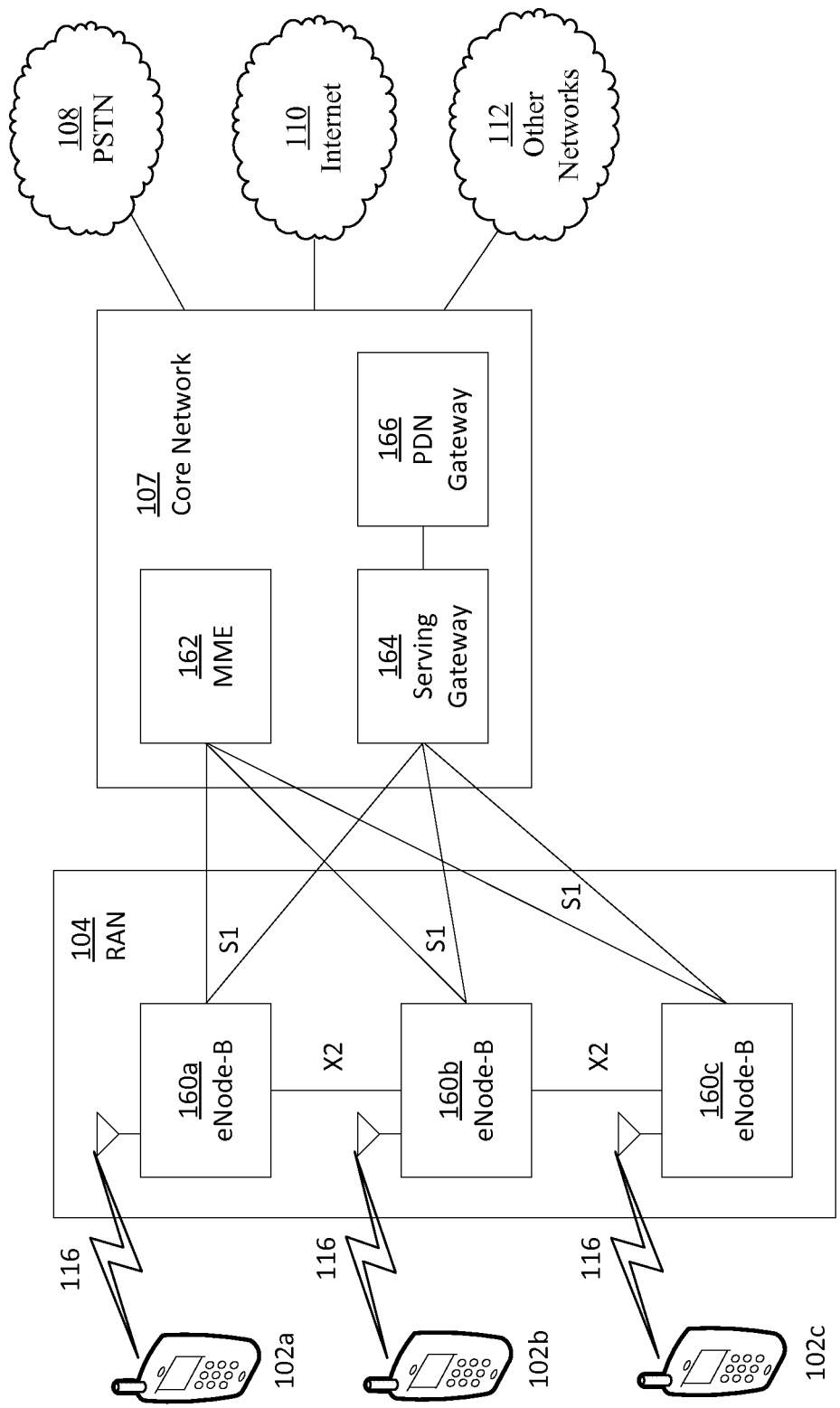
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
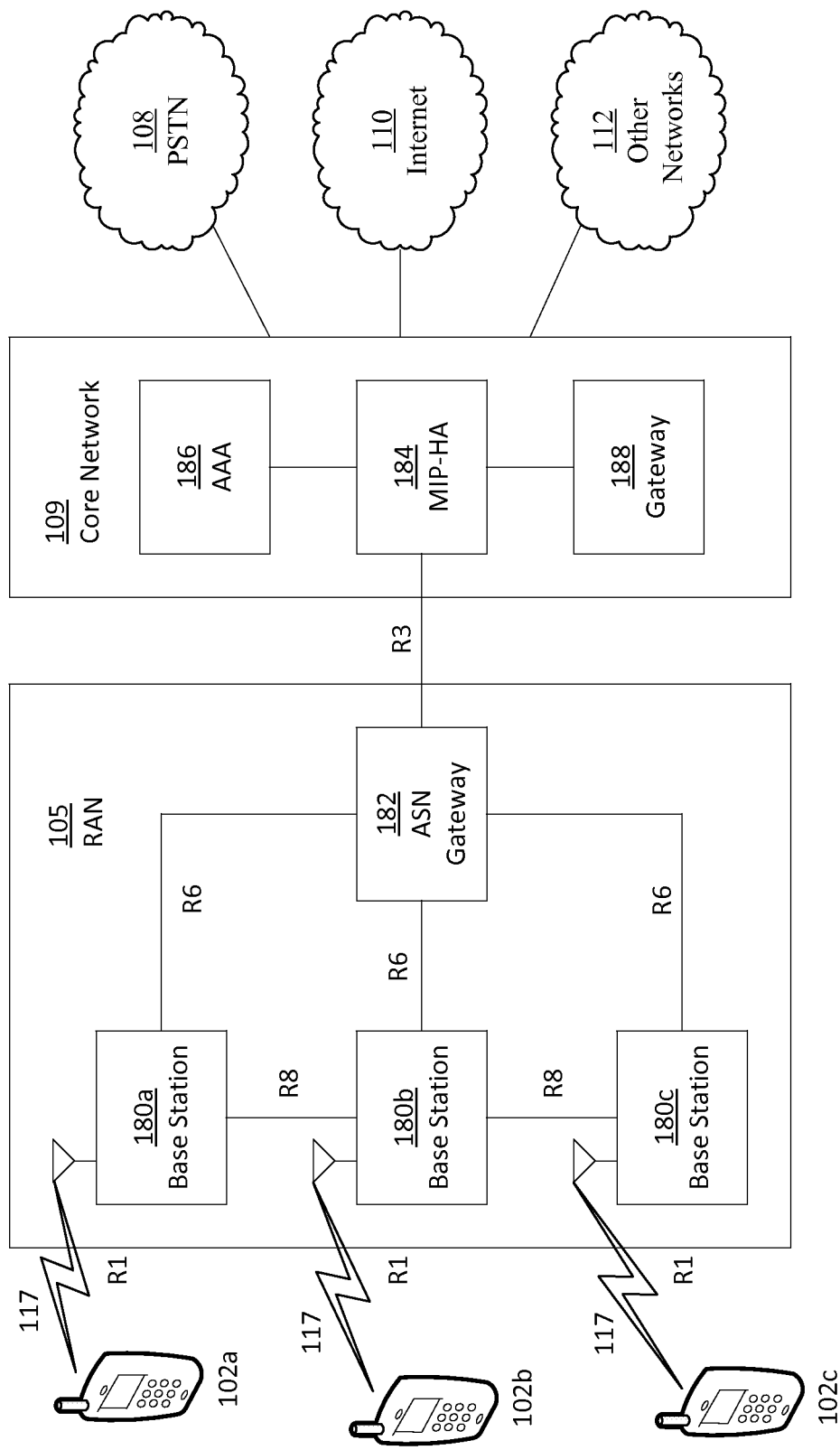
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

A low cost machine type communication (LC-MTC) device working on an LTE network (e.g., a smart meter located in a basement of a house) may assume higher received Signal to Interference Noise Ratio (SINR) losses (e.g., up to 15 dB) as compared to some other LTE devices. The throughput and/or delay criteria for the LC-MTC may also be relaxed. A device's downlink (DL) and uplink (UL) communications may be with the same cell, e.g., in a DL/UL coupled case.

Figure 2:
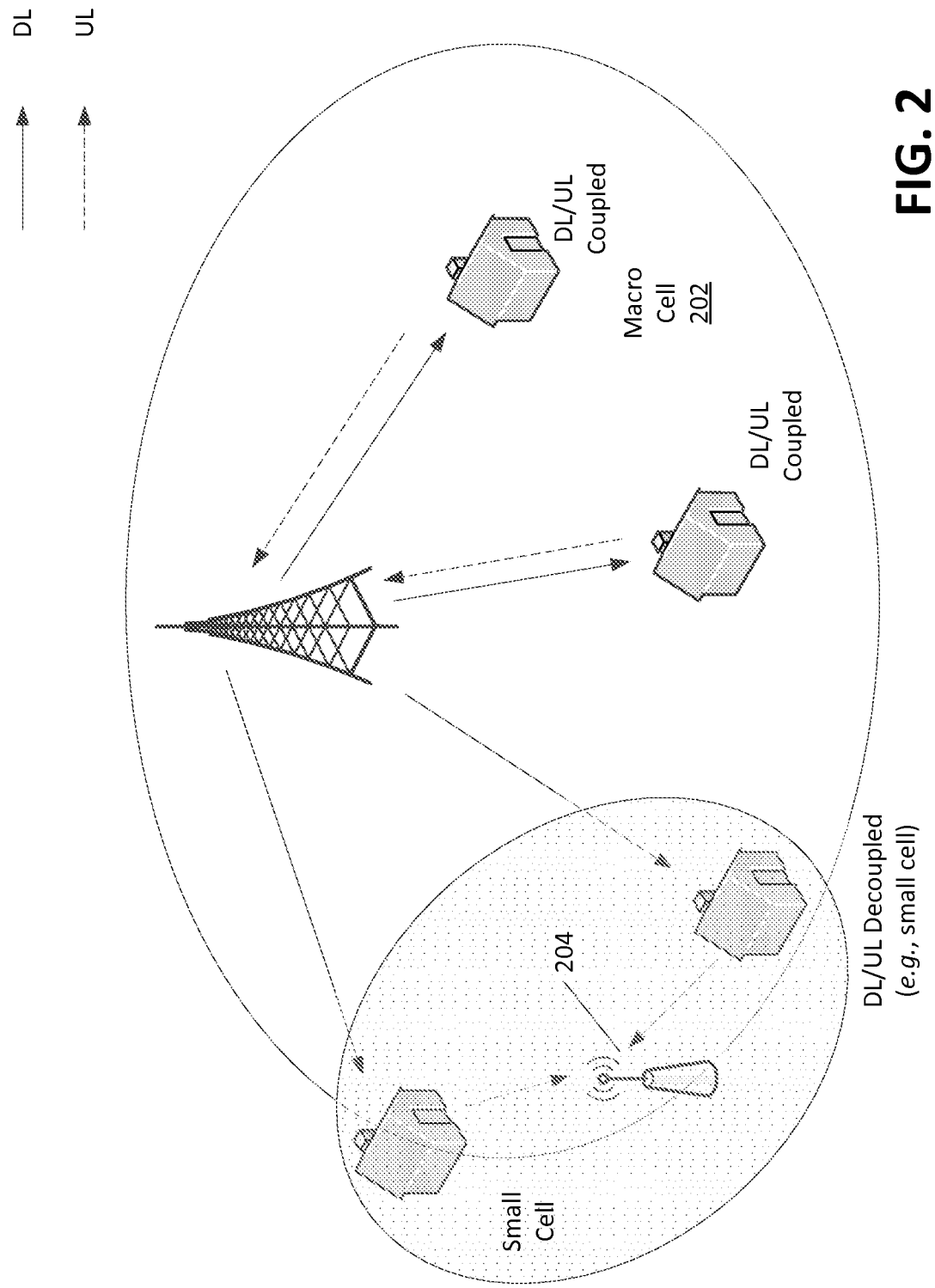
FIG. 2 is a diagram illustrating examples of DL/UL coupled and DL/UL cases for low cost machine type communication (LC-MTC).

In a heterogeneous network environment, the LC-MTC device may be located near a low power node. The LC-MTC device may be downlink/uplink (DL/UL) coupled and/or DL/UL decoupled. FIG. 2 illustrates examples of DL/UL coupled and DL/UL decoupled cases.

As illustrated in FIG. 2, in a DL/UL coupled case, an LC-MTC device may communicate with a Macro cell 202 for uplink and/or downlink. In a DL/UL decoupled case, an LC-MTC device may communicate with the Macro cell 202 for downlink while transmitting an uplink signal to a low power node (LPN) 204. The uplink signal may be transmitted to the low power node 204, e.g., because of a transmission power difference between the Macro cell 202 and the low power node 204. For example, the Macro cell 202 may transmit signals at 46 dBm, whereas the low power node 204 may transmit signals at 27 dBm. This may result in different downlink coverage. The coverage for uplink may be related to the geographical distance between the WTRU and the base station so that low power node may have better uplink coverage.

Wireless communication systems compliant with the Third Generation Partnership Project (3GPP) Long Term Evolution (LTE) may support up to 100 Mbps in the downlink (DL) and up to 50 Mbps in the uplink (UL) for a 2×2 configuration. The LTE DL scheme may be based on an Orthogonal Frequency Division Multiple Access (OFDMA) air interface. A radio frame may include ten 1 ms subframes. A subframe may include two 0.5 ms timeslots. There may be either six or seven Orthogonal Frequency Division Multiplexing (OFDM) symbols per timeslot. Seven symbols per timeslot may be used with normal cyclic prefix (CP) length, and six symbols per timeslot may be used with extended CP length. The subcarrier spacing for a particular specification may be 15 kHz. A reduced subcarrier spacing mode, for example, using 7.5 kHz may also be possible. A frame may be or refer to a radio frame.

A resource element (RE) may be associated with a subcarrier during an OFDM symbol interval. A resource block (RB) may include twelve consecutive subcarriers during a 0.5 ms timeslot. With seven symbols per timeslot, a RB may include 12×7=84 REs.

For dynamic scheduling, a subframe may include two consecutive timeslots, which may be referred to as a RB pair. Certain subcarriers on some OFDM symbols may be allocated to carry pilot or reference signals in the time-frequency grid. A number of subcarriers at the edges of the transmission bandwidth may not be transmitted in order to comply with spectral mask criteria.

Uplink channels that may be provided and/or used may include Physical UL Shared Channel (PUSCH) and/or Physical UL Control Channel (PUCCH). Control information, which may be referred to as UL Control Information (UCI), may be transmitted by a WTRU, for example in a subframe, on the PUSCH or the PUCCH, or part may be transmitted on the PUCCH and part on the PUSCH. UCI may include one or more of hybrid automatic repeat request (HARQ) ACK/NACK, scheduling request (SR), and/or Channel State Information (CSI) which may include one or more of Channel Quality Indicator (CQI), Precoding Matrix Indicator (PMI), and Rank Indicator (RI). Resources that may be allocated for PUCCH transmission may be located at or near the edges of the UL band.

Downlink channels that may be provided and/or used may include Physical Downlink Shared Channel (PDSCH) and/or downlink control channels, which may include one or more of Physical Control Format Indicator Channel (PCFICH), Physical Hybrid-ARQ Indicator Channel (PHICH), Physical Downlink Control Channel (PDCCH), and/or Enhanced PDCCH (EPDCCH).

One or more symbols, e.g., the first 1 to 3 OFDM symbol(s) in each subframe in the DL, may be occupied by one or more of PCFICH, PHICH, and PDCCH according to the overhead of the control channels, and the symbols occupied may be referred to as the DL control region. The PCFICH may be transmitted, for example, in the first OFDM symbol (e.g., symbol 0) in each subframe and/or may indicate the number of OFDM symbols used for the DL control region in the subframe. A WTRU may detect a Control Format Indicator (CFI) from a PCFICH, and the DL control region may be defined in the subframe according to the CFI value. The PCFICH may be skipped if a subframe may be defined as a non-PDSCH supportable subframe. DL symbols that are not part of a DL control region may be referred to as the data or PDSCH region. Enhanced PDCCH (EPDCCH) may be provided and/or used in the PDSCH region. The location of an EPDCCH in that region may be signaled, for example, via higher layer signaling such as Radio Resource Control (RRC) signaling, to a WTRU that may (or may be expected to) monitor, receive, or otherwise use that EPDCCH. The PDCCH and/or EPDCCH may provide control information, resource allocations (e.g., grants) for UL and/or DL transmission, and the like.

DL signals and/or channels may be provided or transmitted by an eNB and/or may be received and/or used by a WTRU. UL signals and/or channels may be provided or transmitted by a WTRU and/or may be received and/or used by an eNB.

Signals and/or channels may be associated with a cell that may correspond to a certain carrier frequency and/or geographic area. A carrier frequency may be a center frequency of a cell (e.g., the center frequency of a cell's supported bandwidth). An eNB may have one or more cells associated with it. An eNB may be or refer to a cell.

Synchronization signals, which may include a Primary Synchronization Signal (PSS) and/or a Secondary Synchronization Signal (SSS), may be provided or transmitted, for example, by an eNB or cell. A WTRU may use such signals, for example, to acquire time and/or frequency synchronization with an eNB or cell. The PSS and/or SSS may be present in subframes 0 and/or 5 and/or may be present in every radio frame. Transmission may be on 62 subcarriers at the center of a cell's bandwidth, and five subcarriers on each side of the 62 central subcarriers may be reserved or unused. For FDD, PSS transmission may be in the last OFDM symbol and SSS in the second to last (e.g., next to last) OFDM symbol of timeslot 0 (e.g., the first timeslot of subframe 0) and timeslot 10 (e.g., the first timeslot of subframe 5) of each radio frame. For TDD, PSS transmission may be in the third OFDM symbol in subframes 1 and 6 and SSS may be transmitted in the last OFDM symbol in timeslot 1 (e.g., the second timeslot of subframe 0) and timeslot 11 (e.g., the second timeslot of subframe 5) of each radio frame. The synchronization signals may convey information regarding the physical cell identity (cell ID) of the cell.

A Physical Broadcast Channel (PBCH), which may be transmitted by an eNB or cell, may carry cell information, such as a Master Information Block (MIB). The PBCH may be provided or transmitted in subframe 0 of each radio frame and may be repeated over, for example, four consecutive radio frames (e.g., 40 ms time period). The PBCH may be transmitted in the first four OFDM symbols of the second timeslot of subframe 0 and may be transmitted on the 72 center subcarriers. The MIB may provide information such as the DL bandwidth of the cell, PHICH information, and at least part of the System Frame Number (SFN), for example, the most significant 8 bits of a 10-bit SFN.

Downlink reference signals may include a Cell-specific Reference Signal (CRS), a Channel-State-Information Reference Signal (CSI-RS), and/or a DeModulation Reference Signal (DM-RS), and/or a Positioning Reference Signal (PRS). DL reference signals may be received and/or used by a WTRU. CRS may be used by a WTRU for channel estimation for coherent demodulation of a (e.g., any) downlink physical channel. Certain DL channels may include at least one of PMCH, EPDCCH, and PDSCH when configured with TM7, TM8, TM9, or TM10. A WTRU may use the CRS for channel state information measurements for the reporting of CQI, PMI, and/or RI, for example, if the WTRU is configured with a transmission mode using CRS for PDSCH demodulation. A WTRU may use the CRS for cell-selection and/or mobility-related measurements. The CRS may be received in certain subframes (e.g., any subframe), and multiple antenna ports (e.g., up to four antenna ports) may be supported. A WTRU may use DM-RS for demodulation of certain channels, which may include at least one of EPDCCH and PDSCH configured with TM7, TM8, TM9, or TM10. DM-RS may be used for the demodulation of a channel (e.g., EPDCCH or PDSCH) and may be transmitted in the resource blocks assigned to the channel (e.g., EPDCCH or PDSCH). A WTRU may use CSI-RS, which may be transmitted with a duty cycle, for channel state information measurements, for example, if the WTRU may be configured with a transmission mode, which may use DM-RS for PDSCH demodulation. The CSI-RS may also be used for cell-selection and mobility-related measurements, for example, if a WTRU may be configured with a transmission mode (e.g., TM10). A WTRU may use the PRS for position related measurements.

A WTRU may transmit uplink reference signals, including, for example, a sounding reference signal (SRS) and/or and DM-RS. The SRS may be transmitted in the last SC-FDMA symbol in a set of uplink subframes which may be configured for WTRU-specific SRS subframes, which may be a subset of cell-specific SRS subframes. The SRS may be transmitted by a WTRU periodically in the WTRU-specific SRS subframes within a configured and/or predefined frequency bandwidth. A WTRU may transmit the SRS in an aperiodic manner, for example, if the WTRU may receive an aperiodic SRS (A-SRS) transmission trigger in a DCI. A WTRU may transmit DM-RS for the PUSCH demodulation at the eNB receiver and the location of DM-RS may be in the middle of the SC-FDMA symbols (e.g., fourth SC-FDMA symbol in normal CP) in each slot for the resource blocks for which PUSCH transmission may be granted.

For LTE TDD, multiple TDD uplink/downlink subframe configurations may be supported and one or more of the configurations may be used in an eNB. A TDD uplink/downlink subframe configuration may include a downlink subframe 'ID', an uplink subframe 'U', and/or a special subframe 'S,' as shown in Table 1.

TABLE 1

Example TDD LTE Uplink-downlink configurations.

| Uplink-downlink configu-ration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

A WTRU may receive user plane and/or control plane data in a PDSCH transmission from an eNB. A WTRU may receive RLC and/or MAC control information, for example, in a PDSCH transmission from an eNB.

A random access (RA) procedure may be contention-based (e.g., common) or non-contention based (e.g., contention-free or dedicated).

When using a contention-based RA procedure, the WTRU may initiate the process by transmitting a RA preamble that it may randomly select from a common pool of preambles that may be communicated to the WTRU by the network, e.g., via broadcasted system information. The WTRU may transmit the preamble on a PRACH resource (e.g., a resource in time and frequency) that the WTRU may select from a set of allowed resources that may be communicated to the WTRU by the network, e.g., via broadcasted system information. The cell's configured set of PRACH resources may be or may include this set of allowed PRACH resources. The unit of time for the PRACH resource may be a subframe. The subframe the WTRU may select for the PRACH resource may be the next subframe configured for PRACH in which the WTRU may transmit the PRACH (e.g., based on timing, measurement, and/or other WTRU considerations). The WTRU may select a frequency aspect of the PRACH resource (e.g., the resource blocks (RBs)) in the selected subframe, for example, based on parameters communicated to the WTRU by the network, e.g., via broadcasted system information. A frequency resource may be allowed for PRACH in a subframe for FDD or other cases. It may be defined by a starting (e.g., lowest) RB number that may be provided by the network, e.g., prach-FrequencyOffset, and may have a fixed bandwidth, such as six RBs.

Multiple WTRUs may select the same resources (e.g., preamble and PRACH resource) for random access, and the contention situation may be resolved when a contention-based random access procedure is used, or in other cases.

The WTRU may transmit a RA preamble that may be (e.g., explicitly) signaled to the WTRU by the network, e.g., ra-PreambleIndex, when using a non-contention based RA procedure, or in other cases. The WTRU may transmit the preamble on a PRACH resource that it may select from a specific subset of the cell's configured PRACH resources. The subset (e.g., the mask) may be explicitly signaled to the WTRU by the network, e.g., ra-PRACH-MaskIndex. The WTRU may use the indicated resource when the subset includes one choice or in other cases.

A PRACH preamble may be considered a PRACH resource. For example, PRACH resources may include a PRACH preamble, time, and/or frequency resources.

Figure 3:
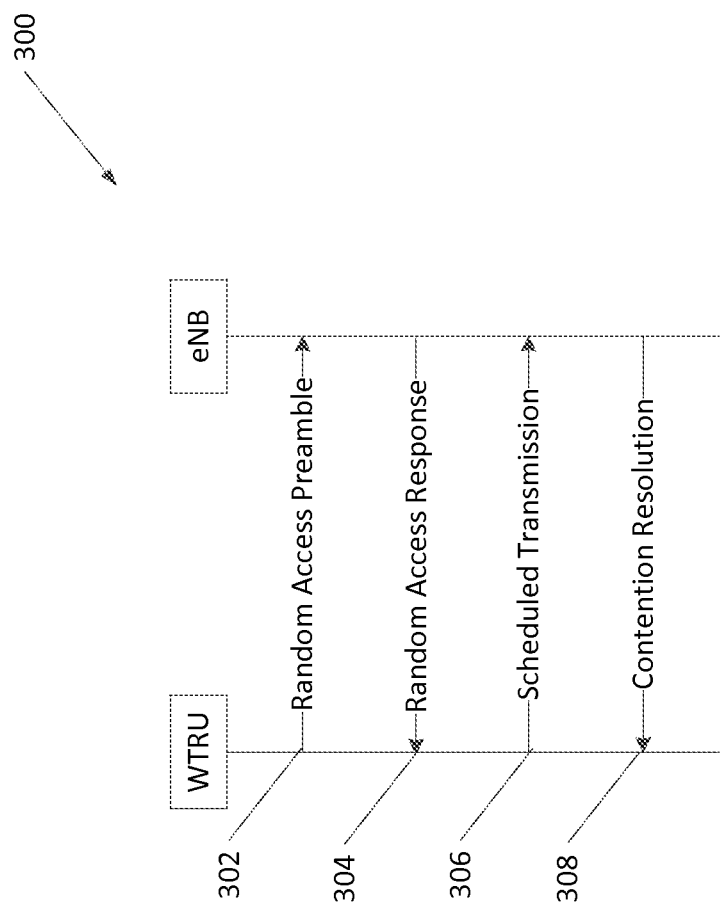
FIG. 3 illustrates an example random access procedure.

FIG. 3 illustrates an example random access procedure 300. At 302 (e.g., msg1), the WTRU may transmit a preamble, which may be at a certain power level. An eNB that may receive the preamble may respond with a Random Access Response (RAR), e.g., msg2, at 304. If the WTRU may not receive the RAR within a certain time window, the WTRU may transmit another preamble (which may be different from the previous preamble) and may transmit it at a higher power (e.g., ramp up the power such as according to a ramping protocol). The WTRU may repeat transmitting preambles until at least one of the following may happen: the WTRU receives an RAR, the WTRU reaches (or exceeds) its maximum power, and/or the WTRU reaches (or exceeds) the maximum number of ramps which may be permitted. If the WTRU may reach or exceed one of the maximums, the WTRU may consider the random access procedure 300 to fail. The ramping step and maximum number of ramp may be provided by the eNB, such as via system information that may be broadcast.

If the WTRU may receive an RAR, the RAR may include one or more of a grant for resources on which to send an UL transmission at 306 (e.g., msg3), a C-RNTI or TC-RNTI, and/or a timing advance (TA). In response to the RAR, the WTRU may transmit in the UL at 306 (e.g., msg3) on the granted resources and may adjust its UL timing according to the TA. For a contention-free RA procedure, the random access procedure 300 may end at 306.

For a contention-based procedure, contention resolution may occur at 308 (e.g., msg4). A contention resolution message may include information (e.g., C-RNTI) that may indicate the WTRU for which the RAR may have been intended. If the WTRU may receive a contention resolution message indicating that it as the intended WTRU, the WTRU may consider the random access procedure 300 successful. If not, the WTRU may consider the random access procedure 300 a failure and may try again.

In UL transmissions, a WTRU may perform power control based on a number of factors that may include one or more of measured pathloss on the DL carrier, transmit power control (TPC) commands (e.g., from the eNB), the number of resource blocks on which it may transmit, and/or other static or semi-static parameters, among others. The TPC command may be provided in physical layer signaling such as in a DCI format, e.g., in a DCI format that may grant UL resources or one that may be used for TPC commands. A WTRU may modify, increase, and/or decrease its UL transmit power on one or more channels based on a received TPC command. The modification may be at a certain time after the receipt of the TPC command.

The static or semi-static parameters may be provided by the eNB or other network resources. The parameters and/or the power control formula and/or the power control procedure may be established based on or found in, for example, LTE or LTE-A standards.

A WTRU may synchronize its reception and/or transmission timing to the received frame timing of a reference cell. The timing of received frame boundaries may vary over time due to WTRU motion and/or other factors (e.g., oscillator drift), and a WTRU may autonomously adjust its timing accordingly. The WTRU may apply a timing advance (TA) to the transmitted signals. For example, the WTRU may start transmission of a given UL subframe some amount of time (e.g., the applied TA) before the start of the corresponding DL subframe. The eNB may provide TA commands to a WTRU (e.g., each WTRU) that may communicate with it in the UL or that may be under its control, and the eNB may provide such commands with the intent that UL transmissions from the WTRUs in any given subframe intended for a certain cell arrive at the certain cell at nominally the same time. The WTRU may also autonomously adjust its uplink timing according to the received downlink frame of the reference cell, and that timing may change.

Mobility for a WTRU in an idle mode may include cell selection and/or cell reselection. A WTRU may perform cell selection to find a suitable cell for normal camping and connectivity. A WTRU may perform cell selection for initial access to the network, for transitions from connected mode to IDLE mode, and/or for recovery from connectivity failures, such as radio link failures. A WTRU with no prior knowledge of the network or cells may perform initial cell selection, and a WTRU with some previously stored information about the network and cells may perform stored information cell selection. In order for a WTRU to deem a cell as a suitable cell, the RSRP and RSRQ measurements of the cell may (e.g., may need to) meet certain cell selection criteria. Parameters for the selection criteria may be provided by the eNB, e.g., in system information that may be broadcast. If a WTRU may find or detect a cell and the cell may fail to meet the criteria, the WTRU may perform the same check on the next found or detected cell until the criteria is met and a suitable cell is found.

A WTRU may perform cell re-selection in an idle mode when a neighboring cell may become better than the current serving cell, for example, in terms of RSRP or RSRQ. The neighboring cell may be an intra-frequency, inter-frequency LTE cell or inter-RAT, e.g., UMTS or GSM, cell. The measurements and the determination of cell selection criteria that may trigger the WTRU to reselect to another cell may be done by the WTRU based on information provided by the eNB.

A WTRU may measure and monitor the serving cell, e.g., continually. If the serving cell quality may fall below a certain threshold, the WTRU may begin to detect and measure neighboring cells. Information regarding neighboring cells and cell reselection criteria may be indicated to a WTRU in system information (e.g., SIBs) that may be broadcasted by the eNB. Certain priorities may be specified or used by the eNB and WTRU as part of the evaluation for cell reselection. For example, the WTRU may be provided with higher priorities for certain frequencies over the current serving cell frequency such that the eNB may, to a certain extent, control the frequencies and cells to which the WTRU may reselect. WTRU-determined priorities for cell re-selection may include, for example, the prioritization of MBMS frequencies over other frequencies when a WTRU may prefer to receive MBMS services.

Figure 4:
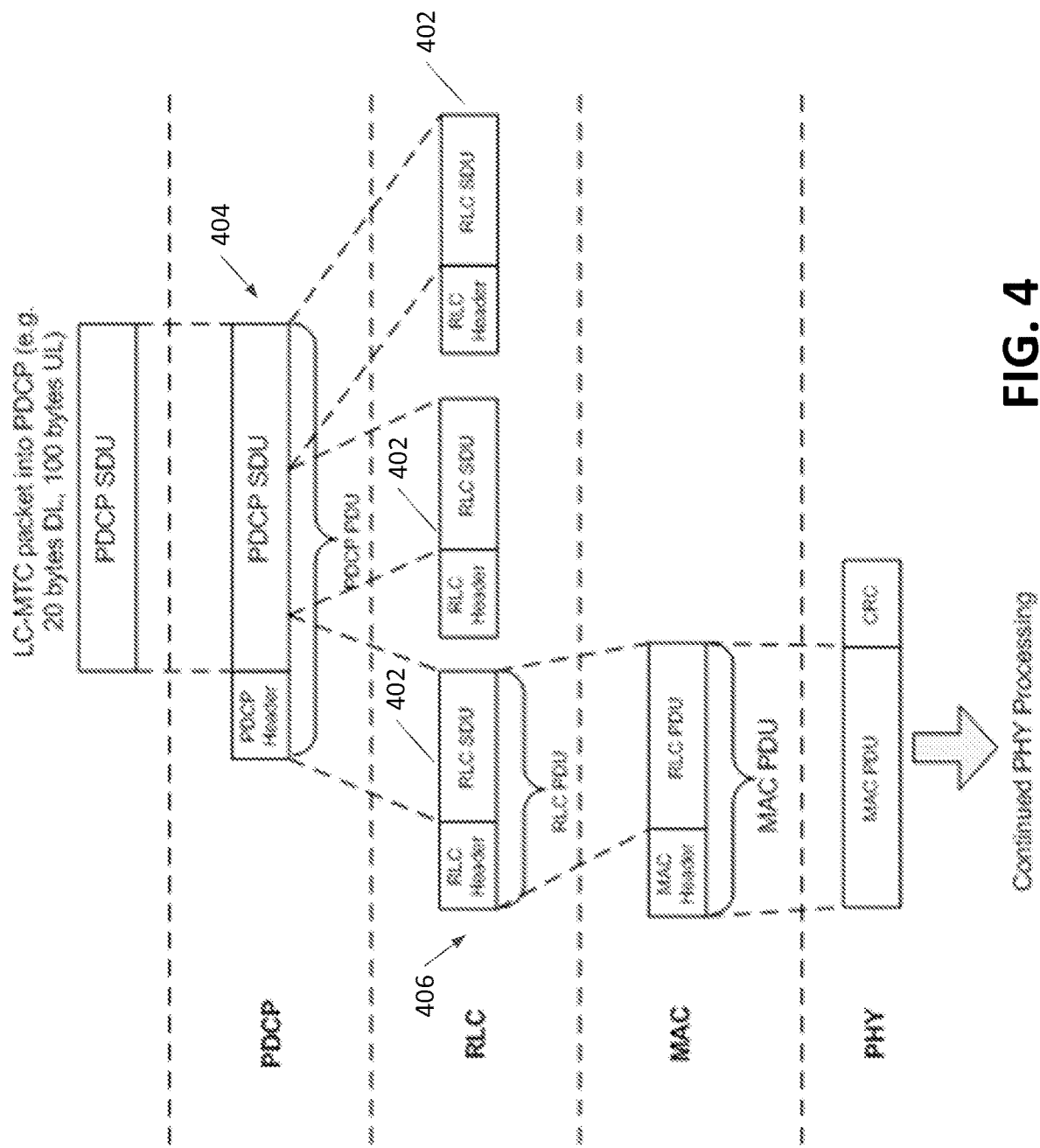
FIG. 4 illustrates an example of layer 2 (L2) processing of an incoming packet.

FIG. 4 illustrates an example of layer 2 (L2) processing of an incoming packet. FIG. 4 shows a PDCP header which may appended to the incoming packet that may be transmitted in the DL or UL direction. From the perspective of each protocol layer, a service data unit (SDU) may represent the data which may come into the protocol layer and a protocol data unit (PDU) may represent the data which may come out of the protocol layer. For example, an RLC SDU 402, which may come into the RLC layer, may include at least part of a PDCP PDU 404. An RLC PDU 406, which may be data processed by the RLC layer may include an RLC SDU 402 plus headers and other information which may be included by the RLC layer.

In the example shown in FIG. 4, the RLC may segment PDCP PDUs into RLC PDUs such that MAC PDUs may include a segmented RLC PDU. PDUs may be concatenated.

In an inter-frequency operation in heterogeneous network, the frequency band of Macro and LPN may or may not be the same. Inter-frequency and intra-frequency operation may be taken into account to support decoupled mode. The low cost MTC (LC-MTC) device, low-cost UE, low-cost WTRU, LC-WTRU, UE, LC-MTC UE, MTC UE, and/or LC-UE, WTRU, coverage limited device, coverage limited LC-MTC device, coverage limited UE, coverage limited WTRU, and other terms may be used herein interchangeably to refer to an MTC device that may be low cost.

Although the examples described herein may refer to a certain type of device or WTRU such as a LC-MTC device or coverage limited WTRU, these examples are non-limiting, and these examples may be applied to any device or WTRU and still be consistent with the principles disclosed herein. Cell, eNB, node, and network node may be used herein interchangeably. Macro eNB and LPN may be replaced by each other or by any other eNB, cell, node, or network node and still be consistent with the principles disclosed herein. Macro and Macro eNB may be used interchangeably. An LPN may have or be an eNB separate from a Macro eNB or may be controlled by a Macro eNB, for example, such as in the case of the LPN being a remote radio head (RRH) of a Macro eNB. Small cell and LPN may be used interchangeably. Upon, following, as a result of, and in response to may be used interchangeably. Although examples may be disclosed in the context of two nodes, e.g., a Macro and a LPN, these examples are non-limiting. Use of any number of nodes of any type may be consistent with the principles disclosed herein.

A WTRU may be able to communicate (e.g., with acceptable performance) in an UL or a DL (e.g., but not both UL and DL) to a node, e.g., either a Macro cell or a Low Power Node (LPN). If, however, the WTRU may be able to communicate (e.g., with acceptable or improved performance) in the DL to one and in the UL to the other, DL/UL decoupled operation may be desirable. DL/UL decoupled operation, operating in a DL/UL decoupled scenario, and decoupled mode may be used interchangeably. Decoupled operation may be desirable, for example, when a WTRU is unable to communicate in UL and DL to a Macro cell and/or a LPN. Decoupled operation may use DL transmissions from the Macro cell and UL transmissions to the LPN, or vice versa.

Figure 5:
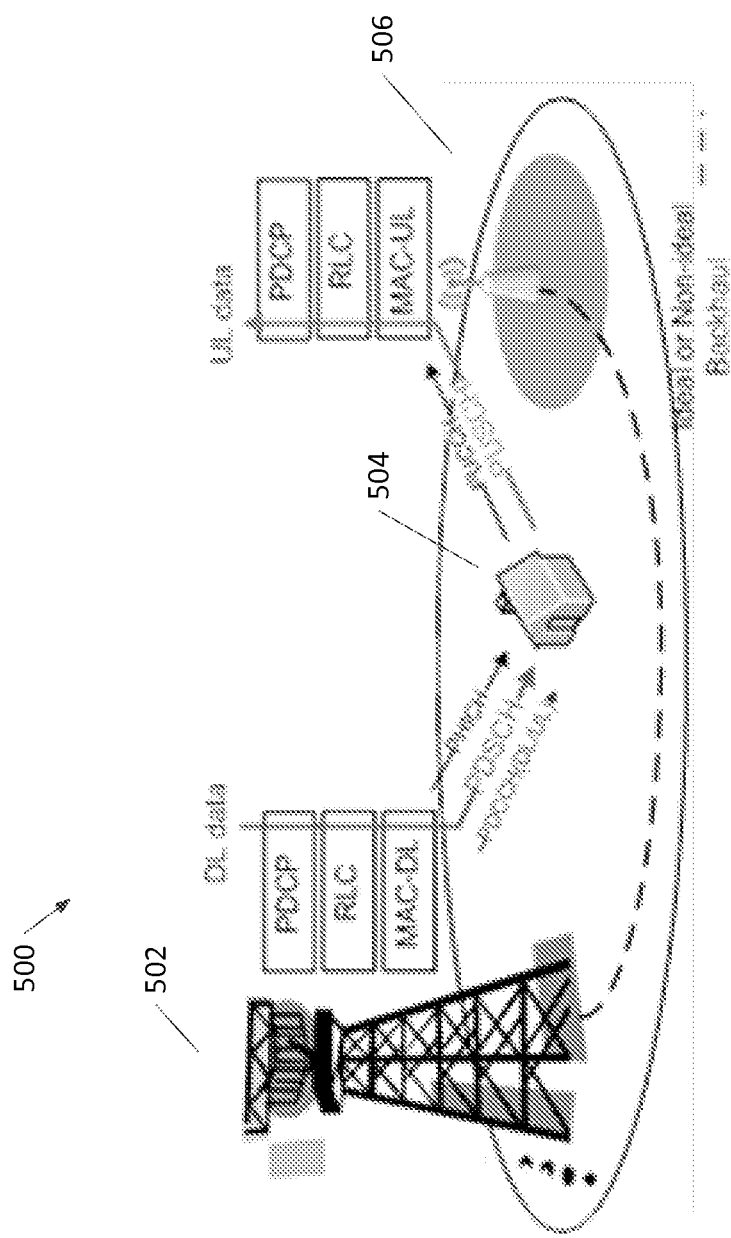
FIG. 5 illustrates an example DL/UL decoupled system.
Figure 6:
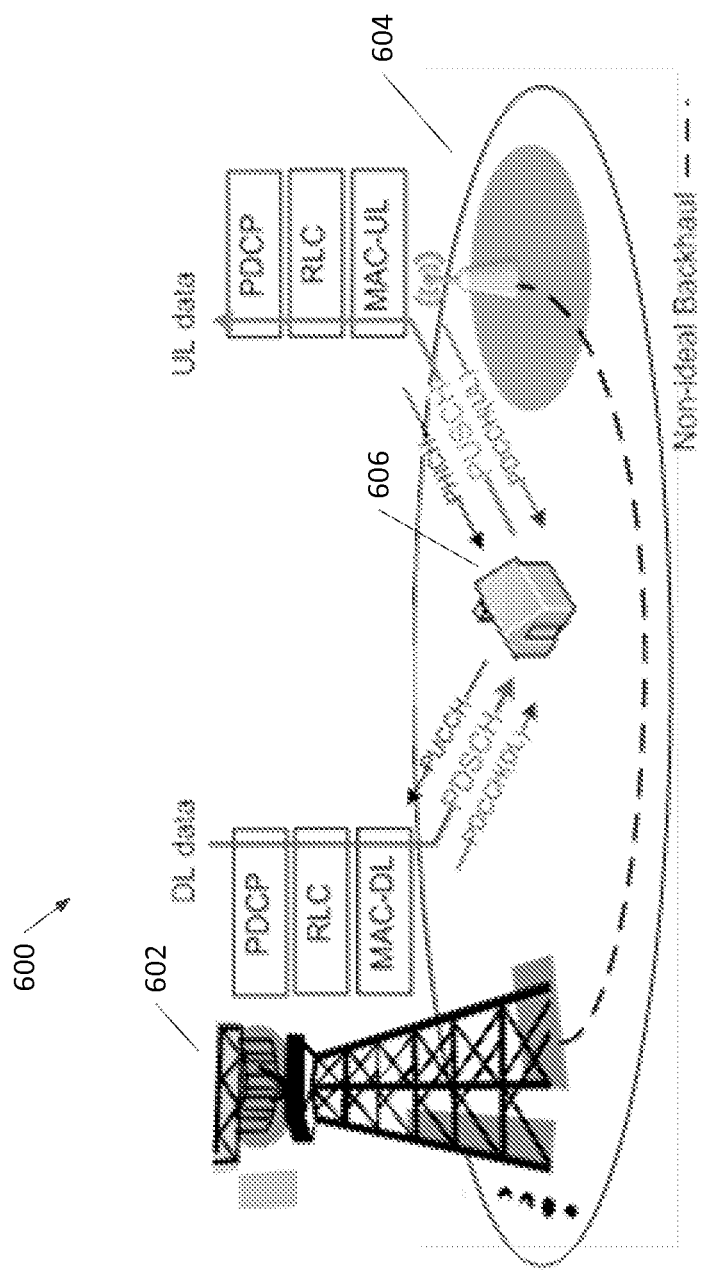
FIG. 6 illustrates another example DL/UL decoupled system.

In a DL/UL decoupled scenario, certain or all of a WTRU's DL communication may be with one (or at least one) node and certain or all of its UL communication may be with another (or at least one other) node, for example, as shown in FIGS. 5 and 6.

FIG. 5 illustrates an example DL/UL decoupled system 500 in which communication of DL data and control may be with a node such as a Macro eNB 502. The node 502 may transmit and/or a WTRU 504 may receive the DL channels. The DL channels may include one or more of a physical DL shared channel (PDSCH), a physical DL control channel (PDCCH), an enhanced PDCCH (EPDCCH), and/or a physical hybrid automatic repeat request (ARQ) indicator channel (PHICH). The PDCCH (or EPDCCH) may provide UL and/or DL grants to the WTRU 504. Communication of UL data and control may be with another node 506 such as a small cell (e.g., small cell eNB) or LPN. The WTRU 504 may transmit and/or the node 506 may receive the UL channels. The UL channels may include one or more of a physical UL shared channel (PUSCH), a physical UL control channel (PUCCH), a physical random access channel (PRACH) (not shown in FIG. 5), and/or a sounding reference signal (SRS) (not shown in FIG. 5). PDCCH and EPDCCH may be used interchangeably.

FIG. 6 illustrates an example DL/UL decoupled system 600 in which communication of DL data and associated control may be a one node such as a Macro eNB 602 and communication of UL data and associated control may be with another node 604 such as a small cell (e.g., small cell eNB) or LPN. In this example, PDSCH may be received by a WTRU 606 from one node such as the Macro eNB 602. The WTRU 606 may receive DL grants via a PDCCH or EPDCCH from this node. The WTRU 606 may provide feedback for the DL data such as HARQ ACK/NACK and CQI on a PUCCH to this node. PUSCH may be transmitted by the WTRU 606 to another node 604 such as the small cell (e.g., small cell eNB) or LPN. The WTRU 606 may receive UL grants on a PDCCH or EPDCCH from this other node 604. The WTRU 606 may receive feedback for the UL data such as HARQ ACK/NACK on a PHICH from this other node. PRACH and/or SRS may be transmitted by the WTRU 606 to at least one of the nodes.

DL system signals, such one or more of primary synchronization signal (PSS), secondary synchronization signal (SSS), physical broadcast channel (PBCH), and cell specific reference signals (CRS) may be received by the WTRU from one or both of the nodes (e.g., eNBs). PDSCH carrying system signals, such as paging and/or system information (e.g., in one or more system information blocks (SIBs)) may be received by the WTRU from one or both of the nodes (e.g., eNBs).

For the DL/UL decoupled scenarios, various operational aspects may be considered.

Uplink accessibility to a Macro eNB may be considered. The coverage limited LC-MTC device may start with a coupled scenario (e.g., with the Macro eNB) and then switch its UL (e.g., some or all of its UL) to another node (e.g., the LPN), which may have better UL coverage. The coverage limited LC-MTC device may have DL but not UL (or limited UL) coverage with one node (e.g., the Macro eNB) so that it may (e.g., may need to) start with another node (e.g., the LPN) for UL (or at least some UL) from the beginning.

Downlink signal readability for LPN may be considered. A LC-MTC device may read certain (e.g., all) downlink (or DL system) signals of the LPN, such as PSS and/or SSS, CRS, PBCH, and/or SIBs, which may enable it to measure downlink pathloss and/or synchronize with the LPN in terms of time and/or frequency offset. A LC-MTC device may not decode PBCH of the LPN, e.g., due to its poor received signal quality, while it may synchronize with the LPN in terms of time and/or frequency sync (e.g., based on one or more of PSS, SSS, and CRS).

Backhaul delay between a Macro eNB and the LPN may be considered. The backhaul (e.g., for communication between the Macro and the LPN) may be considered ideal, e.g., there may be no or minimal delay (e.g., for such communication). When the LPN is an RRH of the Macro eNB, the backhaul may be considered ideal. The backhaul may be non-ideal, e.g., the backhaul delay may be a value greater than zero, such as 10 ms, 20 ms, 40 ms, 80 ms, or even longer. When the LPN and Macro eNB are (or are controlled by) separate eNBs, non-ideal backhaul delay may apply.

Intra and Inter-frequency operation may be considered. The frequency band for the LPN and the Macro eNB may or may not be the same in a heterogeneous network or in other scenarios. Inter-frequency and/or intra-frequency operation may be considered for the decoupled scenarios.

When a cell is switched to or used for a certain direction (e.g., UL or DL), the cell may be switched to or used for certain (e.g., some or all) data channels and/or control channels in that direction. When a cell is switched to or used for a certain direction (e.g., UL or DL), the cell may be switched to or used at least for data channels in that direction and may include the associated feedback control channels, which may be in the opposite direction. For example, using a cell for DL (or DL communication) may mean using it for at least PDSCH and PUCCH, which may carry HARQ feedback for the PDSCH. Using a cell for UL (or UL communication) may mean using it for at least PUSCH or PUSCH and PHICH, which may carry HARQ feedback for the PUSCH.

Transmission modes or modes of operation may include, for example, a coupled mode and a decoupled mode. A WTRU may operate, prepare to operate, or intend to operate in a coupled mode and/or a decoupled mode. Operating in a coupled (or decoupled) mode may be the same as or similar to operating in a coupled (or decoupled) scenario.

DL/UL decoupled mode, decoupled mode, decoupled transmission mode, decoupled operation, decoupled mode of operation, dual connected mode, dual connectivity mode, dual connection mode, and dual cell mode may be used interchangeably. DL/UL coupled mode in which both uplink and downlink communication may be with the same node (e.g., eNB) may be interchangeably used with coupled mode, coupled transmission mode, coupled operation, coupled mode of operation, single connected mode, single cell connected mode, single connectivity mode, single connection mode, and single cell mode. DL/UL and UL/DL may be used interchangeably.

A WTRU may autonomously choose its mode of operation (e.g., coupled or decoupled) or may be configured for a certain mode. For example, a WTRU may select and connect to a cell and begin with coupled operation with that cell and may (e.g., may then) receive configuration from the corresponding eNB (e.g., macro eNB) to switch certain or all communication in a certain direction (e.g., UL or DL) to another cell or node (e.g., LPN). In another example, a WTRU may choose to communicate in the DL, e.g., for certain or all channels with one node and in the UL, e.g., for certain or all channels with another node, for example, based on measurements and/or its ability to communicate (on some or all channels) in a certain direction.

When switching communication in a certain direction (e.g., DL and/or UL) to another cell or node, at least one data channel in that direction (e.g., PDSCH and/or PUSCH) and/or certain associated control channels or signaling for the at least one data channel in that direction may be switched. This may include scheduling grants, which may be carried on a control channel (e.g., PDCCH or EPDCCH) in the same or opposite direction and/or feedback, which may be carried on a channel such as a control channel in the opposite direction (e.g., PUCCH and/or PHICH).

When communicating or choosing to communicate in a certain direction (e.g., DL and/or UL) with a certain cell or node, communication with that cell or node may include at least one data channel in that direction (e.g., PDSCH and/or PUSCH) and/or certain associated control channels or signaling for the at least one data channel in that direction which may include scheduling grants, which may be carried on a control channel (e.g., PDCCH or ePDCCH) in the same or opposite direction and/or feedback, which may be carried on a channel such as a control channel in the opposite direction (e.g., PUCCH and/or PHICH).

For example, WTRU communication in the DL with a node or cell may include one or more of receiving DL grants from the node or cell, e.g., via PDCCH, receiving DL data from the node or cell, e.g., via PDSCH, and/or transmitting feedback to the node or cell, e.g., via PUCCH. WTRU communication in the UL with a node or cell may include one or more of receiving UL grants from the node or cell, e.g., via PDCCH, transmitting UL data to the node or cell, e.g., via PUSCH, and receiving feedback from the node or cell, e.g., via PHICH.

WTRU communication in the DL with a node or cell may include receiving DL data and/or control channels from the node or cell, which may include one or more of PDSCH, PDCCH, ePDCCH, which may carry UL and/or DL grants, and/or PHICH. WTRU communication in the UL with a node or cell may include transmitting UL data and/or control channels to the node or cell, which may include one or more of PUSCH and PUCCH.

An eNB, node, or cell (e.g., Macro or LPN) may transmit one or more of the signals described herein, which may be received by a WTRU. An eNB, node, or cell (e.g., Macro or LPN) may receive or intend to receive one or more of the signals described herein, which may be transmitted by a WTRU.

Operate, intend to operate, consider to operate, and prepare to operate may be used interchangeably. Being in a mode, operating in a mode, intending to operate in a mode, considering to operate in a mode, and preparing to operate may be used interchangeably. Mode and scenario may be used interchangeably.

UL communication may include certain UL channels and may include certain (e.g., related) DL channels. UL communication may include (e.g., include use of) one or more UL channels, such as at least one of PUSCH, PUCCH, SRS, and/or PRACH. These one or more UL channels may be transmitted by a WTRU and/or monitored and/or received by a cell or eNB. Such transmission, monitoring, and/or reception may constitute use of the channel. UL communication may include (e.g., include use of) one or more DL channels that may be associated with an UL channel or transmission such as a PDCCH or PHICH, which may be associated with an UL channel. A PDCCH, which may be associated with an UL channel, may include, but may not be limited to one or more of a PDCCH which may provide an UL grant or allocation, e.g., for a PUSCH transmission, a PDCCH which may provide a trigger for an aperiodic SRS transmission, and a PDCCH which may include a PDCCH order, e.g., for UL synchronization which may trigger or result in a PRACH transmission. A PHICH, which may be associated with a PUSCH may provide feedback (e.g., ACK/NACK) for or which may correspond to a PUSCH transmission. These one or more DL channels may be transmitted by a cell or eNB and/or monitored and/or received by a WTRU. Such transmission, monitoring, and/or reception may constitute use of the channel. Use of a cell or eNB for UL communication may not preclude use of the cell or eNB for DL communication. WTRU use of a cell or eNB for UL communication may not preclude its use of the cell or eNB for (e.g., for reception and/or use of) one or more of system information, broadcast signals and/or channels, synchronization signals and/or channels, and/or reference signals such as CRS.

The term DL communication may be used herein to include certain DL channels and may also include certain (e.g., related) UL channels. DL communication may include (e.g., include use of) one or more DL channels, such as at least one of PDSCH, PDCCH (and/or EPDCCH), PHICH, and PBCH. These one or more DL channels may be transmitted by a cell or eNB and/or monitored and/or received by a WTRU. Such transmission, monitoring, and/or reception may constitute use of the channel. DL communication may include one or more UL channels which may be associated with a DL channel or transmission such as a PUCCH which may be associated with a DL channel, such as a PDSCH. A PUCCH which may be associated with a PDSCH may provide feedback (e.g., ACK/NACK and/or CQI) for or which may correspond to a PDSCH transmission. These one or more UL channels may be transmitted by a WTRU and/or monitored and/or received by a cell or eNB. Such transmission, monitoring, and/or reception may constitute use of the channel. Use of a cell or eNB for DL communication may not preclude use of the cell or eNB for UL communication. WTRU use of a cell or eNB for DL communication may not preclude its use of the cell or eNB for random access for or during which the WTRU may transmit PRACH and/or PUSCH to the cell or eNB.

A WTRU may operate in, be configured with, or be configured to operate in a coverage limited mode of operation for certain or all channels in DL and/or UL. Coverage limited and coverage enhanced may be used interchangeably.

In a coverage limited mode, a WTRU and/or an eNB communicating with the WTRU may perform certain actions to improve the coverage or performance on one or more channels such as repetition or power boosting.

A WTRU may operate in coverage limited mode while in coupled mode and/or decoupled mode. The level of coverage limitation and the actions of the WTRU and/or eNB (or nodes in the decoupled case) to reduce or eliminate the effects of the limitations may be different in the UL and the DL.

A WTRU may operate in non-coverage limited mode while in coupled mode and/or decoupled mode. While a WTRU may be operating in coupled or decoupled mode, one direction of the WTRU's communication may be in coverage limited mode, while the other direction may be in non-coverage limited mode, or both directions of communication may be in coverage limited mode or non-coverage limited mode.

A WTRU may operate in coverage limited mode when the WTRU may be (or may be considered) coverage limited.

A WTRU may be (or may be considered) coverage limited in a certain direction (e.g., DL and/or UL) if one or more of the following may reach or cross (e.g., become higher or lower than) a threshold: a measurement (e.g., RSRP) that may be made by the WTRU, a value derived or determined, e.g., by the WTRU, from a measurement (e.g., pathloss), and a difference between one or more values or measurements that may be determined by the WTRU. Different levels of coverage limitation may be performed. Different thresholds may be used for the different levels.

Cell search, cell selection, and cell reselection may be used interchangeably. DL cell selection and legacy cell selection may be used interchangeably.

An uplink cell may be a cell that a WTRU may use or intend to use for UL communication.

A downlink cell may be a cell that a WTRU may use or intend to use for DL communication or at least DL communication.

A legacy cell may be a cell that a WTRU may select using legacy cell selection or reselection procedures.

A cell selection and/or reselection procedure may be different for a WTRU that may operate in coupled or decoupled mode.

A WTRU, such as one that may be in a coupled mode, may measure downlink signals from multiple cells and may select a downlink cell based on predefined criteria, which may include but are not limited to: highest signal strength, RSRP, and/or received SINR, and the WTRU may assume that the uplink cell is the same as the downlink cell. There may be no separate cell search procedure for uplink cell selection.

A WTRU, such as one that may be in (or may be considered or may intend to be in) a decoupled mode, may measure downlink signals from multiple cells and select a downlink cell based on predefined criteria, which may include but are not limited to: signal strength, RSRP, RSRQ, and/or received SINR (e.g., highest signal strength, RSRP, RSRQ, and/or received SINR). The WTRU may perform an uplink cell search procedure in which the predefined criteria for uplink cell selection may be different from that for downlink cell selection. The uplink cell search may be performed for cells within a list provided by the selected downlink cell. The list of uplink cells associated with the selected downlink cell may be provided in a broadcast channel (e.g., MIB, SIB-x), higher layer signaling (e.g., MAC, RRC), and/or physical layer signaling (e.g., (E)PDCCH).

Measurements of one or more cells for one or more of UL cell search, UL cell selection, and UL cell reselection may be performed, e.g., by the WTRU, on signals it may detect or receive in the DL from those one or more cells and/or other cells.

A coupled mode and a decoupled mode may be used according to the WTRU category or used differently according to the WTRU category.

The coupled and decoupled transmission modes may be defined and used for one or more certain categories of WTRUs such as a low-cost or coverage limited WTRU category. For example, these transmission modes may be (or may only be) used for a specific WTRU category. If a WTRU falls under this WTRU category, it may operate with the applicable transmission modes, e.g., coupled and/or decoupled operation. The coupled transmission mode may be used for certain (e.g., all) WTRU categories, and the decoupled transmission mode may be used (e.g., only used) for specific one or more WTRU categories (e.g., low-cost or coverage limited WTRU category).

The coupled mode may support one or more specific transmission modes (e.g., TM9) with a restricted number of ranks for one or more WTRU categories (e.g., low-cost or coverage limited WTRU). Certain or all legacy transmission modes (e.g., TM1-TM10) may be supported in the coupled mode for certain (e.g., certain other) WTRU categories. The capability of supporting legacy transmission modes may be related to the release of the WTRU.

A coupled mode and/or a decoupled mode may be configured, e.g., for a WTRU, in a semi-static and/or WTRU-specific manner.

The coupled mode may be defined as a primary mode and the decoupled mode may be defined as a secondary mode. The primary mode may be considered as the default mode so that the WTRU (e.g., low-cost WTRU) may (or may always) start with coupled mode for the cell access and may switch or be switched to decoupled mode, for example, according to the channel condition. The configuration may be provided by the eNB and/or received by the WTRU via higher layer signaling, such as RRC signaling. The decoupled mode may be configured by higher layers for a WTRU configured for or operating in coupled mode. If a WTRU is configured with a decoupled mode, the WTRU may start or perform an uplink cell search procedure described herein. The WTRU may perform an UL cell search procedure while a downlink cell search procedure may not be performed. The decoupled mode may be configured by higher layers and the configuration signaling may include the uplink cell information. The uplink cell information may include at least one of cell-ID, center frequency, bandwidth, and PRACH resource configuration.

The supported downlink and uplink channels (e.g., by or for communication with a node) may be different according to the mode of operation (e.g., with respect to a certain WTRU). For example, in coupled mode, all channels defined may be supported while in decoupled mode only a subset of channels which may be used in coupled mode may be supported (e.g., for communication between the WTRU and each node). In coupled mode, data and control channels (e.g., between the WTRU and one node) may be supported. In decoupled mode, certain channels (or certain channels in a certain direction), such as data channels and/or control channels (e.g., in a certain direction), may (or may only) be supported (e.g., between the WTRU and a certain node or a set of nodes). Data and control channels may include but are not limited to one or more of PDSCH, PUSCH, PHICH, (E)PDCCH, PUCCH, SR, SRS, and PRACH. The coupled mode may support broadcasting channels and data/control channels. The decoupled mode may (or may only) support data and control channels. Broadcasting channels may include but not be limited to one or more of PBCH, SIBs (e.g., PDSCH carrying SIBs), and Paging (e.g., PDSCH carrying Paging). Decoupled mode may not support one or more of PHICH or SR. A WTRU (e.g., low-cost or coverage limited WTRU) may receive (e.g., may receive all) broadcasting information in a coupled mode and switch to a decoupled mode, e.g., for data transmission. While in decoupled mode, the WTRU may receive one or more broadcast and/or paging channels from one of the cells (e.g., the one that it may use for DL communication, which may be the Macro eNB).

The transmission modes may be selected during the cell access procedure. If a WTRU selects or is configured for one transmission mode (e.g., coupled or decoupled), the transmission mode may remain unchanged at least for the connected mode.

A WTRU may perform UL cell selection and/or reselection to select and/or reselect a cell to use for UL communication.

A WTRU may perform a cell selection procedure for the downlink and/or uplink, for example separately. A WTRU may or may not perform uplink cell selection based on the results of the downlink cell selection procedure. DL cell selection may be performed to choose a cell for at least DL (or certain DL) communication (e.g., for at least broadcast of system information) which may be the best cell or a cell that meets a certain criteria. DL cell selection may be the same as legacy cell selection. UL cell selection may be performed to choose a cell for at least UL (or certain UL) communication (e.g., PUSCH) which may be the best cell or a cell that meets certain criteria.

A WTRU may perform downlink cell selection and uplink cell selection at the same time (or during a similar timeframe such as prior to or during selecting a cell for camping on, a suitable cell, or a best cell). The cell selection criteria for uplink and downlink may be different. Upon (or following) finishing the cell selection process or procedure (e.g., upon or following choosing the cell or cells that meet the DL and/or UL selection criteria), the WTRU may select either coupled mode or decoupled mode according to the outcome of the cell selection for downlink and uplink. If the selected uplink cell is different from the downlink cell, the WTRU may select decoupled mode. Otherwise, the WTRU may select coupled mode.

A WTRU may perform a first (e.g., downlink or legacy) cell selection. If a measured signal during the first (e.g., downlink or legacy) cell selection satisfies a predefined criterion (e.g., coverage limited channel condition or threshold), the WTRU may perform a second (e.g., uplink) cell selection (e.g., additionally). If the predefined criterion is not met (e.g., the coverage limited condition or threshold is not met), the WTRU may not perform the second (e.g., uplink) cell selection. Upon or following finishing the cell selection (e.g., legacy and/or DL, and/or UL), the WTRU may select either coupled mode or decoupled mode according to the outcome of the cell selection. If the selected cell (e.g., uplink cell) from the second cell selection is different from the selected cell (e.g., downlink cell) from the first cell selection, the WTRU may select decoupled mode. Otherwise, the WTRU may select coupled mode. The WTRU may or may only perform the second (e.g., UL) cell selection if the cell selected from the first (e.g., DL or legacy) cell selection indicates (e.g., in system information which may be broadcast in a MIB or SIB) that it may support decoupled operation. If the cell selected from the first (e.g., DL or legacy) cell selection procedure does not indicate that it supports decoupled mode (or indicates it does not support decouple mode), the WTRU may select coupled mode or the WTRU may search for another cell that may support decoupled mode. The WTRU may (or may only) search for another cell that may support decoupled mode if certain criteria (e.g., one or more conditions and/or thresholds) is (or are) met, such as coverage is too limited for coupled operation with the selected cell.

The procedures described may be applied for initial cell selection and/or cell reselection.

Any of a variety of cell selection criteria may be used. A cell selection criterion may be a downlink common reference signal received power (e.g., RSRP), which may be measured by the WTRU. Another cell selection criterion may be a downlink pathloss (e.g., transmitted power— RSRP), which may be determined by the WTRU from measurements (e.g., of RSRP) and transmitted power which may be received by the WTRU in signaling, such as broadcast or dedicated signaling from a node (e.g., eNB). Another cell selection criterion may be a downlink received SNR (e.g., RSRQ), which may be measured or determined by the WTRU. Another cell selection criterion may be an uplink pathloss, which may be estimated by the WTRU, for example, based on DL pathloss.

The cell selection criteria may be the same or different for the downlink (or legacy) and uplink selection procedures.

The measurement thresholds for making decisions (e.g., selection decisions) may be the same or different for the downlink (or legacy) and uplink selection procedures.

A WTRU may receive, for example, in broadcast signaling such as system information (e.g., in one or more SIBs) of a cell (e.g., the Macro cell), information related to cell selection and/or reselection for UL communication or access to that cell (e.g., the Macro cell). For example, the WTRU may receive at least one of a pathloss threshold (e.g., minimum pathloss threshold) and an offset. A WTRU may, for example, based at least on this information, determine if the cell is suitable for UL communication or access. Determining whether a cell is suitable for UL communication or access may be referred to as performing an UL suitability check. Pathloss may refer to UL or DL pathloss.

A WTRU may perform UL cell selection and/or an UL suitability check for one or more cells. For example, upon (or following) finding or selecting a cell that may meet the RSRP and/or RSRQ based (e.g., Rel-11) cell suitability criteria, the WTRU may perform an UL suitability check for that cell. A WTRU may perform cell selection (e.g., legacy cell selection) and UL cell selection separately. UL cell selection may include an UL suitability check.

If the UL cell suitability criteria have been met (e.g., for the Macro cell), the WTRU may operate in coupled mode. If the UL cell suitability criteria have not been met, the WTRU may consider the cell not suitable and may search for another cell (e.g., for DL and/or UL communication or access). If the UL cell suitability criteria have not been met, the WTRU may attempt to search for a more suitable cell, for example an (e.g., another) Macro or LPN cell, for UL communication or access. The search may be based on information provided by the cell (e.g., Macro cell) that may have been selected as a suitable (or suitable DL) cell or best (or best DL) cell and/or based on criteria such as legacy cell selection criteria. The information may be provided by the cell via signaling, such as broadcast signaling (e.g., in system information such as in one or more SIBs) or dedicated signaling.

The WTRU may, for example if the UL cell suitability criteria have not been met, use or continue to use a cell (e.g., Macro cell) for DL connectivity, given that the DL or legacy cell selection criteria have been met.

For cell reselection, a WTRU may monitor current UL conditions with neighboring cells (e.g., Macro and/or LPN cells) and perform UL (e.g., UL only) cell reselection if another cell may provide better UL conditions than the current one. For example, the cell selection criteria (e.g., for UL) may be based on pathloss measurements, and if a neighbor cell (e.g., LPN cell) pathloss is (e.g., is determined by the WTRU to be) an offset better than the current cell pathloss, then the WTRU may perform cell reselection (e.g., UL cell reselection). The WTRU may perform cell reselection monitoring based on information provided by the current cell, which may be used for DL communication (e.g., Macro cell) or UL communication (e.g., LPN), for example via signaling such as broadcast signaling (e.g., via system information which may be in SIBs) or dedicated signaling.

A WTRU may report (e.g., send in a message) the selected UL cell (or LPN) to the selected DL or legacy cell (e.g., the Macro) and/or its selected DL or legacy cell to its selected UL cell. The WTRU may send the report upon, following, or as a result of selecting or reselecting (e.g., modifying its selection of) an UL (or DL) cell (e.g., a cell for UL or DL communication). The WTRU may report the cell ID of the selected cell. Report, send, and transmit may be used interchangeably. Report and send or transmit in a message may be used interchangeably.

Fully decoupled, fully decoupled operation, fully decoupled mode of operation, and other variations, may mean or may imply but not be limited to a scenario or operation in which uplink (e.g., all UL) channels may be associated with one cell and downlink (e.g., all DL) channels may be associated with another cell. For example, uplink (e.g., all uplink) channels, which may include PUCCH and PUSCH may be transmitted to a cell-A (e.g., LPN), while downlink (e.g., all downlink) channels such as PDSCH and (E)PDCCH may be received from a cell-B (e.g., Macro).

Partially decoupled, partially decoupled operation, partially decoupled mode of operation, and other variations may mean or may imply but not be limited to a scenario or operation in which at least one or more uplink channels may be associated with a cell-A (e.g., LPN) and at least one or more downlink channels (e.g., PDSCH and/or (E)PDCCH) may be associated with a cell-B (e.g., Macro) or both (e.g., cell-A and cell-B).

A PUCCH may be associated with both cell-A (e.g., LPN) and cell-B (e.g., Macro) according to the information type (e.g., HARQ-ACK, CSI, SR) that may be carried by the PUCCH. A PUCCH that may include HARQ-ACK that may correspond to a PDSCH may be sent to cell-B (e.g., Macro), while a PUCCH that may include SR may be sent to cell-A (e.g., LPN). In another example, (E)PDCCH may be associated with both cell-A (e.g., LPN) and cell-B (e.g., Macro) according to the DCI format (e.g., DCI format 0 and DCI format 1A). A WTRU may monitor/receive a (E)PDCCH that may include a DCI format such as DCI format 1A from a cell-B (e.g., Macro), for example since it may be related to downlink assignment. A WTRU may monitor/receive (E)PDCCH that may include a DCI format such as DCI format 0 from a cell-A (e.g., LPN), for example, since it may be related to uplink grant.

In another example partially decoupled scenario, at least one UL channel (or one UL channel that may be carrying certain information or a certain information type) may be associated with cell-A, but not cell-B, and at least one DL channel (or one DL channel carrying certain information or a certain information type) may be associated with cell-B, but not cell-A. An information type may include one or more of control information, certain control information, data, or certain data.

A WTRU may perform each of uplink communication and downlink communication with a different cell. The cell may be identified by physical cell-ID or virtual cell ID. In an example, the downlink communication may be performed with a first cell (e.g., Macro), and the uplink communication may be performed with a second cell (e.g., LPN). The first cell and second cell may have a different (or same) virtual cell ID or physical cell ID.

The first cell may be defined or configured as the cell with which a WTRU may perform or may have performed initial cell access. The first cell may be defined or configured as a cell with which a WTRU may perform or may have performed a random access procedure. The first cell may be defined or configured as a downlink cell in the decoupled mode of operation.

The second cell may be defined as the cell that may be or may have been configured via higher layer signaling. The second cell may be defined as an uplink cell in the decoupled mode of operation.

The first cell and the second cell may have (or use) a same frequency band. For example, the downlink frequency bands for the first cell and for the second cell may be the same and FDD may be used (e.g., to separate the cells). The first cell and the second cell may have (or use) different frequency bands. For example, the downlink frequency bands for the first cell and for the second cell may have (or use) a different frequency band.

A WTRU may detect the physical cell-ID for the first cell, e.g., via a synchronization channel, and the physical cell-ID for the second cell may be signaled, e.g., via higher layer signaling. A WTRU may detect the physical cell-ID for the first cell, e.g., via a synchronization channel, in a frequency band, and the WTRU may detect the physical cell-ID for the second cell, e.g., via a synchronization channel, in another frequency band.

Downlink communication (e.g., by a WTRU) may include one or more of receiving PDSCH, monitoring (E)PDCCH associated with the PDSCH, and/or sending HARQ-ACK corresponding to the PDSCH. Receiving downlink signals and sending HARQ-ACK corresponding to the downlink signals may be from and/or to (or based on) the first cell (e.g., Macro).

A WTRU may receive and/or monitor (E)PDCCH associated with PDSCH (e.g., DL assignment) from the first cell. A WTRU may assume that the PDSCH, (E)PDCCH associated with the PDSCH, and/or HARQ-ACK corresponding to the PDSCH are from/to a quasi-collocated transmission point. The same time/frequency offset may be used for demodulation (e.g., of one or more of these channels). For HARQ-ACK transmission, the timing advance may be applied (e.g., by the WTRU) according to a downlink timing reference, which may be of (or determined from the DL timing of) the first cell.

Uplink communication (e.g., by a WTRU) may include one or more of monitoring (E)PDCCH, which may be associated with a PUSCH, transmitting PUSCH, and/or receiving HARQ-ACK, which may correspond to the PUSCH. Monitoring (E)PDCCH associated with a PUSCH, transmitting PUSCH, and/or receiving HARQ-ACK corresponding to the PUSCH may be from/to (or based on) the second cell (e.g., LPN).

The downlink timing of the second cell may be used (e.g., by the WTRU) as an uplink timing reference (e.g., for transmission to the first and/or second cell). For example, when an uplink timing advance value may be applied (e.g., by the WTRU), the timing reference may be the downlink timing of the second cell. The downlink timing of the first cell may be used (e.g., by the WTRU) as an uplink timing reference (e.g., for transmission to the first and/or second cell. The uplink timing reference (e.g., for the first and/or second cell) may be indicated via higher layer signaling. The indication may be (e.g., to use for the UL timing reference) one of the downlink timing of the first cell and the downlink timing of the second cell.

A PUCCH may be transmitted to cell-A (e.g., Macro) or cell-B (e.g., LPN) according to the message type included in the PUCCH. The message type may be defined as a PUCCH format (e.g., 1/1a/1b/2/2a/2b/3). The target cell to which a WTRU may transmit a PUCCH may be determined according to the PUCCH format.

If a PUCCH may include HARQ-ACK that may correspond to a PDSCH from cell-A (e.g., Macro), the PUCCH may be transmitted (e.g., by the WTRU) to the cell-A (e.g., Macro). If a PUCCH may include a positive scheduling request (SR), the PUCCH may be transmitted (e.g., by the WTRU) to a cell-B (e.g., LPN). For example, the PUCCH formats that may include HARQ-ACK may be transmitted (e.g., by the WTRU) to the cell from which a WTRU may receive or may have received a corresponding PDSCH. For example, if a WTRU may receive a PDSCH from cell-A (e.g., Macro), the cell-A may be the target cell for the PUCCH formats including HARQ-ACK (e.g., PUCCH format 1a/1b/2a/2b/3). The PUCCH formats that may include SR (e.g., positive SR) may be transmitted (e.g., by the WTRU) to the cell (e.g., LPN) which may be configured or determined as an uplink cell (or as a cell for UL communication), e.g., in a decoupled mode of operation.

HARQ-ACK and positive SR may not be transmitted in the same PUCCH in the decoupled mode of operation or in other scenarios. For example, PUCCH format 1a may be used for 1-bit HARQ-ACK with positive SR (e.g., in FDD) if a WTRU may be in the coupled mode of operation. PUCCH format 1a may be used for (e.g., only for) 1-bit HARQ-ACK (e.g., in FDD) if a WTRU may be in the decoupled mode of operation. For example, the positive SR may not be multiplexed (e.g., in PUCCH format 1a) in the decoupled mode of operation. A WTRU may use PUCCH format 1 for positive SR transmission. If a WTRU may or may need to transmit a HARQ-ACK and a positive SR in the same uplink subframe, the WTRU may drop the positive SR in the subframe and transmit the HARQ-ACK, e.g., to the cell-A (e.g., Macro) in the subframe. The WTRU may drop the HARQ-ACK and transmit the positive SR, e.g., to cell-B (e.g., LPN) in the subframe.

A PUSCH may be transmitted (e.g., by a WTRU) to either cell-A (e.g., Macro) or cell-B (e.g., LPN) according to the message type included in (or intended to be included in) the PUSCH. The message type may be defined according to the existence of UCI in the message.

If a PUSCH may include UCI, the PUSCH may be transmitted (e.g., by the WTRU) to the cell-A (e.g., Macro). If a PUSCH may not include UCI, the PUSCH may be transmitted (e.g., by the WTRU) to the cell-B (e.g., LPN). A WTRU may (or may only) transmit PUSCH to one cell at a time, e.g., in a subframe or TTI. If a PUSCH may include UCI, the PUSCH may not include unicast traffic in the decoupled mode of operation.

If a WTRU may have or may be scheduled for UCI and UL unicast traffic together (e.g., in the same subframe or TTI) the WTRU may drop the unicast traffic and may (e.g., may only) transmit the UCI. If a WTRU may have or be scheduled for UCI and UL unicast traffic together (e.g., in the same subframe or TTI) a WTRU may consider this as an error case. A WTRU may transmit one of the types of traffic to one of the cells or may not transmit PUSCH (e.g., any PUSCH). If a PUCCH may include a UCI including HARQ-ACK, a WTRU may transmit HARQ-ACK (e.g., may only transmit HARQ-ACK). A WTRU may use at least one of PUCCH or PUSCH for HARQ-ACK transmission, e.g., if a WTRU may have HARQ-ACK to transmit.

If a PUSCH may include a HARQ-ACK, the PUSCH may be transmitted (e.g., by the WTRU) to the cell-A (e.g., Macro). If a PUSCH may not include a HARQ-ACK, the PUSCH may be transmitted (e.g., by the WTRU) to the cell-B (e.g. LPN).

If a PUSCH may include a HARQ-ACK, the PUSCH may not include unicast traffic in the decoupled mode of operation. The WTRU may drop HARQ-ACK and/or UL unicast data which may be scheduled for the same transmission time (e.g., subframe or TTI).

Same time (e.g., transmission time, subframe, TTI) may be replaced by overlapping times (e.g., transmission times, subframes, TTIs) and still be consistent with the principles disclosed herein.

A PDCCH (or EPDCCH) may be monitored/received (e.g., by a WTRU) from either cell-A (e.g., Macro) or cell-B (e.g., LPN) according to the DCI format which may be carried by the PDCCH (or EPDCCH). In an example, if a WTRU may attempt to decode a DCI format which may be related to uplink grant (e.g. DCI formats 0 and/or 4), the WTRU may monitor PDCCH (or EPDCCH) based on the configuration of the cell-B (e.g., LPN). The WTRU may monitor PDCCH (or EPDCCH) based on the configuration of the cell-A (e.g., Macro) if the WTRU may attempt to decode a DCI format which may be related to downlink grant.

The configuration of a cell for PDCCH (or EPDCCH) monitoring may include a Physical cell-ID (PCI); CRS configurations, such as the number of CRS port and v-shift; a MBSFN pattern; and/or EPDCCH configurations, which may include one or more of resource allocation, mode of operation (e.g., localized or distributed), and EPDCCH starting symbol.

A WTRU may monitor PDCCH with the number of CRS ports and/or v-shift of the CRS based on the cell-A (e.g., Macro) if the DCI format the WTRU may attempt to decode may belong to the cell-A. The WTRU may monitor PDCCH with the number of CRS ports and/or v-shift of the CRS based on the cell-B (e.g., LPN) if the DCI format the WTRU may attempt to decode may belong to the cell-B. A WTRU may assume that the number of CRS ports may be the same for both cell-A and cell-B.

The cell to which a DCI format may belong (e.g., for a WTRU) may be predefined, implicitly defined according to a predefined condition, and/or configured via higher layer signaling. For example, DCI formats for UL grants may belong to cell-B (e.g., LPN) and/or DCI formats for DL grants may belong to cell-A (e.g., Macro).

A WTRU may monitor EPDCCH in an EPDCCH resource set (e.g., EPDCCH resource set A) that may be configured for cell-A, for example, if the DCI format the WTRU may attempt to decode may belong to the cell-A and/or the WTRU may monitor EPDCCH in another EPDCCH resource set (e.g., EPDCCH resource set B) that may be configured for the cell-B, for example, if the DCI format the WTRU may attempt to decode may belong to the cell-B.

The EPDCCH resource set A and the EPDCCH resource set B may be partially or fully overlapped in a time/frequency resource (e.g., PRB). If a WTRU may or may need to monitor EPDCCH in both EPDCCH resource sets, the WTRU may prioritize one of the EPDCCH resource sets, e.g., according to the DCI format the WTRU may attempt to decode.

The EPDCCH resource set A and the EPDCCH resource set B may be mutually orthogonal in the time domain and/or the frequency domain, and the WTRU may assume that there is no resource collision between the EPDCCH resource set A and the EPDCCH resource set B.

The EPDCCH resource set A and the EPDCCH resource set B may be configured independently. The EPDCCH resource set A may be configured as localized mode, and the EPDCCH resource set B may be configured as distributed mode. A WTRU may attempt to decode a DCI format which may be associated with DL (e.g., DCI format 2) in the EPDCCH resource set A based on the localized mode of operation and/or the WTRU may attempt to decode another DCI format which may be associated with UL (e.g., DCI format 0) in the EPDCCH resource set B based on the distributed mode of operation.

In another solution, a WTRU may monitor a PDCCH or an EPDCCH according to the direction of communication (e.g., DL or UL) with which the DCI format may be associated. For example, a WTRU may decode or attempt to decode a DCI format which may be associated with UL communication (e.g., a DCI format that may include an uplink grant such as DCI formats 0 and/or 4) in the PDCCH region (or EPDCCH region) of (or based on the configuration of) cell-B (e.g., LPN) and/or the WTRU may decode or attempt to decode a DCI format which may be associated with DL communication (e.g., a DCI format that may include a downlink grant such as DCI formats 1A, 2, and others) in the EPDCCH region (or PDCCH region) of (or based on the configuration of) the cell-A (e.g., Macro). The configuration of cell-A and/or cell-B may include signals and/or parameters that may enable the WTRU to locate and/or decode the PDCCH and/or EPDCCH of the (or each) cell.

The WTRU may monitor and/or attempt to decode one or more DCI formats which may be associated with one direction of communication (e.g., DL or UL) in the PDCCH WTRU-specific search space and one or more DCI formats which may be associated with the another direction of communication (e.g., UL or DL) in the EPDCCH WTRU-specific search space. This may apply (e.g., only apply) if the WTRU may (or may need to) monitor and/or attempt to decode DCI formats for both uplink and downlink communications, e.g., for decoupled mode operation.

The common search space may be configured in the PDCCH region (e.g., only in the PDCCH region). A WTRU may (e.g., irrespective of the direction of communication which may be associated with a cell) monitor the PDCCH region (e.g., of the cell, such as cell-A and/or cell-B) for a (e.g., any) DCI that may carry one or more of system information (e.g., using SI-RNTI), random access response (e.g., using RA-RNTI), and/or paging (e.g., using P-RNTI).

A WTRU may be configured with C-RNTI independently for uplink and downlink communication. For example, a C-RNTI for downlink communication (e.g., DL-C-RNTI) may be assigned during RACH procedure and/or a C-RNTI for uplink communication (e.g., UL-C-RNTI) may be configured via higher layer signaling. A WTRU may receive or monitor PDCCH (or EPDCCH) based on the type of C-RNTI.

A WTRU may monitor a control region (e.g., PDCCH or EPDCCH region) for a DCI that may be scrambled with DL-C-RNTI. The WTRU may monitor another (or the other) control region (e.g., EPDCCH or PDCCH region) for a DCI that may be scrambled with UL-C-RNTI. For example, when a WTRU may monitor and/or attempt to decode a DCI that may be scrambled with DL-C-RNTI, the configuration for PDCCH or EPDCCH may be based on the cell associated with DL communication. When a WTRU may monitor and/or attempt to decode a DCI which may be scrambled with UL-C-RNTI, the configuration for PDCCH or EPDCCH may be based on the cell associated with UL communication.

The search space may be defined as a function of DL-C-RNTI and/or UL-C-RNTI. The search space may be different for the DCI that may be scrambled with DL-C-RNTI and the DCI that may be scrambled with UL-C-RNTI.

In a decoupled mode of operation, an uplink communication and a downlink communication may have a different coverage as the associated cell may be different. Coverage enhancement level may be applied separately according to the direction of communication. The link adaptation may or may need to be implemented or performed differently according to the mode of operation.

Coverage limited mode of operation may be applied in one direction of communication (e.g., DL or UL) or both (e.g., DL and UL) directions, for example, according to the channel conditions such as the channel conditions in the different directions in the decoupled mode.

For example, a WTRU, such as one configured with or operating in the decoupled mode, may be configured with and/or operate in a coverage limited mode of operation for one direction of communication (e.g., DL) while the other direction of communication (e.g., UL) may use or be in non-coverage limited mode of operation. The coverage limited mode of operation may include the use of coverage enhancement transmission schemes, such as repetitions, TTI bundling, and/or PSD boosting of data and/or control channels. The non-coverage limited mode of operation may include legacy transmission schemes used for LTE device (e.g., coverage enhancements schemes may not be used).

The timing for HARQ procedures may be according to the coverage limited mode of operation for both downlink and uplink although uplink may not be configured as coverage limited mode of operation. The pathloss for uplink power control may be obtained from associated uplink LPN if the uplink may be configured with a non-coverage limited mode of operation while the downlink may be configured with a coverage limited mode of operation.

A WTRU, such as one configured with or operating in the decoupled mode, may be configured with a coverage limited mode of operation for both downlink and uplink. The coverage limitation level may be different for downlink and uplink. The coverage limited mode of operation may be configured separately for downlink and uplink. The number of repetitions for PDSCH for coverage enhancement may be separately configured from the number of repetitions for PUSCH for coverage enhancement. The TTI bundling size may be different between uplink and downlink.

Coverage enhancement mode may be used differently according to the physical channel type, included information type, and/or the transmission point (e.g., Macro or LPN) to which a WTRU transmits.

An uplink and/or a downlink channel may be repeated over multiple subframes to improve coverage of the channel, and/or the number of repetitions (and/or PSD boosting) may be different according to the coverage enhancement (CE) level. For example, up to a certain number (e.g., four) of CE levels may be supported for an uplink or a downlink channel, and the first CE level (e.g., CE level 1) may be no repetition. The second CE level (e.g., CE level 2) may use a certain number (e.g., five) of repetitions. The third and fourth CE levels (e.g., CE level 3 and CE level 4) may use certain repetitions (e.g., 10 and 20 repetitions, respectively).

The number of CE levels and the number of repetitions are non-limiting examples. Any numbers of CE levels and/or repetitions may be used and still be consistent with the principles disclosed herein.

The CE level examples described herein may apply to partially decoupled mode scenarios (and/or fully decoupled mode scenarios).

The CE level (e.g., for a PUCCH format) may be configured or determined (e.g., independently) according to the message type that may be included in the PUCCH, e.g., in the decoupled mode of operation. The same CE level may be applied for certain (e.g., all) PUCCH formats in the coupled mode of operation or in other cases.

The message type may be defined as (or based on) the PUCCH format but may not be limited to the PUCCH format. The message type may be defined as or based on the PUCCH contents.

The CE level for a PUCCH format that may include HARQ-ACK may be configured or determined based on the coverage limitation level of cell-B (e.g., Macro). The CE level for a PUCCH format that may include positive SR may be configured or determined based on the coverage limitation level of the cell-A (e.g., LPN).

One or more of PUCCH formats 1a/1b/2/2a/2b/3 may be configured with or determined to have the same CE level. A subset of PUCCH formats may be supported for HARQ-ACK transmission in the decoupled mode of operation. For instance, PUCCH format 1a may be (e.g., the only PUCCH format) supported in the decoupled mode. PUCCH format 1a/2 may be (e.g., the only PUCCH formats) supported in the decoupled mode.

PUCCH format 1 may be configured with or determined to have a CE level that may be smaller than the CE level for other PUCCH formats.

The CE level for the PUCCH formats that may include HARQ-ACK may be determined by the WTRU during the PRACH procedure. The CE level for the PUCCH format that may include positive SR may be configured by higher layer signaling. For example, the CE level for the PUCCH format that may include HARQ-ACK may be determined from (e.g., may be determined to be the same as) the CE level which may be (or may have been) used for the PRACH preamble transmission from which the WTRU may have received RAR successfully. The CE level for the PUCCH format including positive SR may be configured by higher layer signaling, e.g., when the WTRU may be configured to operate decoupled mode.

The CE for a PUCCH (and/or PUSCH) may be determined or configured based on the target cell for the PUCCH (and/or PUSCH) transmission. For example, if a PUCCH (and/or PUSCH) may be transmitted to a target cell, cell-A (e.g., Macro), the CE level may be based on the cell-A. If a PUCCH may be transmitted to a target cell, cell-B (e.g., LPN), the CE level may be based on the cell-B.

The CE level for PUCCH (and/or PUSCH) may be determined or configured based on the physical or virtual cell-ID for the PUCCH (and/or PUSCH) transmission. The CE level may be determined or configured as a function of WTRU ID which may be used for uplink transmission.

Transmission of a PUCCH and/or PUSCH may be by a WTRU.

Determination of and/or use of a CE level for a channel (e.g., PUCCH and/or PUSCH) may be by a WTRU. Configuration of a CE level (e.g., for use by a WTRU) which may be for a channel (e.g., PUCCH and/or PUSCH) may be by a cell. The WTRU may receive such configuration from the cell, e.g., via signaling such as higher layer signaling.

A CE level for a channel may be the CE level the WTRU may use when transmitting or receiving that channel. A cell in communication with the WTRU may use the same CE level for that channel when communicating with the WTRU.

A CE level for a cell may be the CE level the WTRU may use when communicating with the cell, for example, for a certain one or more channels.

The CE level for a PUSCH transmission may be determined based on a predefined condition, such as the existence of the UCI in the PUSCH. For example, a PUSCH that may include UCI may be transmitted with a certain CE level that may be determined for a cell-B (e.g., Macro) and/or a PUSCH that may not include UCI may be transmitted with another CE level which may be determined for a cell-B (e.g., LPN). The predefined condition may be the physical or virtual cell-ID of the cell to which the PUSCH may be transmitted. A PUSCH that may be transmitted to the cell-A may use one CE level (e.g., CE level 2). A PUCCH transmitted to the cell-B may use another CE level (e.g., CE level 4).

The CE level for each cell (e.g., for PUSCH transmission) may be configured or determined independently (e.g., for or by the WTRU). The CE level for the cell-B (e.g., Macro) may be determined (e.g., by the WTRU) during a RACH procedure. The CE level may be (or may be based on) the CE level the WTRU may use or may have used for the PRACH preamble transmission for which the WTRU may receive or may have received RAR successfully. The CE level for the cell-A (e.g., LPN) may be configured via higher layer signaling from the cell-B. The CE level for the cell-A (e.g., LPN) may be determined (e.g., by the WTRU) during a RACH procedure that may target cell-A. This RACH procedure may be separate from a RACH procedure for the cell-B.

The CE level for each cell may be configured by one of the cells (e.g., the cell-B). The CE level for each cell may be signaled by higher layers, e.g., after RRC connection setup, where the RRC connection setup may be with one of the cells (e.g., cell-B).

The CE level for a PUSCH transmission may be indicated by or in the associated (E)PDCCH for the PUSCH (e.g., which may include the UL grant for the PUSCH).

The associated (E)PDCCH for the uplink grant may include an indication, e.g., an explicit indication (e.g., one or more bits), of the CE level (e.g., that the WTRU may use) for the corresponding PUSCH transmission. One or more of the CE levels supported and the CE level to use may be indicated in the DCI format that may be used for uplink grant.

The associated (E)PDCCH for the uplink grant may implicitly indicate the CE level for the PUSCH transmission.

A CE level dependent C-RNTI may be used. For example, C-RNTI-1 may be used to indicate CE level-1, C-RNTI-2 may be used to indicate CE-level-2, and so on. There may be a one-to-one mapping between C-RNTI and CE level. The (E)PDCCH search space may be partitioned, and each partition may correspond to a certain CE level. If a WTRU may receive an uplink grant in a certain (E)PDCCH search space partition, the partition may implicitly indicate the CE level for the PUSCH transmission. Two or more (E)PDCCH search spaces may be configured for uplink communication, and each (E)PDCCH search space may correspond to (or may be configured with) a certain CE level. If a WTRU may receive a DCI for uplink communication, the CE level for the PUSCH transmission may be determined based on the search space from which the WTRU received the DCI. The CE level of the associated (E)PDCCH for the uplink grant may be used as the CE level for the PUSCH transmission.

The CE level for a (E)PDCCH transmission may be determined based on the search space in which a WTRU may attempt to decode a DCI. The CE level for a (E)PDCCH transmission may be the CE level that the cell may use for transmission and/or the WTRU may use for monitoring and/or reception of the (E)PDCCH.

Two or more (E)PDCCH search spaces may be configured and CE level for each search space may be configured. A WTRU may attempt to decode a (E)PDCCH candidate in a certain (E)PDCCH search space based on, e.g., using) the CE level configured. In an example, two (E)PDCCH search spaces may be respectively configured with a first and second CE level (e.g., CE level-1 and CE level-3). A WTRU may attempt to decode a DCI in the first (E)PDCCH search space with (e.g., using or according to) the first CE level (e.g., CE level-1), and the WTRU may attempt to decode a DCI in the second (E)PDCCH search space with (e.g., using or according to) the second CE level (e.g., CE level-3). Higher layer signaling may be used to configure the CE level for each search space.

An (E)PDCCH search space may be partitioned with multiple subsets. A subset may be configured with a certain CE level. A WTRU may attempt to decode a (E)PDCCH candidate in a (E)PDCCH subset based on (e.g., using) the CE level, which may be configured.

The CE level for a (E)PDCCH transmission may be determined based on the DCI format, which may be carried in the (E)PDCCH. The CE level for one or more DCI formats that may be associated with the downlink communication (e.g., DCI format 1A/2/2A/2B/2C) may be determined based on the CE level for the cell-B (e.g., Macro). The CE level for one or more DCI formats that may be associated with the uplink communication (e.g., DCI format 0/4) may be determined based on the CE level for the cell-A (e.g., LPN). The CE level for one or more DCI formats that may be associated with the downlink communication may be determined by the cell-B (e.g., Macro). The CE level for one or more DCI formats that may be associated with the uplink communication may be determined by the cell-A (e.g., LPN). The CE level for one or more DCI formats that may be associated with the downlink communication may be determined during a RACH procedure. For example, the CE level which may be used by a WTRU for the PRACH preamble transmission for which the WTRU may receive a RAR successfully may be or may determine the CE level for the DCI formats which may be associated with the downlink (or UL) communication. The CE level for one or more DCI formats which may be associated with the uplink (or DL) communication may be configured via higher layer signaling.

A node (e.g., Macro eNB and/or LPN) may need to detect, know, or be informed whether a WTRU falls under channel conditions that may warrant decoupled or coupled operation, for example, for proper system operation. These channel conditions may be referred to as decoupled and coupled channel conditions, respectively.

Selected downlink cell, suitable downlink cell, best downlink cell, and cell for DL communication, may be used interchangeably. Macro cell (or LPN cell) may be the selected, suitable, or best DL cell. Macro cell (or LPN cell) may be the cell used for DL communication. Macro (or LPN) or Macro (or LPN) cell may be used interchangeably with selected, suitable, and best DL cell.

Selected UL cell, suitable UL cell, best UL cell, and cell for UL communication may be used interchangeably. LPN cell (or Macro cell) may be the selected, suitable, or best UL cell. LPN cell (or Macro cell) may be the cell used for UL communication. LPN (or Macro) or LPN (or Macro) cell may be used interchangeably with selected, suitable, and best UL cell.

PRACH resources may be partitioned to indicate whether a WTRU may have decoupled channel conditions. Decoupled channel conditions may include, but are not limited to, a scenario in which a WTRU's uplink cell (e.g., selected UL cell) may be different from its DL cell (e.g., selected downlink cell), for example after cell selection and/or reselection (e.g., separate cell selection and/or reselection) procedures for uplink and downlink.

PRACH resources may be partitioned by one or more of preamble (e.g., preamble subset or set), time and/or frequency such that one or more certain (e.g., reserved) PRACH resources may be used to indicate whether a WTRU may have decoupled channel conditions. One or more certain (e.g., reserved) PRACH resources may be used, e.g., by a WTRU, if the WTRU (e.g., low-cost WTRU) selects decoupled mode described herein (e.g., if the WTRU found a cell which may have better uplink coverage as compared with that of its selected DL cell or the Macro or if the WTRU selects different UL and DL cells or different cells for UL and DL communication).

A WTRU (e.g., a low-cost or coverage limited WTRU) may measure downlink signals from cells (e.g., hearable cells, available cells, cells in proximity, or identified cells such as by a list) and if a (e.g., the best) measurement (e.g., of signal power or RSRP) of those cells meets a certain criterion, e.g., is lower than a threshold, the WTRU may consider itself as a coverage limited WTRU. The WTRU may select the cell with a certain (e.g., the best) measurement, for example as its selected DL cell. The threshold that may differentiate a coverage limited WTRU from a non-coverage limited WTRU may be predefined, and/or the threshold may be configured via higher layer signaling such as broadcast channels or signaling.

The WTRU may (e.g., may then) check whether the cell (e.g., selected DL cell) supports a decoupled mode (e.g., based on signals that may be broadcast from the cell). The WTRU may (e.g., may then), for example, if the cell supports decoupled mode, measure (or estimate or determine) uplink pathloss (or may measure, estimate or determine downlink pathloss that it may use for an uplink pathloss estimate or equivalent), for example, to determine if there may be another cell that may have or provide better uplink coverage (e.g., for the WTRU).

The WTRU may, for example, based on UL or DL pathloss, select an UL cell that it may consider to have better uplink coverage, for example, the cell with the lowest UL or DL pathloss.

The WTRU may select and/or use at least one of the certain (or reserved) PRACH resources to indicate the decoupled channel condition for the WTRU, e.g., to the eNB of the DL and/or UL selected cell. The WTRU may transmit PRACH on at least one of the certain (or reserved) PRACH resources, e.g., to the eNB of the selected DL cell and/or the selected UL cell.

The certain (or reserved) PRACH resources, which may be used to indicate decoupled channel conditions, may be provided via broadcast channels or signaling. These resources may be independent (or separate) from the PRACH resources that may be used for coupled mode or by a (e.g., legacy) LTE WTRU, e.g., one that may not operate in, consider operating in, or intend to operate in decoupled mode. The certain (or reserved) PRACH resources that may be used to indicate decoupled channel conditions, may be predefined. A WTRU may be informed, e.g., via higher layer signaling, such as broadcast (or dedicated) signaling whether a node or the network supports decoupled mode.

The certain (or reserved) PRACH resources, which may be used to indicate decoupled channel conditions, may be provided to the WTRU via higher layer signaling, such as broadcast or dedicated signaling. The resources may be provided by the selected DL cell or the selected UL cell. The resources may be used for PRACH transmission to the selected DL cell or the selected UL cell, e.g., to indicate that the WTRU has decoupled channel conditions.

The resources may be predefined or provided by the selected DL cell (e.g., the Macro) and the WTRU may transmit the PRACH to the selected DL cell (e.g., the Macro) using at least one of those resources. The WTRU may indicate it has decoupled channel conditions to the selected DL cell, for example, by using these resources.

The resources to use on the selected UL cell (e.g., the LPN) may be predefined, provided by the selected DL cell (e.g., the Macro), or provided by the selected UL cell (e.g., the LPN), and the WTRU may transmit the PRACH to the selected UL cell (e.g., the LPN) using at least one of those resources. The WTRU may indicate it has decoupled channel conditions to the selected UL cell, for example by using these resources.

The WTRU may transmit the PRACH during or as part of a random access procedure such as a random access procedure for connection establishment.

Higher layer signaling (e.g., RRC signaling) may be used to indicate the decoupled channel condition, e.g., after RRC connection setup. Configuration information for decoupled mode may be provided via higher layer signaling, e.g., by an eNB to the WTRU, and the WTRU (e.g., low-cost WTRU) may switch from coupled mode to decoupled mode. The WTRU may perform a random access procedure, e.g., for connection establishment, to a node (e.g., Macro eNB) and that node may provide the configuration information for decoupled mode. The WTRU may, for example, in response to the receipt of the configuration information, switch to or begin operating in decoupled mode. The configuration information may include information related to one or more cells (e.g., additional cells) such as the LPN cell (or cells) to use in decoupled mode, e.g., the cell frequency, cell bandwidth, cell ID, among others.

In another solution, a WTRU may (or may always) attempt (e.g., first attempt) random access to a cell such as a suitable (e.g., suitable DL or legacy) cell, the cell with the best RSRP which may be the Macro cell, or the Macro cell. Upon (or following) failing random access x times, where x may be pre-configured or may be provided in broadcast signaling such as in system information (e.g., a SIB), the WTRU may determine to, or determine that it should, attempt decoupled mode random access. The WTRU may attempt non-coverage enhanced random access and/or coverage enhanced random access before determining to, or determining that it should, attempt decoupled mode random access. The value of x may be WTRU implementation specific. Coverage enhanced random access may include use of certain PRACH resources and/or repetition.

Decoupled mode random access may include performing random access to another cell (e.g., a selected UL cell such as a LPN cell), which may be different from the one that may have been selected, for example as a suitable (e.g., suitable DL or legacy) cell or different from the cell with the best RSRP, which may be the Macro cell, or different from the Macro cell. The WTRU may perform random access to both Macro and LPN, for example, simultaneously. Decoupled mode random access may include simultaneous random access to multiple cells such as the Macro and the LPN.

Upon (or following) failing random access after using maximum PRACH transmission power, for example to a certain cell (e.g., selected cell) such as the one which may have been selected as a suitable (e.g., suitable DL or legacy) cell or the cell with the best RSRP (which may be the Macro cell) or the Macro cell, a WTRU may determine to, or determine that it should, attempt decoupled mode random access.

The appropriate trigger that a WTRU may use to switch to decoupled operation (such as the value of x or the threshold) may be included in broadcast signaling such as a SIB, which may be transmitted by the selected DL cell or the Macro cell.

Handling or avoiding operation (e.g., WTRU operation) with a duplex separation (e.g., UL-DL band separation) which may be different from what may be expected (e.g., based on the Macro duplex separation), typical, or specified (e.g., based on current supported FDD bands) may be performed.

When the LPN uses a different DL-UL frequency pair or is on a different UL TDD frequency from that of DL Macro pair, the WTRU (e.g., FDD WTRU) may experience a frequency duplex separation while using Macro cell DL and LPN UL frequencies. This frequency duplex separation may be different from what may be expected (e.g., based on the Macro duplex separation), typical, or specified (e.g., based on current supported FDD bands).

A duplexer design may take into consideration the frequency separation between DL and UL that may be expected, typical, or specified, for example, for certain frequency bands. For example, a duplexer may be designed for a certain FDD carrier with a specific band separation. One or more of the LPN UL frequencies may fall into a lower separation value, which may cause a receiver self desense, e.g., due to the design of a duplexer that may take the frequency separation between DL and UL into consideration. The design of the duplexer may cause restrictions in the UL frequencies that the WTRU may use to have a DL-UL separation of at least the nominal band value. For example, band V may have 45 MHz DL-UL nominal separation. For band V, the WTRU may operate on UL frequencies that may be at least 45 MHz separated from the Macro cell DL frequency. Separation of lower than, e.g., 45 MHz may deteriorate receiver sensitivity. WTRU output power limitations may provide a non-nominal duplex separation. The LPN may operate at a different bandwidth than Macro cell, and the WTRU may change the transmitter bandwidth and the baseband sampling frequency.

There may be, for example as a result of duplexer limitations or receiver sensitivity, a frequency restriction (e.g., which may be imposed) for the uplink band (or frequencies) from the UL cell (e.g., LPN) such that the uplink frequency band (or frequencies) may be separated from the downlink frequency band by at least the specific band separation that may be assumed in coupled case.

One or more of frequency (e.g., UL or DL frequency or carrier frequency) selection, usage, or assignment may be limited to frequencies that a WTRU may use in order to have an appropriate or usable DL-UL separation, e.g., at least the nominal band value that may be based on the DL frequency band.

WTRU output power limitations may be used (e.g., by the WTRU) for (e.g., when using or operating with) a non-nominal duplex separation.

The LPN may operate with a different bandwidth than the Macro cell. The WTRU may change the (or use a different) transmitter bandwidth and/or baseband sampling frequency (e.g., from that or those that it may use to communicate with the Macro), for example, to communicate with the LPN when the LPN may operate with a different bandwidth than the Macro cell or in other cases.

Decoupled mode may be supported, for example, for the case that the frequency bands (or operating frequencies) may be different for LPN and Macro that may (e.g., may each) be in or using FDD or TDD. For example, if decoupled mode may be used with different frequency bands (or different carrier frequencies) for an LPN and Macro in TDD (or for one in FDD and the other in TDD), it may become (or the WTRU may use) FDD operation since the frequency band (or carrier frequency) may be different for uplink and downlink. A WTRU (e.g., a low-cost WTRU) that may be (or may be intended) for TDD may (or may need to), for example as a result of UL and DL having different frequencies or frequency bands in decoupled mode, implement a duplexer and/or use at least some aspects of FDD operation in decoupled mode.

Uplink cell search, half-duplex FDD mode, and/or WTRU measurements and channel feedback may be used for decoupled mode and/or may be applied if the frequency band (or carrier frequency) may be different for LPN and Macro (or for one or more directions of at least two nodes that may be used, for example by a WTRU, in decoupled mode). The WTRU may operate in decoupled mode with a simple or single transmitter or a single power amplifier (PA).

A WTRU (e.g., low-cost WTRU) that may support decoupled mode may report or inform its duplex capability to a node (e.g., a Macro or LPN). The duplex capability may be the minimum frequency separation the WTRU may be able to support for the band in which the WTRU is operating with the node. The node may assume the minimum frequency separation the WTRU may be able to support to be the DL-UL frequency separation for the band in which the WTRU and the node are operating, for example, when the WTRU is operating in FDD mode.

A node (e.g., a Macro or LPN) may, for example, upon (or following or as result of) receiving (or assuming, determining, or knowing) the duplex capability of a WTRU, indicate (e.g., to the WTRU) and/or configure (e.g., configure the WTRU with or for) a certain set or range of frequencies, e.g., which may be represented by E-UTRA Absolute Radio Frequency Channel Number (EARFCN), which may be used by the WTRU for a purpose such as uplink cell search, for example in or for decoupled mode. A set or range of frequencies (e.g., EARFCNs) that may not be used for a certain purpose such as uplink cell search, e.g., in or for decoupled mode, may be configured or informed to the WTRU by the node.

The set or range of frequencies (e.g., EARFCNs) may be replaced with a cell (e.g., LPN) list, e.g., for decoupled mode. The list may include the cells (e.g., LPNs), which may be represented by their cell IDs and associated information that may be used or needed for uplink cell search. The associated information (e.g., for each cell) may include but is not limited to one or more of frequency band or carrier frequency (e.g., EARFCN), duplex mode (e.g., FDD or TDD), bandwidth, and base station (e.g., cell) transmission power.

If there is no EARFCN which may be available within the duplex capability for the WTRU, the node (e.g., Macro) may configure the WTRU with fallback operation. The WTRU may autonomously select fallback operation. Coupled mode operation may be considered as a fallback operation. In coupled mode, a WTRU may assume that the uplink cell is the same as the selected downlink cell.

If there is no EARFCN which may be available within the duplex capability for the WTRU, the WTRU may try to reselect a downlink cell, such as one it may use in coupled mode or one that may have an associated node (e.g., LPN) that may provide enough frequency separation, e.g., for decoupled mode. The node (e.g., Macro) may indicate to the WTRU to perform the reselection or the WTRU may determine to do reselection.

If there is no EARFCN that may be available within the duplex capability for the WTRU, it may be considered, e.g., by the WTRU as radio link failure and the WTRU may perform (or restart from) cell search.

The duplex capability may be provided or reported as a reference frequency (e.g., EARFCN) that may have a minimum frequency (or band) separation that may be supported by the WTRU. For example, for a WTRU operating with a carrier frequency f1 and supporting a frequency separation of f2 (e.g., 45 MHz), the WTRU may report the value f1+f2.

The duplex capability may be informed as an actual value of band separation, for example f2.

A node (e.g., a Macro) may provide (e.g., broadcast) a list of cells or LPNs that may be used for uplink cell selection and may include frequency (or frequency band) information, for example with or in the list.

A WTRU may (e.g., may autonomously), for example based on (e.g., upon receiving, following receiving, or as a result of receiving) the list (e.g., via broadcast information), remove or exclude the cells or LPNs for which uplink band separation may be smaller than a certain amount (e.g., smaller than the separation for coupled mode) from the cells it may consider for UL communication when, for example performing UL cell selection and/or reselection.

If there is no cell (e.g., LPN) in the list that may provide frequencies (e.g., UL frequencies, enough frequencies, enough UL frequencies) within the duplex capability of the WTRU, the WTRU may assume that or may operate as if decoupled mode may not be supported in the cell (e.g., the cell or node that may have provided the list). A low-cost WTRU may try to reselect a downlink cell until it may find a pair of downlink and uplink cells with enough frequency separation. Upon (or following or as a result of) selection of an uplink cell, the WTRU may report (e.g., send a message or report) to the node (e.g., the Macro) to inform it which cell (e.g., LPN) the WTRU may have selected as an uplink cell. The WTRU may report the cell ID of the cell.

Transmission power limitation may be used (e.g., by a WTRU) if the band separation for decoupled mode (e.g., of the WTRU) may be less than a certain separation such as the band separation or the minimum band separation of coupled mode (e.g., for the WTRU). In an example, a WTRU may detect (or determine) an inappropriate (e.g., too small) frequency separation. If the WTRU may detect (or determine) an inappropriate (e.g., too small) frequency separation that may be resolved through limitation of its output power, the WTRU may limit its power accordingly and/or the WTRU may report its maximum allowed transmit power (e.g., for that particular UL frequency), for example to a node (e.g., the Macro). For example, if the nominal band separation, e.g., for coupled mode, may be a certain value, such as 45 MHz, and the selected UL cell (or the cell for UL communication), e.g., the LPN, may use an UL frequency that may correspond to a lower separation (e.g., 40 MHz), the WTRU output power limitation (e.g., by the WTRU) may be a certain maximum value such as 20 or 17 dBm, for example to compensate for the lack of or reduced separation. The WTRU may limit its output power by this value when transmitting to the UL cell. The WTRU may report this maximum power value to one or more nodes with which it may communicate (e.g., the Macro and/or LPN).

A WTRU may determine and/or have a maximum power limit that may be used (e.g., by the WTRU) when the band separation between UL and DL, e.g., for decoupled mode, may be lower than a certain value such as the band separation for coupled mode. The maximum power limit may be referred to as Pcmax,d and may be cell specific or node specific or there may be a cell specific (e.g., for each cell) and a node specific limit that may have the same or different values.

If the WTRU maximum power limitation, e.g., Pcmax,d, may be lower than the one supported through deployment by the LPN (e.g., Pcmax or Pcmax,c), the WTRU may report power headroom (PH) based on its own maximum allowed power (e.g., Pcmax,d).

For PH calculation, determination and/or reporting for a cell (e.g., an UL cell which may be the LPN), the WTRU may use as the maximum power the smaller of the ordinary calculated Pcmax,c for the cell and the maximum power limitation for reduced UL-DL band separation, e.g., Pcmax, d. Pcmax,d may be incorporated into the Pcmax,c equation to accomplish the equivalent. PH may be the maximum power minus the calculated transmit power. The minimum of Pemax,c (e.g., signaled maximum power) and Pcmax,d may be used in the power control and/or power headroom calculation, e.g., in place of Pemax,c. Pcmax,d may be incorporated into the Pcmax,c equation to accomplish the equivalent. When its own allowed power (e.g., Pcmax,d) may be exceeded, the WTRU may report a negative power headroom, for example when the WTRU power may still be under the maximum (e.g., maximum LPN) power which may be determined excluding consideration for band separation (e.g., Pcmax and/or Pcmax,c).

The WTRU may use the Power Management Reduction (e.g., P-MPR) bit in the PHR that may be associated with a half FDD operation to signal the power limitation for the half duplex FDD case.

A first node (e.g., Macro) may select another node or cell (e.g., LPN) as an uplink cell for a WTRU which may be configured for or operating in (or which may need or intend to operate in) decoupled mode. The first node may select the other node or cell based on at least one of PRACH preamble detection, duplex capability information, e.g., reported from WTRU, or the band separation which may be used for or by the first node's operating band, e.g., in coupled mode.

A WTRU may report its duplex capability to a node (e.g., Macro) such as in a capabilities message. The WTRU may be configured with an uplink cell from or by its selected downlink cell.

Half duplex FDD (HD-FDD) mode may be used for or by a WTRU (e.g., low-cost WTRU) in a TDD network. This may apply for decoupled operation of or by the WTRU, for example, if the frequency band for the nodes or cells (e.g., LPN and/or Macro) with which the WTRU may communicate may be different.

A TDD network may be a set of one or more nodes that may use frequencies typically reserved for TDD operation. A TDD network may be a set of one or more nodes (e.g., a Macro and a LPN) where the nodes may use or operate in TDD mode for coupled operation.

A TDD WTRU may be a WTRU that may be capable of operating in at least a TDD mode or with a TDD air interface, for example, when communicating with one or more cells and/or nodes.

A TDD WTRU (e.g., low-cost WTRU) may report or indicate its HD-FDD capability, e.g., to a node (e.g., Macro or LPN). If the WTRU may have capability for HD-FDD and may use decoupled mode, the WTRU may perform a cell selection procedure (e.g., separately) for uplink and downlink.

A WTRU may determine the TDD subframe configuration for the Macro and/or LPN. The WTRU may assume that the Macro and the LPN may have the same TDD subframe configuration and the subframe configuration may be acquired from a broadcasting channel or information from the Macro. The WTRU may assume that the uplink subframe configuration of the LPN is at least the same as that for Macro or a subset of the uplink subframes of the Macro.

The WTRU may receive broadcasting channels or information from both the Macro and the LPN. If the TDD subframe configuration may be different between the Macro and the LPN, priority (e.g., predefined priority) rules may be applied to determine the direction that the WTRU may use for the subframes. The downlink subframes in the Macro may have higher priority than the uplink subframes in the LPN. The uplink subframes in the LPN may have higher priority than downlink subframes in the Macro.

A WTRU (e.g., a low-cost WTRU) may select a duplex mode of operation between TDD and HD-FDD upon (or following or as a result of) selecting a downlink cell and/or uplink cell. The WTRU may select a downlink cell based on certain (e.g., predefined) criteria. If a measured signal (or signals) may satisfy a certain (e.g., predefined) condition (e.g., coverage limited condition), the WTRU may perform an uplink cell selection procedure. Upon (or following or as a result of) selecting an uplink cell, the WTRU may select TDD or HD-FDD operation. The WTRU may select TDD if the selected uplink cell is the same as the selected downlink cell. The WTRU may select HD-FDD otherwise. If the WTRU selects HD-FDD, it may indicate or report its capability (e.g., duplex capability) as HD-FDD. If the WTRU selects TDD, it may indicate or report its capability (e.g., duplex capability) as TDD and/or HD-FDD (e.g., both TDD and HD-FDD).

For operation, e.g., HD-FDD operation, of a WTRU, e.g., a TDD WTRU that may be a low-cost WTRU, which may use, or be operating in or with, decoupled mode, a guard subframe may be used for the switching between uplink and downlink. For example, $N_{guard}$ subframes may be used between uplink and downlink subframes where $N_{guard}$ may be a positive integer number (e.g., 1). $N_{guard}$ may be a predefined number, or may be configured via higher layers, or may be implicitly configured, for example according to the downlink and/or uplink subframe configuration. The guard subframe may be introduced for (e.g., only for) the case of switching from downlink to uplink.

For operation, e.g., HD-FDD operation, of a WTRU, e.g., a TDD WTRU that may be a low-cost WTRU, which may use, or be operating in or with, decoupled mode, the uplink and downlink subframe switching may be based on radio frame number (e.g., SFN). For example, even numbered radio frames may be used for downlink, and odd numbered radio frames may be used for uplink. The guard subframe(s) may be introduced in the $N_{guard}$ last subframes in the downlink radio frames.

For operation, e.g., HD-FDD operation, of a WTRU, e.g., a TDD WTRU that may be a low-cost WTRU, which may use, or be operating in or with, decoupled mode, the TDD operation may be considered as default mode, and HD-FDD mode may be used based on configuration. A WTRU (e.g., low-cost WTRU) may operate with TDD mode until configured (e.g., by the eNB) for HD-FDD mode, e.g., via higher layer signaling, such as RRC signaling. The configuration may be provided during or after RRC connection establishment.

HD-FDD mode may be used for or by a WTRU (e.g., a low-cost WTRU) in an FDD network. This may apply for decoupled operation, for example, if the frequency band for the nodes or cells (e.g., LPN and/or Macro) with which the WTRU may communicate may be different.

An FDD network may be a set of one or more nodes that may use frequencies typically reserved for FDD operation. An FDD network may be a set of one or more nodes (e.g., a Macro and a LPN) where the nodes may use or operate in FDD mode (which may be full duplex and/or or half duplex) for coupled operation.

A WTRU (e.g., low-cost WTRU) which may have HD-FDD capability and may use decoupled mode, the WTRU may perform cell selection (e.g., separately) for uplink and downlink.

To determine the UL and DL subframe configuration, for example, a rule (e.g., a predefined rule) may be applied to define uplink and downlink subframes. For example, at least certain subframe numbers (e.g., one or more of 0, 4, 5, and 9) may be defined as downlink subframes and the others may be considered as uplink subframes. The MBSFN subframe configuration may be used so that the subframes configured as MBSFN subframes may be considered as uplink subframes and the others may be considered as downlink subframes. The uplink and downlink subframes may be configured via higher layer signaling. There may be default downlink (and/or UL) subframes that may be used (e.g., may always be used) as downlink (and/or UL) subframes. For subframes with a default direction, configuration may not be provided or used. For data channels, uplink and downlink subframes may be dynamically configured based on one or more HARQ process aspects (e.g., HARQ process timing). For example, if a WTRU may receive a downlink assignment in subframe n then the n+4 subframe or the subframe for the HARQ ACK/NACK feedback (e.g., subframe n+4) may become an uplink subframe (e.g., automatically).

If a WTRU (e.g., low-cost WTRU) may be configured for or may select half duplex FDD mode, for example, in decoupled mode, the WTRU may adapt the way it may perform measurements and/or may transmit feedback, measurements, and/or other signals in the UL, for example, based on which subframes may be used for UL and/or DL. This may enable the WTRU to cope with (or better handle) self desensing of its receiver.

For feedback and/or measurements such as one or more of RSRP, RSRQ, CQI, CSI, and RLM (Radio Link Monitoring), the WTRU may avoid taking samples from DL subframes that may overlap with UL transmissions.

The WTRU may avoid transmitting feedback and/or measurements, or may delay such transmission, while monitoring DL control channels or being scheduled for reception (or in subframes in which it may be scheduled for reception). The WTRU may store its feedback and/or measurements, for example, in case the scheduled time for the feedback and/or measurements may overlap with a DL monitoring and/or reception. The WTRU may drop the feedback and/or measurements that may be considered obsolete and may restart the process until the next feedback or measurement reporting occasion. The eNB may request aperiodic feedback and/or measurements (e.g., for certain feedback and/or measurements), for example, in case the WTRU may have skipped the period occasion(s) for the feedback and/or measurements (e.g., the certain feedback and/or measurements).

The WTRU may drop an SR transmission if may overlap with DL data that may have been scheduled (e.g., for the WTRU). The WTRU may scale SR power and still transmit it, for example, if the WTRU may use a power limitation alternative for half duplex FDD.

A WTRU may not be able to transmit, (e.g., at the same time or during overlapping times) to multiple cells. For example, a WTRU may transmit or may be scheduled to transmit a PUCCH (e.g., for HARQ-ACK) to cell-B (e.g. Macro) and a PUSCH to cell-A (e.g., LPN) and the WTRU may be able (e.g., only able) to transmit an uplink signal to one cell. This may apply when the WTRU may have a simple or single transmitter or may have one PA.

A prioritization rule may be defined and/or may apply when uplink signals may be scheduled or may need to be transmitted at the same time or during overlapping times to different cells.

For example, if a WTRU may be scheduled to (or need to) transmit an UL channel to more than one cell, the WTRU may select a target cell for uplink transmission, which may be according to a prioritization rule. A WTRU may transmit the highest priority channel (e.g., to one of the cells) and may not transmit one or more (e.g., other) channels (e.g., to another cell or cells).

A PUCCH including HARQ-ACK may (e.g., may always) have higher priority than one or more of PUSCH without UCI and SRS. An uplink signal or channel that may be targeted to the Macro may have higher priority than an UL signal or channel (e.g., the same and/or other signal or channel such as all other UL signals or channels) for the LPN.

A PUCCH that may include positive SR may have higher priority than a PUCCH that may include HARQ-ACK. A PUCCH that may include H-ARQ may have higher priority than a PUCCH that may include positive SR.

Mutually exclusive uplink resources may be configured for two or more cells. For example, a set or subset of uplink resources may be assigned to (or used in) a cell-A (e.g., LPN), and another set or subset of uplink resources that may be non-overlapped with the uplink resources assigned to (or used in) a cell-A may be assigned to (or used in) a cell-B (e.g., Macro).

The set (or subset) of uplink resources may be defined as a subset of the uplink subframes available. The subframe set {0, 2, 4, 6, 8} may be assigned to (or used in) the cell-A, and another subframe set {1, 3, 5, 7, 9} may be assigned to (or used in) the cell-B. The set (or subset) of uplink resources may be defined as a subset of PRB-pairs in a subframe. The even-numbered PRB-pair may be assigned to (or used in) the cell-A, and the odd-numbered PRB-pair may be assigned to (or used in) the cell-B.

The assignment (or use) of the resource sets (or subsets) may be WTRU-specific and may apply in decoupled mode. The assignment (or use) of the resource sets (or subsets) may be applicable in scenarios in which the cells (e.g., cell-A and cell-B) may operate in or with the same frequency band.

For a WTRU to access a cell, it may first discover the cell. The discovery process may involve detecting PSS/SSS and reading the PBCH and the SIBs. While the coverage of such signals may be higher than that of data transmissions, a WTRU may be unable to detect any of the signals from an LPN. It may be possible that such an LPN may be suited (e.g., best suited) to receive the WTRU's UL transmissions.

A WTRU may have coverage, which may include limited coverage, in the DL to the Macro cell and may have limited coverage in the UL that may be more limited than the coverage in the DL. The WTRU may be handed off (e.g., by the Macro) to a LPN (e.g., nearby LPN) for UL transmissions (or UL communication), e.g., to improve the performance. The Macro cell may assist the WTRU in discovering nearby LPNs. The WTRU may have no UL coverage (or may have coverage that may be limited beyond a threshold) to the Macro and may independently find and connect to a LPN for UL and to a Macro cell for DL. A WTRU may maintain separate synchronization to Macro and LPN cells for DL and UL transmissions, e.g., if there is no synchronization between the Macro cell and the LPN.

A WTRU (e.g., low-cost WTRU) may discover a Low Power Node (LPN), for example to be used for UL communication or transmissions. A WTRU may (e.g., autonomously) determine that it may be better served in a decoupled manner and may trigger discovery of LPN cells. In another solution, the WTRU may be configured to discover one or more LPNs that may enable it to have decoupled operation. A Macro may configure the WTRU (e.g., via higher layer signaling such as RRC signaling) to perform discovery of one or more LPNs.

The discovery of LPNs (e.g., small cells) by a WTRU may be done with or without Macro cell assistance.

A WTRU may be provided with the configuration of one or multiple LPNs. Such configurations may enable a WTRU to take relevant measurements. Such configurations may enable the WTRU to perform random access on the LPN. Such a random access may explicitly or implicitly indicate to the LPN that it may be for UL (e.g., for at least some, certain, all, or only UL transmissions or UL communication) and that DL (e.g., some, certain, or all DL transmissions or communication) may be or may be continued from or with another cell (e.g., the Macro cell). Such a random access may explicitly or implicitly indicate to the LPN that it may be for decoupled mode operation and that the LPN may be the selected UL cell or the selected cell for UL communication for the WTRU.

The Macro cell may provide a list of LPN configurations to the WTRU. Such a list may include, e.g., for each LPN, one or more of an identity (or index) for the LPN, reference signal (RS) configuration, time and/or frequency offset (e.g., with respect to the time and/or frequency of the Macro cell), RACH parameters, WTRU identity (such as one or more of C-RNTI, RA-RNTI, SI-RNTI, P-RNTI) to use with the (or each) LPN, UL bandwidth, frame timing (possibly as an offset), system frame number (possibly as an offset), and cell identity. An offset may be an offset with respect to the Macro parameter or value. Some of the parameters that may be provided or configured may be as described in solutions or examples herein. The WTRU may or may be configured to use or maintain an identity (such as C-RNTI) for the LPN (e.g., for communication with the LPN), which may be separate from or independent of the identity (e.g., C-RNTI) which may be used by or with the Macro cell, e.g., for DL transmissions or communication that may be between the WTRU and the Macro. The WTRU may determine an identity (e.g., C-RNTI) to be used by (or for communication with) the LPN as a function or an offset value of the identity (e.g., C-RNTI) that may be used by (or for communication with) the Macro cell.

Such configuration of LPN cells that may be used for UL transmission or UL communication may be WTRU-specific and may be provided via higher layer signaling to WTRUs that may have Macro cell access. A WTRU may be triggered to obtain measurements on a subset of the LPNs in the configured (or pre-configured) list. Such triggering may be done dynamically via physical layer signaling, or it may be done by higher layer signaling.

The list of LPN cells along with their parameters may be provided by system information (e.g., System Information Block (SIB)) and/or PBCH transmission from the Macro cell. Such information may be broadcast by the Macro cell. This may enable UL access to LPN cells by WTRUs that may be unable to obtain UL access to the Macro cell.

System information (e.g., one of the SIBs) of the Macro cell may (or may also) indicate a set of triggers and/or measurement states that a WTRU may use to determine that (or whether) it should attempt decoupled operation.

A WTRU may be configured by a Macro to take measurements on a LPN (or on multiple LPNs). Such measurements may be enabled by the configuration of appropriate or certain reference signals (RS). For example, a Macro cell may indicate to a WTRU a CRS configuration. This configuration may include, for example, cell ID, time and/or frequency location, subframe periodicity, subframe offset, RS sequence, RS sequence initialization, v-shift, and/or transmission power. A Macro cell may indicate to a WTRU a CSI-RS configuration that may be used for measurements. This configuration may include, for example, cell ID, RE mapping, subframe periodicity, subframe offset, RS sequence, RS sequence initialization, and/or transmission power. A WTRU may be configured to make measurements on a new RS transmitted by LPNs to enable measurements by WTRUs that may be unable to use legacy cell discovery mechanisms. Such a configuration may include, for example, a coarse (or fine) RE mapping, a subframe periodicity and offset (possibly based on the subframe timing of the Macro cell), an RS sequence, an RS sequence initialization (possibly based on a cell ID), and/or transmission power. For any of the RS configurations, the Macro may also provide timing and/or frequency offset value to enable appropriate measurements by the WTRU.

Upon (or following or as a result of) being provided with such RS configurations, a WTRU may or may begin taking (or making) measurements on the RS. The WTRU may measure RSRP and/or RSRQ type measurements.

The WTRU may determine the pathloss of an LPN that may be appropriate for UL communication. The WTRU may attempt to determine the time and/or frequency offset of the LPN transmission (e.g., relative to the Macro cell transmission). A WTRU may determine the state or capability of the LPN (for example, if it allows decoupled mode operation), for example, based on the measurements taken. The WTRU may feed back measurements, e.g., any of the aforementioned measurements, to its Macro cell. For example, a WTRU may be configured to make measurements on a plurality of LPNs. The WTRU may make measurements according to the configuration. The WTRU may feed back certain measurements (e.g., a subset of the measurements described herein), to the Macro cell. If the WTRU feeds back measurements for a plurality of LPNs, the WTRU may be configured with an identity for each LPN in the measurement configurations and may include the LPN identity with its measurement report to the Macro. The WTRU may feed back measurements for a subset of all configured LPNs. The WTRU may have triggers and thresholds configured to determine the appropriate subset of LPNs for which it may feed back measurements, e.g., to the Macro. For example, a WTRU may report or may only report measurements for LPNs whose frequency and/or time offset may be within an allowable value. A WTRU may report or may only report measurements for the LPN with the smallest pathloss. LPN pathloss may be computed from one or more measurements and transmission power, e.g., LPN transmission power minus measured LPN RSRP.

Upon (or following or as a result of) determining that an LPN is appropriate for UL transmissions or UL communication, a WTRU may begin random access (e.g., a random access process or procedure) to that LPN. Such a random access process (or procedure) may be a modified random access process or procedure that may indicate to the LPN that the WTRU may be attempting access for the purpose of UL transmissions or UL communication (e.g., only UL transmissions or UL communication) and/or decoupled mode operation. Such a random access procedure may indicate to the LPN what Macro cell the WTRU may (or may expect to or be expected to) use for DL transmissions or DL communication. The WTRU may obtain the RACH configuration from the LPN itself, or it may obtain the RACH configuration from the Macro cell. The RACH configuration may be provided by broadcast signaling (e.g., by the Macro or LPN) or dedicated signaling (e.g., from the Macro).

A WTRU may determine that it may be unable to, e.g., successfully, have certain or all UL transmissions to, or UL communication with, a Macro cell and/or that it may be better served by having certain or all UL transmissions to or UL communication with a LPN. Upon (or following or as a result of) making such a determination, the WTRU may attempt to discover at least one LPN that may provide (or provide better) UL coverage. A WTRU may (e.g., autonomously) search for and/or detect one or more LPNs that may be adequate for UL transmissions or UL communication. Such detection may be based on legacy detection mechanisms (e.g., cell search or selection measurements or mechanisms), or may be based on measurements that may be made or taken (e.g., by the WTRU) on a discovery signal.

Upon (or following or as a result of) discovering an adequate LPN, the WTRU may attempt random access to that LPN. The WTRU may attempt a modified random access to that LPN. A modified random access may indicate to the LPN that the WTRU wishes to connect for UL communication and that DL communication may be handled by another (e.g., a Macro) cell. In another solution, the WTRU may report to the Macro cell one or more LPNs that it may (or may intend to) use for UL transmissions or UL communication. The WTRU may report to at least one of the LPN and the Macro cell the timing and/or frequency and/or pathloss of the LPN, for example, as offsets of the LPN with respect to the Macro cell.

The WTRU and/or an LPN may be mobile. If the WTRU is actively transmitting data in the UL, the LPN may be able to determine a possibly worsening link from the WTRU. An actively transmitting WTRU may be a WTRU that has been recently scheduled for PUSCH transmissions or that is expected to be imminently scheduled for PUSCH or that has recently transmitted PUCCH or that is expected to be transmitting PUCCH imminently. A recently scheduled or imminent transmission may be one which may occur within a pre-configured amount of subframes from the current subframe. An LPN may determine that a link may be worsening by a decrease in the MCS; an increase in HARQ retransmissions; a decrease in the overall WTRU throughput, and/or a decrease in the received power of a channel or signal, such as SRS. Such a channel may be one that is used for probing purposes by the WTRU, such as a modified PRACH transmission where no RAR message is expected by the WTRU.

On the other hand, in some cases, a WTRU may be connected for UL transmission (or UL communication) to an LPN, however it may have no recent or imminent UL transmissions (or UL communication). For example, an LPN may have a timer and upon reception of an UL transmission, the LPN may reset the timer. Upon expiration of the timer, the LPN may consider that any quality observed from a previous transmission may no longer be relevant.

Such RLM/RLF like behavior at the LPN may trigger an LPN to request a transmission of a probing-like signal by the WTRU. If the LPN has some DL connectivity to the WTRU, it may request the probe itself. On the other, for fully decoupled scenario, the LPN may indicate to the Macro cell serving the WTRU for the WTRU to transmit a probe-like signal to enable the LPN to make appropriate measurements. The Macro may either configure the WTRU with a probing signal that can be received by multiple LPNs, or it may simultaneously configure other LPNs to listen for the probe signal. In another solution, the WTRU may have its own timer, which it may reset after every UL transmission (or UL communication) to the LPN. Upon expiration of the timer, the WTRU may be triggered to transmit a probing signal to the LPN (using LPN-specific probing signal configuration), or to a group of LPNs (using group-specific probing signal configurations).

A WTRU may probe the LPNs to transmit a PRACH preamble on a set of resources that may be preconfigured. Multiple LPNs may be configured by a Macro cell to listen to this specific set of resources (or preambles) to see if it can effectively be used by the WTRU for UL transmissions (or UL communication). A WTRU may expect a random access response (RAR) message from an LPN upon transmitting a PRACH preamble, and within a pre-configured time window. The WTRU may be configured with different RAR reception time windows per type of RACH. For example, a WTRU performing legacy RACH may have a first window size, whereas when performing PRACH transmission for probing LPNs, it may have a second window size. The RAR may come from the Macro cell, and, depending on the backhaul, such response may take longer. It may not be desirable to have the WTRU retransmit PRACH preamble too fast.

A WTRU may be configured to periodically transmit a probing signal either to the serving LPN or to a group of LPNs (which may include the serving LPN). Such a signal may have priority over any other UL transmission scheduled for the same subframe. For example, the WTRU may use puncturing or rate matching around the REs allocated for the transmission of the periodic probing signal. The WTRU may drop any UL transmission scheduled for that subframe when it is supposed to transmit the probing signal.

A WTRU may perform periodic, or possibly on demand and/or aperiodic, transmission of a probing signal by reusing the SRS. For probing use, the SRS may have different parameters as those used for legacy SRS. For example, the transmission power of a probing signal SRS may use its own set of power control loop, independent of other SRS or PDSCH. The probing signal SRS may use maximum power. The pathloss used in the determination of the transmission power for the probing signal SRS may use the value of path loss to the Macro cell. This may enable the Macro cell to listen to the probing signal to determine if a WTRU can be served by a single cell as opposed to using decoupled UL-DL. A probing signal SRS may use a different sequence than legacy SRS. Such sequence may be macro-cell-area-specific, thus enabling multiple LPNs to possibly hear the signal. The probing signal SRS may also be spread over multiple symbols (possibly the same sequence can be repeated over multiple adjacent symbols). This may enable different cells with different timing criteria to efficiently detect the probing signal.

A WTRU may also be configured to transmit an aperiodic SRS as a probing signal. Such aperiodic SRS may be semi-persistent in that a WTRU may be given orders to transmit the SRS with a specific configuration for a set period of time, or until it may be configured to stop the transmission.

A WTRU may be configured with a set of LPNs that may be able to receive UL transmissions (or UL communication) from the WTRU and may be used in a decoupled manner with a Macro cell. Such a set can be explicitly configured to the WTRU. In a system information block (SIB) from the Macro, there may be a list of LPNs in the coverage area of the Macro that can be used. Along with the list of LPNs, the SIB may include parameters to enable UL transmissions (or UL communication) to each LPN. For example, RACH configuration may be provided for each (or groups of) LPN. Some geographical coordinates of the LPNs may be provided to enable the WTRU to determine a subset of LPNs that are in close proximity to the WTRU, and thus likely to be adequate LPNs for UL transmissions (or UL communication). A new SIB may be transmitting. Such a SIB may use beamforming and may include the configuration parameters of a subset of LPNs within a Macro cell's coverage. Multiple versions of the SIB may be transmitted, e.g., with different precoding and different subset of LPN configurations, to enable the WTRU to determine which subset is most relevant for its current position.

A set of LPNs may be configured to the WTRU in an RRC message. For example, the WTRU may expect a set of LPN configurations in an RRC message transmitted during the RACH procedure to the Macro cell.

A set of LPNs may be configured to the WTRU in L1 signaling to the WTRU. For example, a WTRU may receive a DCI to schedule a probing signal transmission. Such a DCI may include a list of LPNs for which the probing signal should be targeted.

The set of LPNs can also include any configuration to attempt to use one or multiple LPNs for UL transmissions (or UL communication). For example, the set of LPNs may include probing signal configuration.

A WTRU may be configured to transmit a generic probing signal that may be received by any LPN under the Macro cell coverage. The LPNs may report measurements on such a probing signal back to the Macro. The Macro may then configure the WTRU with a subset of LPNs and their configurations. This second, smaller set of LPNs may be used by the WTRU for any further probing signal transmission. A more specific probing signal may be jointly configured at the WTRU for future probing signal transmission.

The WTRU may autonomously determine the subset of LPNs for which it may transmit a probing signal. This may be done by implicit configuration or autonomously by the WTRU. For example, a WTRU may be configured with a relationship between a parameter of the serving Macro cell and possible LPNs. The parameter of the Macro cell may include a Cell ID, e.g., the PCID or a virtual cell ID (VCID) of the Macro cell, e.g., used to determine the CRS sequence of the Macro cell. The parameter of the Macro cell may include a v_shift used for the CRS, a CSI-RS configuration of the Macro cell (VCID, periodicity, subframe offset, and/or RE mapping), a geographic location of the Macro cell (e.g., GPS coordinates), a frequency of the Macro cell, and/or MBSFN configuration.

The parameters of the LPN, or set of LPNs, obtained autonomously by the WTRU may include Cell ID (e.g., or VCID used for CRS or CSI-RS sequence generation), geographic location of the LPN(s), probing signal configuration, RACH configuration (possibly including PRACH resources, PRACH transmission power, and/or RAR reception window), a frequency of the LPNs, and/or MBSFN configuration.

The cell ID of the Macro cell may be tied to a specific set of LPNs (e.g., LPN IDs) and a set of probing configurations.

The WTRU may perform measurements on the CRS of different LPNs. Such measurements may indicate that the cell is too weak for DL transmissions. The WTRU may rank the LPNs based on their CRS-based measurements and may determine possible relevant LPNs. Upon such a determination, the WTRU may be use the appropriate probing signal configuration as provided by the Macro cell.

A random access procedure may be performed by a WTRU, for example for initial access, which may be for connection establishment, and/or to obtain timing advance (TA), e.g., for UL time synchronization, among other reasons.

If a WTRU may or may intend to transmit one or more UL channels or signals to a cell (e.g., the Macro and/or LPN), the WTRU may need TA from and/or for that cell. For a small cell or LPN, the cell may be small enough that TA may not be needed, e.g., a WTRU may transmit to the cell without TA or with a TA with a value of zero.

A WTRU may receive broadcast signaling from a cell (e.g., Macro or LPN) that may enable it to acquire system information that may be needed to perform a random access procedure, for example PRACH configuration information. This system information may include the configuration information (e.g., PRACH configuration) for random access to the cell (e.g., Macro or LPN) and/or for random access to one or more other cells (e.g., Macros and/or LPNs).

A first cell (e.g., Macro) may not be able to receive a PRACH preamble from a WTRU due to limited uplink coverage. The WTRU may transmit the PRACH preamble, for example, for initial access and/or connection establishment to a second cell (e.g., LPN). PRACH preamble detection, request for initial access, and/or a connection establishment request may be indicated or forwarded to the first cell (e.g., Macro) by the second cell (e.g., LPN).

A first cell (e.g., LPN) may receive the UL transmissions related to the random access procedure of a WTRU (e.g., one or more of PRACH, msg1, PUSCH carrying msg3) while a second cell (e.g., Macro) may provide the DL transmissions related to the random access procedure of a WTRU (e.g., one or more of PDCCH, PDSCH that may carry RAR or msg3).

PRACH, RACH, and random access may be used interchangeably.

A WTRU may perform random access autonomously (e.g., without a command or request from a cell or eNB) or following or in response to a command or request that may be explicit (e.g., PDCCH order) or implied (e.g., RRC reconfiguration for mobility or handover). Msg1 may be the transmission of a preamble. A response to a preamble transmission (e.g., which may be transmitted by a WTRU or node such as LPN) may be a random access response (RAR) (e.g., from a node such as the Macro which may receive the preamble) or may be another response (e.g., from a node such as the Macro which may receive the preamble) such as a timing advance command.

The terms message and msg may be used interchangeably. RAR and msg2 may be used interchangeably. RAR may be replaced by timing advance command or any other message, command or response, e.g., to a preamble transmission, and still be consistent with the principles disclosed herein. A timing advance command may include a timing advance value. An RAR may include a timing advance command or a timing advance value. A cell or eNB may send and/or a WTRU or node may receive a timing advance command (or other message that may include a timing advance command or value) which may be unsolicited (e.g., without a preamble transmission).

A WTRU may be configured by a Macro cell, e.g., with parameters and/or information, to (or which may) enable LPN access or discovery (e.g., by the WTRU) for possible UL transmissions (or UL communication). The Macro cell may provide a set of PRACH resources on which the WTRU may attempt random access to the LPN. The random access may be a legacy type random access or may be a random access that may indicate access may be or may be intended for (or only for) UL transmissions or UL communication. For example, the Macro cell may indicate a set or subset of PRACH preambles that may be (or may be intended to be) used by the WTRU when the WTRU may attempt random access on the LPN. Such a set or subset of preambles may be interpreted by the LPN as an indication that the WTRU may wish (or may be requesting) to have access (e.g., access only) for UL transmissions (or UL communication). Physical PRACH resources (such as time and/or frequency resources and/or set of subframes, e.g., for an LPN) may be configured by the Macro cell for the WTRU. Reception of a PRACH preamble in a (e.g., any) certain (e.g., configured or pre-configured) set or subset of resources by the LPN may indicate to the LPN that the WTRU may wish (or may be requesting) to have access for UL (e.g., UL transmissions or UL communication) while the WTRU may (or may intend to) have or maintain access for DL (e.g., for DL communication) to another (e.g., the Macro) cell.

The RACH configuration that may be provided by the Macro cell may (or may also) indicate to the WTRU a guard time (e.g., required guard time). The guard time may be used to account for timing uncertainty and/or to ensure no (or reduced) interference with one or more subsequent subframes that may not be used for random access. The guard time may be a period of no UL transmission that may be appended to the PRACH preamble. This guard time may be adjusted for (e.g., specifically for) decoupled random access, for example in order to mitigate possible timing errors which may be caused by a WTRU possibly being unable to synchronize to the LPN. The RACH configuration that may be provided by the Macro may include a frequency offset, for example, for similar reasons as for the increased guard time. The Macro cell may include a pathloss offset value. This pathloss offset value may be used by the WTRU to determine an appropriate initial transmission power for the PRACH preamble. The Macro cell may include an absolute power level that may be used by the WTRU for its initial PRACH preamble transmission. Such a configured WTRU transmission power may be provided to the LPN and/or may be used at the Macro cell (or any other controlling entity), for example, to determine the pathloss between the WTRU and the LPN. The pathloss may be determined based on the configured transmission power and/or the received power of the PRACH preamble at the LPN.

A WTRU may be unable to have certain (e.g., any) UL coverage to the Macro cell or may have limited (e.g., limited beyond a certain level) UL coverage to the Macro cell. The WTRU may (e.g., may also) be unable to have certain (e.g., any) DL coverage from the LPN or may have limited (e.g., limited beyond a certain level) DL coverage from the LPN. The WTRU may have satisfactory DL coverage from the Macro cell (e.g., above a certain level) and/or satisfactory UL coverage to the LPN (e.g., above a certain level). For example, a WTRU may have severely limited coverage in the UL to the Macro and in the DL from the LPN while having satisfactory coverage from the Macro in the DL and in the UL to the LPN.

A WTRU, for example in a scenario such as described herein, may perform a random access (e.g., random access procedure) that may involve both a LPN and Macro. For example, upon (or following or after) obtaining the PRACH preamble transmission parameters, a WTRU may transmit an appropriate PRACH preamble to a LPN that may be nearby. The PRACH preamble may implicitly (for example, by use of a certain subset of preambles and/or time and/or frequency resources which may be predefined or pre-configured) or explicitly indicate to the LPN a Macro cell. The indicated Macro cell may be one (e.g., the one) from which the WTRU may like to (or intend to or expect to) have DL connectivity (e.g., receive at least certain DL transmissions such as all DL transmissions). The indicated Macro cell may be one with which the WTRU may (or may expect to) communicate (or receive transmissions) in the DL, e.g., for at least the random access. The indicated Macro cell may be the Macro cell which may be associated with the LPN and/or the cell from which the WTRU may have received the LPN and/or PRACH configuration, e.g., for the random access.

The WTRU may receive or expect to receive a Random Access Response (RAR) message from a (or the) Macro cell, e.g., in response to the preamble it may have sent to an (or the) LPN. The Macro cell may be one for which the WTRU may have DL coverage (e.g., satisfactory DL coverage). The Macro cell may be a (or the) Macro cell associated with the LPN and/or indicated by the PRACH resources (e.g., preamble and/or time and/or frequency resources) which the WTRU may have used for transmission to the LPN.

The window of time (e.g., time window or time frame) within which a WTRU may expect (e.g., expect to receive) a RAR from the Macro cell may be increased (e.g., with respect to the legacy window), for example, to allow for backhaul communication between the LPN and the Macro cell. The RAR message may include a configuration for an UL transmission, for example of an UL transmission of random access message 3 by the WTRU to the LPN. The configuration may include one or more of an UL grant, a cell ID, a C-RNTI, a TC-RNTI, a timing advance command and an UL DM-RS configuration. The WTRU may transmit message 3 to the LPN and may expect a contention resolution message (e.g., if needed) to be transmitted by the Macro. The WTRU may consider itself connected to the Macro for DL (e.g., DL transmissions or communication) and to the LPN for UL (e.g., UL transmissions or communication). Random access message 3 may include a connection establishment request such as an RRC connection establishment request. The RRC connection may be established with the Macro and/or the LPN.

A WTRU may select one or more cells (e.g., Macro and/or LPN) for its random access procedure, for example, for connection establishment. The cell (or cells) with which the WTRU may perform the random access procedure may or may not be the cell (or cells) with which the connection may be established. The cell or one of the cells with which the WTRU may perform the random access procedure may be the cell with which the connection may be established.

A WTRU may select a certain cell (e.g., Macro cell) as its cell for at least one or more certain DL transmissions (e.g., system information which may be broadcast) or certain DL communication, for example based on one or more of cell search, cell selection, and/or cell reselection procedures, which may be legacy procedures or DL specific procedures. A WTRU may perform one or more parts of a random access procedure with the certain cell and/or another cell (e.g., LPN) where the LPN may be selected or determined by the WTRU based on one or more solutions described herein. The resources which may be used (e.g., by the WTRU) for transmission of a PRACH preamble to the LPN may be provided by the certain cell and/or other cell, for example via system information which may be broadcast by the cell.

The parts of the random access procedure which the WTRU may perform may include one or more of UL transmission of the PRACH preamble (e.g., msg1), monitoring for and/or reception of the DL RAR (e.g., msg2), UL transmission on resources which may have been allocated by the RAR (e.g., msg3) which may include a connection establishment request, and monitoring for and/or reception of a DL contention resolution message (e.g., msg4).

In an example, a WTRU may determine or decide whether the random access procedure or PRACH transmission (e.g., successful PRACH transmission) may be possible to the certain Macro. Successful transmission may include the use of coverage enhancement techniques such as repetition. Such a determination or decision may, for example, be based on whether the WTRU (or WTRU measurement) may meet or exceed a certain level of coverage limitation or meet a certain coverage limitation criteria such as a measurement being above or below a certain threshold.

If the WTRU (or WTRU measurement) may meet or exceed the level of coverage limitation or meet the certain coverage limitation criteria, the WTRU may perform certain (or all) parts, for example one or more UL transmissions, of the random access procedure with another cell or node such as an LPN. For example, the WTRU may transmit a PRACH preamble to the LPN.

The WTRU may (e.g., may first) attempt PRACH preamble transmission to the Macro, e.g., the WTRU may transmit a PRACH preamble to the Macro one or more times. Each transmission may use a different preamble. Each transmission may be at a different power level and/or in accordance with a different level of coverage limitation or coverage enhancement. The WTRU may ramp up (e.g., increase or increase by a certain amount) the transmission power between PRACH preamble transmissions, which may be in accordance with a certain level of coverage limitation or coverage enhancement. A level of coverage limitation or coverage enhancement may include no coverage limitation or coverage enhancement. A WTRU may have or be configured with a maximum number of times it may ramp the PRACH power and/or a maximum number of times it may ramp the PRACH power at a certain (e.g., each or any) level of coverage limitation or coverage enhancement, and/or a maximum power (e.g., for PRACH transmission).

The WTRU may determine whether one or more of the PRACH preamble transmissions to the Macro are successful. If the WTRU may determine that one or multiple (e.g., all) of the PRACH preamble transmissions may be unsuccessful, the WTRU may perform certain (or all) parts, for example one or more UL transmissions, of the random access procedure with another cell such as an LPN. For example, the WTRU may transmit a PRACH preamble to the LPN.

For example, a WTRU may transmit a PRACH preamble to the Macro at a certain power level for a certain level of coverage limitation or coverage enhancement. If the WTRU may determine that the PRACH preamble transmission may be unsuccessful, the WTRU may ramp the power and transmit another PRACH preamble and may repeat the process until the transmission may be successful or the maximum number of times to ramp (or the maximum transmission power) may be met or exceeded. The WTRU may repeat the process for one or more other levels of coverage limitation or coverage enhancement. A WTRU may determine overall PRACH preamble transmission to the Macro may be unsuccessful if certain (e.g., all) PRACH preamble transmission attempts may be unsuccessful. If the WTRU may determine that overall PRACH preamble transmission may be unsuccessful, the WTRU may perform certain (or all) parts, for example one or more UL transmissions, of the random access procedure with another cell such as an LPN. For example, the WTRU may transmit a PRACH preamble to the LPN.

For transmission of a PRACH preamble to the Macro, the WTRU may make the transmission in accordance with a certain level of coverage limitation or coverage enhancement such as a chosen level or a worst (or maximum) level (e.g., of a set of considered or available levels). The WTRU may try a transmission of the PRACH preamble using each of one or more levels or may try (e.g., may only try) the worst (or maximum) level.

The WTRU may determine a PRACH preamble transmission to be successful if an RAR may be received by the WTRU in response to (e.g., in an expected time window following) the preamble transmission. The WTRU may determine the PRACH preamble transmission to be unsuccessful if the RAR may not be received (e.g., in the expected time window).

If the WTRU may determine that transmission of the PRACH preamble (which may include one or more attempts which may include power ramping) in accordance with a certain level of coverage limitation or coverage enhancement such as a chosen level or a worst (or maximum) level (e.g., of a set of considered or available levels) may be unsuccessful, the WTRU may perform certain (or all) parts, for example one or more UL transmissions, of the random access procedure with another cell such as an LPN. For example, the WTRU may transmit a PRACH preamble to the LPN.

If the WTRU may transmit a PRACH preamble to an LPN, the WTRU may perform one or more UL transmissions that may be associated with the random access procedure (e.g., msg1 and/or msg3) to or with the LPN. If the WTRU may transmit a PRACH preamble to an LPN, the WTRU may receive or expect to receive one or more DL transmissions which may be associated with the random access procedure (e.g., msg2 and/or msg4) from the Macro or the LPN.

If the WTRU may perform a random access procedure with the Macro and if a preamble transmission may be successful, if a subsequent aspect of the procedure (e.g., contention resolution) may be unsuccessful, for example, for at least a certain number of times, the WTRU may determine or consider the random access procedure unsuccessful. If the WTRU may consider or determine the random access procedure with the Macro as or to be unsuccessful, the WTRU may perform certain (or all) parts, for example one or more UL transmissions, of the random access procedure with another cell such as an LPN. For example, the WTRU may transmit a PRACH preamble to the LPN.

The WTRU may transmit a PRACH preamble successfully to a Macro and, for example as part of or included in the RAR which may be transmitted by the Macro, the Macro may provide one or more of the following to the WTRU: a grant (or allocation) for resources for UL transmission (e.g., msg3) which may be resources of another cell such as an LPN, indication that the resources are for another cell, information regarding the other cell such as cell ID or an index or indication which may correspond to a list (e.g., which may provide cell information) which may be provided separately such as via system information which may be broadcast, and an indication to operate in decouple mode. A WTRU may transmit in the UL (e.g., msg3), for example to the LPN and/or on the resources indicated.

The WTRU may perform a random access procedure with a Macro, and the Macro may configure the WTRU for decoupled operation (e.g., which may include the LPN to use in decoupled operation) after such completion, e.g., via signaling such as RRC signaling.

In an example, such as those described herein, when the WTRU may transmit a PRACH preamble to an LPN based on an aspect of a random access procedure with a Macro being determined or decided by the WTRU to be unsuccessful, the WTRU may transmit the PRACH preamble upon (or following, after, or as a result of) the determination or decision.

A PRACH transmission may be used for WTRU discovery by a LPN. A WTRU may receive, e.g., from a Macro, or may be configured with, e.g., by a Macro, a set of PRACH resources that it may use, for example when the WTRU may be unable to have (e.g., have successful) UL transmission or certain (e.g., any) UL coverage to the Macro cell or may have limited (e.g., limited beyond a certain level) UL coverage to the Macro cell. The PRACH resources may include one or more of a set or subset of preambles, a set of time and/or frequency resources, appropriate subframes, and a transmission power setting. The Macro may transmit and/or the WTRU may receive the configuration via signaling from the Macro, such as system information that may be broadcast by the Macro or other higher layer signaling. Upon (or following or after or as a result of) determining that it may use or require an LPN for at least certain UL transmissions (e.g., PRACH or random access related UL transmissions or all UL transmissions), a WTRU may transmit (e.g., broadcast) a PRACH preamble from the received or configured set or subset. The PRACH preamble transmission may be considered or designated as a broadcast, for example since the WTRU may not be aware of what LPN may receive or be capable of receiving the transmission.

For a PRACH preamble transmission such as a broadcasted PRACH preamble transmission, a WTRU may use a configured or pre-determined transmission power level, which may be a fixed transmission power level. For example, a WTRU may be configured to transmit the PRACH preamble multiple times. Each PRACH preamble transmission may have a configured, pre-configured or otherwise known or determined power level, and such power levels may be constant over all PRACH preamble transmissions. The transmission power which may be used for PRACH preamble transmission may be explicitly configured by a Macro cell or may be configured by the WTRU.

The PRACH preamble transmission power may be or may be configured to be the maximum WTRU transmission power. The PRACH preamble transmission power may be a function (or an offset) of the transmission power that may be used for an (e.g., any or a certain type of) UL transmission to the Macro.

The PRACH preamble transmission power may be selected (e.g., jointly) with the PRACH preamble and/or the PRACH time/frequency used. Such a solution may enable an LPN that may receive the PRACH preamble transmission to know or determine the transmission power that may be used by the WTRU.

With a fixed or otherwise known PRACH preamble transmission power, a node (e.g., Macro or LPN) that may receive the PRACH preamble transmission may or may be able to determine the pathloss (e.g., UL pathloss), for example from (or between) the WTRU that may have transmitted the PRACH preamble and the node. The node may measure (e.g., the received power) of the PRACH preamble it may receive, for example, to determine the pathloss which may be computed or determined from the transmit power minus the measurement. If the node (LPN) which may receive the PRACH preamble may not have the value of the transmission power, the value may be provided to it by another node (e.g., the Macro), for example, via an X2 interface.

A Macro cell may configure (or provide configuration to) one or more LPNs with the appropriate parameters to receive (e.g., which may enable it or them to receive) a PRACH (e.g., broadcasted PRACH) preamble from a WTRU that may be experiencing poor UL coverage to the Macro cell. Such a configuration may be provided over an X2 interface. The contents of the configuration may include one or more of a set of preambles, time and/or frequency resources, and transmission power characteristics (e.g., transmission power). An LPN (or LPNs) may indicate to a Macro cell what PRACH configurations may be used by WTRUs, for example, for PRACH transmission such as broadcasted PRACH preamble transmission that may be or may be intended to be received by the LPN (or one or more of the LPNs).

A Macro may configure (or provide configuration to) one or more LPNs which may include certain information which may relate to the WTRUs that may use broadcasted PRACH preamble transmission or that may transmit a PRACH preamble which may be or may be intended to be received by one or more of the one or more LPNs. For example, the Macro cell may inform the one or more LPNs of the identity of one or more WTRUs that may transmit (or broadcast) a PRACH preamble which may be or may be intended to be received by one or more of the one or more LPNs, for example for the purpose of decoupled operation. The Macro may indicate to the one or more LPNs the C-RNTI which may be used by the Macro, pathloss to the Macro, timing and/or frequency offset of the Macro, and/or security keys that may be used by the WTRU at (or for, with, or when communicating with) the Macro. The indicated information may be related to a certain WTRU.

Upon (or following, in response to, or as a result of) reception of a PRACH preamble (e.g., broadcasted PRACH preamble), an LPN may transmit a message or an acknowledgement to a Macro or to another entity such as a centralized entity that may indicate this reception. If or when multiple LPNs may have received the PRACH preamble transmission (and/or may have indicated such reception to a Macro or other entity), the Macro and/or the other entity may determine, e.g., based on the contents of the message or acknowledgement, an LPN (e.g., the appropriate LPN) that may be used by the WTRU for certain communication (e.g., UL communication) and/or decoupled operation. If one (e.g., only one) LPN may have received the PRACH preamble transmission (and/or may have indicated such reception to a Macro or other entity), the Macro and/or the other entity may determine that LPN to be the LPN which may be used by the WTRU for certain communication (e.g., UL communication) and/or decoupled operation. The Macro and/or other entity may indicate to an LPN whether or not it may be or may have been selected for certain communication (e.g., UL communication) and/or decoupled operation of or with the WTRU.

The message or acknowledgement that may be transmitted by an LPN that may have received the PRACH preamble transmission may be signaled over the X2 interface. Such a message or acknowledgement may include one or more parameters associated with the received PRACH preamble transmission. For example, the acknowledgement may include one or more of the received preamble ID or IDs, a WTRU ID, the resources on which the PRACH preamble may have been received, the received power, the pathloss (which may be determined based on the received power and/or explicit or implicit determination of the transmission power used), a time and/or frequency offset value. The message or acknowledgement may (or may also) include one or more of an allowed UL grant, a timing advance command and a frequency offset command that the Macro may provide (e.g., via transmission in the DL) to the WTRU.

The grant may be used (e.g., to allocate UL resources) for a random access message 3 type communication or for any other UL transmission which the WTRU may make.

Timing advance may be replaced by another representative time adjustment or time difference value, such as time delay (e.g., time delay or one way time delay) and still be consistent with the principles disclosed herein.

A WTRU and/or LPN (and/or Macro) may perform time and/or frequency synchronization and/or adjustments, for example, for UL and/or DL transmissions and/or communication.

An LPN (or LPNs) may synchronize (e.g., regularly) with the Macro, for example, to enable WTRUs to use decoupled operation. Such synchronization may be done via an X2 interface. For example, a Macro cell may indicate a time and/or frequency offset value that the LPN may use to better align (e.g., its transmissions) with the Macro cell. In an example, such tuning may be done regularly, for example in a periodic manner. In another example, such tuning may be done aperiodically, e.g., upon (or following or in response to) a request from the LPN or request or recommendation from the Macro cell.

The LPN may (or may attempt to) synchronize using over the air (OTA) means. For example, a LPN may determine the timing and/or frequency of the Macro cell by detecting the PSS (and/or SSS) and/or CRS of the Macro cell. The LPN may (or may attempt to) synchronize its timing and/or frequency with that or those of the Macro, for example by using (e.g., based on detection of) one or more of those signals. The LPN may have limited coverage and the WTRUs served by such a node may be located nearby to the LPN. The LPN may assume that such timing and/or frequency of the Macro cell may be that or those which may be experienced by WTRUs under its (e.g., the LPN's) coverage.

A Macro may transmit (e.g., synchronization and/or reference signals such as PSS) at time T0, and a LPN may receive such transmission at time T1. A WTRU that may be in proximity to the LPN and/or may or may intend to communicate with the LPN may (or may also) receive such transmission at a time which may be at or near time T1. An LPN may synchronize its timing (e.g., reference timing that may include DL PSS transmission) with T1 (e.g., transmit PSS at or approximately at T1). A WTRU may (e.g., may then) use the Macro timing (e.g., according to its DL synchronization and/or reference signals) as its reference timing for the LPN (e.g., for communication with the LPN). A WTRU may use or need no (or a zero) timing advance for UL transmission to the LPN.

A LPN may adjust or synchronize its frequency based on reception of one or more DL signals from the Macro. The WTRU may use one or more DL signals from the Macro as (or to determine) the frequency reference for the LPN.

A WTRU may determine the time and/or frequency offset of a LPN with respect to a Macro cell. If an offset (or offsets) may be greater than a threshold value, the WTRU may report to the LPN the offset value (or values) and may request tighter synchronization of the LPN to the Macro cell. The LPN may adjust its transmission in accordance with one or more offset values, for example to reduce and/or eliminate the offset.

A LPN may perform a random access to the Macro cell, for example to be provided with and/or receive a timing advance command. Such a random access may be understood by the LPN and/or Macro cell to be for a certain (e.g., synchronization or timing advance) purpose (e.g., only) and may not lead to the LPN being granted UL resources to the Macro cell. The Macro may determine a timing advance (which may be a LPN-Macro TA) that may be based on this random access and may provide it to the LPN. The LPN may indicate to the Macro the purpose of the random access, for example, by use of certain PRACH resources (e.g., one or more of preamble, time and/or frequency resources). Another procedure with the same intent and/or result may be used. The timing advance may be positive, negative, or zero and may be relative to the DL timing of the Macro.

Based on a timing advance (e.g., a LPN-Macro TA) that may be received from (or determined by) the Macro cell, the LPN (and/or Macro) may be able to determine (e.g., properly determine) another timing advance (which may be the WTRU-LPN TA) to be provided to a WTRU that may have UL connectivity to (or UL transmissions to or UL communication with) the LPN. The LPN (or the Macro) may provide the WTRU-LPN TA to the WTRU. The LPN may provide the WTRU-LPN to the Macro which may provide it to the WTRU. The WTRU may use the WTRU-LPN TA to adjust the timing of its UL transmissions to the LPN. The LPN-Macro TA and the WTRU-LPN TA may be the same or different.

The LPN may adjust its timing (e.g., reference timing) such that the LPN-Macro TA may be the TA (e.g., the correct TA) that the WTRU may use to adjust its UL transmissions to the LPN (e.g., for proper or desirable reception by the LPN).

The LPN may synchronize its timing or its timing may be synchronized with the Macro timing. Synchronized may mean approximately synchronized or synchronized to within a certain tolerance (e.g., on the order of 0.26 μs). In the examples disclosed herein, times may be approximate.

The LPN timing may be synchronized with the Macro timing. The Macro may transmit (e.g., synchronization and/or reference signals such as PSS) at time T0. The LPN may transmit (e.g., synchronization and/or reference signals such as PSS) at (or approximately) time T0. The WTRU may receive the transmission from the Macro at time T1. The LPN-Macro TA may be TA1 which may be (e.g., approximately) equal to 2×(T1-T0). A WTRU near the LPN may transmit to the LPN at T0 (e.g., with a zero TA relative to the LPN reference timing). Relative to the reception from the Macro at T1, the WTRU may need to advance its timing by T1-T0, for example to transmit at T0. The TA for the WTRU to use with the LPN relative to the Macro timing may be TA2=0.5×TA1. The LPN and/or Macro may provide TA2 to the WTRU. The LPN and/or Macro may provide TA1 to the WTRU and the WTRU may adjust it for use with the LPN (e.g., the WTRU may divide it by 2).

A LPN may perform a random access to a Macro, for example, as described herein. The Macro may determine a timing advance (e.g., the LPN-Macro TA) which may be based on this random access and may provide (e.g., transmit) it to the LPN. The timing advance may correspond to one which the LPN may use were it to communicate in the UL to the Macro. The Macro and/or the LPN may transmit the timing advance to a WTRU that may be near the LPN and/or that may be using or intending to use the LPN for decoupled mode, for example, with the Macro. The WTRU may use the timing advance to adjust the timing of one or more UL transmissions to the Macro. The WTRU may obtain DL synchronization from the DL signals from the Macro. The reference timing for the adjustment may be based on DL signals (e.g., synchronization and/or reference signals from the Macro). Since the WTRU may be near the LPN, the TA that may be used or needed by the WTRU may be the same as the TA that may be needed by the LPN.

The LPN may adjust or modify the TA before providing it to the WTRU. The modification or adjustment may be based on a timing difference between the Macro and LPN transmissions (e.g., synchronization and/or reference signals). The modification or adjustment may be based on the TA that the WTRU may use, and/or the LPN may determine, for example for UL transmission from the WTRU to the LPN.

The LPN may or may not be synchronized (or approximately synchronized) with the Macro in time and/or frequency.

A WTRU may maintain synchronization with more than one (e.g., two) non-synchronized points, for example, in order to perform decoupled operation. The WTRU may segregate the UL synchronization from the DL synchronization and/or the Macro synchronization from the LPN synchronization. For each of UL and DL transmissions (or UL and DL communication or Macro and LPN communication), a WTRU may maintain separate timing and/or frequency offsets. One synchronization (e.g., Macro or DL communication) may be obtained from the DL synchronization and/or reference signal (e.g., PSS and/or SSS and/or CRS and/or CSI-RS) transmissions of the Macro cell. Another synchronization (e.g., LPN or UL communication) may be obtained from the DL synchronization and/or reference signal transmissions of the LPN.

One synchronization (e.g., UL communication or LPN) may be obtained as an offset (e.g., offset value) from another (e.g., DL communication or Macro) synchronization (e.g., synchronization timing and/or values). The offsets that may be used may be provided by the Macro cell via higher layer signaling. The offsets that may be used may be broadcast by the Macro cell (e.g., in system information, such as in a SIB).

A WTRU may receive a timing advance command that may be transmitted by the Macro cell and may understand that the command may be used or may be intended to be used as an adjustment (e.g., offset value) that may be applied to certain transmissions, for example, when the WTRU may maintain separate timing and/or frequency synchronization and/or offsets for UL and DL transmissions (or UL and DL communication or Macro and LPN communication). The WTRU may apply the adjustment to the certain transmissions. The certain transmissions may be, for example, transmissions that may be based on the WTRU's (e.g., current) UL (e.g., UL communication) or LPN synchronization.

A WTRU may use one or more procedures such as those described herein to obtain a timing advance that it may use to adjust one or more UL transmissions to one or more cells (e.g., Macro and/or LPN).

A WTRU may (e.g., may first) transmit a preamble (e.g., a random access preamble) to a certain cell (e.g., Macro) and may (e.g., may later) need, receive, or use a timing advance that may be for access to another cell (e.g., LPN). The WTRU may use the DL timing or signals (e.g., synchronization and/or reference signals) from the Macro as its reference timing for the transmission of the preamble to the Macro. The WTRU may receive the timing advance for the LPN from the Macro or the LPN.

The Macro may determine the TA for WTRU-Macro communication. The Macro may transmit and/or the WTRU may receive, e.g., from the Macro, a timing advance that the WTRU may use to adjust one or more UL transmissions that it may make or intend to make to the Macro. The determination and/or transmission of the TA may be in response to the preamble or receipt of the preamble by the Macro. The Macro may indicate to the WTRU to use a decoupled mode, for example, with the Macro and a certain LPN or an LPN such as one among a certain set of LPNs. Such an indication may be provided in or with a RAR or separately.

The WTRU may be able to synchronize to the DL signals or timing of the LPN and/or may use the DL signals or timing of the LPN for its reference timing, e.g., for one or more transmissions (e.g., UL transmissions) to and/or for communication with the LPN. The WTRU may transmit a preamble (e.g., a random access preamble) to the LPN, and the reference timing the WTRU may use for the transmission may be the LPN DL timing or signals (e.g., synchronization and/or reference signals), for example, if the WTRU may be able to detect and/or synchronize to the LPN DL signals.

The LPN may determine the TA for WTRU-LPN communication, e.g., the WTRU-LPN TA. The LPN may transmit the WTRU-LPN TA to the WTRU and/or to the Macro. The Macro may transmit the WTRU-LPN TA to the WTRU. Communication between the Macro and LPN may be via an X2 interface.

The WTRU may (for example, if the WTRU may be unable to detect the DL signals, e.g., synchronization and/or reference signals of the LPN) use the DL timing or signals (e.g., synchronization and/or reference signals) from the Macro for its reference timing, e.g., for UL transmission to the LPN.

The WTRU may transmit a preamble (e.g., a random access preamble) to the LPN and the reference timing that the WTRU may use for the transmission may be the Macro DL timing.

The Macro may transmit a TA to the WTRU, which may be a TA it may have received from the LPN (e.g., LPN-Macro TA or UE-LPN TA). The LPN may send a TA (e.g., LPN-Macro TA or WTRI-LPN TA) to the WTRU. The WTRU may receive a TA from the Macro or LPN (e.g., LPN-Macro TA or WTRU-LPN TA), which it may use to adjust its UL transmission to the LPN.

The WTRU may transmit a preamble (e.g., random access preamble) to the LPN autonomously (e.g., without a request or command) or may do so in response to an indication, request, or command (e.g., from the Macro) to start or use decoupled mode or in response to a command (e.g., from the Macro) such as a PDCCH order (e.g., for timing alignment). The WTRU may transmit a preamble (e.g., random access preamble) to the Macro autonomously (e.g., without a request or command) or may do so in response to an indication, request, or command (e.g., from the Macro) such as a PDCCH order (e.g., for timing alignment) or RRC reconfiguration (e.g., for mobility or handover).

A WTRU may (e.g., may first) transmit a preamble (e.g., a random access preamble) to a certain cell (e.g., LPN) and may (e.g., may later) need, receive, or use a timing advance that may be for access to another cell (e.g., Macro). The WTRU may use the DL timing or signals (e.g., synchronization and/or reference signals) from the Macro and/or the LPN as its reference timing for the transmission of the preamble to the LPN. The WTRU may receive the timing advance for the Macro from the Macro or the LPN.

For the WTRU-LPN TA, the LPN may determine the TA for WTRU-LPN communication, e.g., the WTRU-LPN TA. The LPN may transmit the WTRU-LPN TA to the WTRU and/or to the Macro. The determination and/or transmission of the WTRU-LPN TA (e.g., by the LPN) may be in response to the preamble or receipt of the preamble by the LPN. The Macro may transmit the WTRU-LPN TA to the WTRU. The transmission of the WTRU-LPN TA (e.g., by the Macro) may be in response to receipt of a communication (e.g., message) from the LPN, which may include a TA that may be intended for a certain WTRU. Communication between the Macro and LPN may be via an X2 interface. The WTRU may receive a TA from the Macro or LPN (e.g., LPN-Macro TA or WTRU-LPN TA) and may use the TA to adjust one or more of its UL transmissions to the LPN.

For the WTRU-Macro TA, the LPN may determine the LPN-Macro TA that it may consider as the WTRU-Macro TA and may provide that TA (or an adjusted version of that TA) to the WTRU. The WTRU may transmit a preamble (e.g., random access preamble) to the Macro autonomously (e.g., without a request or command) or may do so in response to an indication, request, or command (e.g., from the Macro or LPN) such as a PDCCH order (e.g., for timing alignment) or RRC reconfiguration (e.g., for mobility or handover). The indication, request, or command to transmit a preamble or perform a random access, e.g., to obtain a TA, which may be transmitted or provided by the Macro or LPN, may include an indication of coverage enhancement (CE) level and/or a number of repetitions (e.g., preamble repetitions). The WTRU may use the indicated CE level and/or repetitions for communication with the Macro such as for PRACH resource selection, preamble transmission, or other UL transmissions. The Macro may determine the TA for WTRU-Macro communication, e.g., the WTRU-Macro TA, for example in response to a preamble or receipt of a preamble which may be from the WTRU. The Macro may send the WTRU-Macro TA to the WTRU and/or the LPN. The WTRU may receive a TA from the Macro or LPN (e.g., LPN-Macro TA or WTRU-Macro TA), and it may use the TA to adjust one or more of its UL transmissions to the Macro.

A WTRU may or may be able to transmit at least one UL channel to each of at least two nodes, such as a Macro and LPN. If the WTRU may use a different TA for transmission to the nodes, it may be difficult for the WTRU to transmit to those nodes simultaneously, for example, if the WTRU may have one transmitter (e.g., one set of transmitter components).

A WTRU may transmit in the UL simultaneously to certain nodes if (e.g., only if) the TA the WTRU may (or may need to) apply for the UL transmissions to those nodes may be the same or within a certain tolerance or threshold of each other. The WTRU may not transmit in the UL simultaneously to the certain nodes if the TA the WTRU may (or may need to) apply for the UL transmissions to those nodes may not be the same or may not be within a certain tolerance or threshold of each other. The tolerance or threshold may be specified, known or determined by the WTRU (e.g., based on WTRU implementation), or configured (e.g., by one or more of the nodes such as via broadcast or dedicated signaling). This may apply, e.g., may only apply, for a WTRU that may have one transmitter and/or a WTRU that may not support multiple TAs or TA groups (TAGs). The WTRU may receive one TA and may use that TA for UL (e.g., all or certain UL) transmissions to the certain nodes. The WTRU may receive one TA for a node and may apply one of the TAs for UL (e.g., all UL or certain UL) transmissions to the certain nodes.

A WTRU may transmit a first channel (e.g., PUCCH) to a first node (e.g., the Macro) and a second channel (e.g., PUSCH) to a second node (e.g., LPN). If the TA the WTRU may apply for PUSCH transmissions to the Macro may be the same or within a threshold of the TA the WTRU may apply for PUCCH transmissions to the LPN, the WTRU may transmit the PUSCH to the Macro and the PUCCH to the LPN simultaneously. If the TA the WTRU may apply for PUSCH transmissions to the Macro may be not be the same or within a threshold of the TA the WTRU may apply for PUCCH transmissions to the LPN, and if the WTRU may be scheduled for both transmissions (e.g., in the same or overlapping subframes), the WTRU may not transmit both the PUSCH to the Macro and the PUCCH to the LPN simultaneously (e.g., in the same or overlapping subframes). The WTRU may (or may only) transmit the highest priority channel (e.g., PUCCH) or the channel to the highest priority node, for example in the overlapping subframe or subframes.

The WTRU may transmit (e.g., only transmit) to one of the nodes and may drop (e.g., not transmit) the scheduled transmission(s) to the other node or nodes, for example, when the WTRU may be unable to transmit to multiple nodes simultaneously, for example, due to a TA difference (which may be greater than a threshold), if the WTRU may be scheduled for transmission to those nodes simultaneously (e.g., in the same or overlapping subframes).

For channels scheduled for simultaneous (e.g., in the same or overlapping subframes) UL transmission by the WTRU, e.g., to more than one node, the channels may have priorities. The WTRU may transmit the channel with the highest priority and may not transmit the other channels. The WTRU may transmit the channels that may be scheduled for transmission to the highest priority node and may not transmit the other channels. The WTRU may determine the highest priority channel and the node to which it may be transmitted and may transmit the scheduled (e.g., all the scheduled) channels to that node. The WTRU may drop (e.g., not transmit) the scheduled (e.g., all the scheduled) channels to one or more (e.g., all) other nodes. PUCCH may have higher priority than PUSCH (or vice versa). PRACH may have the highest priority. The Macro may have higher priority than the LPN (or vice versa). Node priority may be channel specific or for all channels. SRS may have lowest priority. Periodic SRS may be higher priority than an aperiodic SRS (or vice versa). When multiple SRSs (e.g., of equal priority) may be scheduled simultaneously, e.g., without other channels, the priority (e.g., for which to transmit and which to drop) may be node based, configuration based, or may be determined by the WTRU. When multiple SRSs (e.g., of equal priority) may be scheduled simultaneously, e.g., without other channels, the WTRU may drop (e.g., not transmit) certain or all of the SRSs. SRS may or may only be scheduled and/or transmitted by the WTRU to a node to which it may (or may also) transmit PUSCH.

If the WTRU may be scheduled for simultaneous transmission of PUSCH and PUCCH to different nodes, the WTRU may transmit the PUCCH and may drop (e.g., not transmit) the PUSCH. If the WTRU may be scheduled for simultaneous transmission of PUCCH and SRS to a first node and PUSCH to a second node, the WTRU may transmit the PUCCH and SRS to the first node, which may be due to the priority of the PUCCH over the PUSCH). The WTRU may drop (e.g., not transmit) the PUSCH. If the WTRU may be scheduled for simultaneous transmission of (e.g., equal priority) SRSs to a first node and a second node, the WTRU may transmit the SRS to the node with higher priority for at least SRS (e.g., standalone SRS) transmission and may not transmit the SRS to the other node. The WTRU may choose (e.g., randomly) which SRS to transmit and which to not transmit and may transmit accordingly.

The nodes (e.g., Macro and LPN) may share or exchange information (e.g., over X2) regarding the period (and/or other parameters) of the SRS that may be transmitted in each one's cell. These may include the period and/or parameters for cell specific SRS and/or one or more WTRU-specific SRS that may be specific to one or more certain WTRUs that may be operating in decoupled mode with the nodes. A node may use this information to avoid UL collisions with SRS transmissions to another node and/or symbols or subframes reserved for SRS by another node.

A Macro and an LPN may share their periodic SRS parameters for a certain WTRU that may be operating in decoupled mode with the Macro and the LPN. The LPN may avoid scheduling PUSCH transmission for the WTRU in subframes that may overlap with the WTRU's periodic SRS subframes for the Macro.

A scheduled channel or transmission may be a channel or transmission for which resources may be (or may have been) allocated such as by grant, configuration, request, or other means. A retransmission may be (e.g., considered) a scheduled transmission (e.g., of a PUSCH). One or more of PUSCH, PUCCH, SPS, and PRACH may be (e.g., considered) scheduled, a scheduled channel or a scheduled transmission. A scheduled transmission may be a planned transmission. PRACH which may be requested (e.g., by a node) or autonomously planned or initiated (e.g., by a WTRU) may be (e.g., considered) a scheduled transmission. Scheduled channel and scheduled transmission may be used interchangeably. Scheduled and allocated may be used interchangeably.

One or more of the nodes may adjust their timing such that the WTRU may use the same TA for transmission to both nodes. For example, the LPN may adjust its time using one or more mechanisms described herein (e.g., for time synchronization) such that the WTRU may use one TA for UL transmission to the Macro and the LPN.

A WTRU may transmit simultaneously to the Macro and the LPN in certain cases, such as decoupled mode operation with the same TA for Macro and LPN.

In decoupled operation arrangement (e.g., assuming DL transmissions from the Macro and UL transmissions to the LPN), upon the reception of the Physical Downlink Shared Channel (PDSCH) by the WTRU, the WTRU may send the corresponding Hybrid Automatic reQuest (HARQ) feedback to the LPN. The LPN may communicate the feedback to the serving eNB (e.g., the Macro), which may have sent the corresponding PDSCH. A timing criterion for eNB to receive the PDSCH HARQ feedback may not be sufficient due to the extra LPN processing and further communication and/or communication delay between LPN and eNB. The eNB may not be able to inform the LPN of the transmission of the PDSCH and the LPN may not expect to receive the PDSCH-related feedback when they are sent by the WTRU. Such an arrangement may make it difficult for the LPN to properly receive and/or decode a feedback. An improved HARQ operation may be provided.

When an eNB may send a PDSCH to a WTRU, it may expect the WTRU to provide an ACK/NACK feedback, e.g., via PUCCH and/or PUSCH, in response to that PDSCH. The eNB may expect the ACK/NACK in a specific frequency and/or time location that may be relative to the frequency and/or time location of the PDSCH. The eNB may expect to receive a PUCCH in that specific resource location from that specific WTRU. When the eNB may detect or receive a PUCCH, it may know from which WTRU it may be coming. The resource location and/or timing of the PUCCH transmission may (e.g., implicitly) identify at least in part the identity of the WTRU which may (or may have) transmit the PUCCH. In an UL/DL decoupled scenario the LPN may not be aware of Macro eNB PDSCH transmission and may not at least one of expect, detect, and/or look for the corresponding PUCCH.

ACK/NACK may be a feedback for a HARQ process or procedure. ACK/NACK may represent one or more of ACK (positive acknowledgement), NACK (negative acknowledgement), and DTX (discontinuous transmission which may mean no acknowledgement).

In certain scenarios such as a decoupled scenario, a WTRU may transmit DL HARQ Ack/Nack information to an eNB, e.g., LPN, in response to reception of one or more DL signals (e.g., PDSCH) from another eNB (e.g., Macro), which may be successful or unsuccessful. The one eNB may not be aware of the DL transmission by the other eNB and/or may not expect the Ack/Nack feedback. A WTRU may use SR for the feedback, for example, since SR resources may be available (e.g., configured or pre-configured) for the WTRU (e.g., semi-statically).

In certain scenarios such as certain decoupled operation scenarios, a WTRU and/or eNB may not follow the PDSCH-related HARQ operation and/or timing of certain standards releases. A WTRU and/or eNB may use one or a combination of the mechanisms for HARQ operation described herein.

The WTRU may not transmit an ACK/NACK signal in response to reception of a PDSCH, for example, using (or according to) the PDSCH HARQ ACK/NACK timing of certain (e.g., LTE or LTE-A) releases. Following the transmission of a PDSCH by an eNB, the eNB may not expect to receive an ACK/NACK from the WTRU, for example using (or according to) the PDSCH HARQ ACK/NACK timing of certain (e.g., LTE or LTE-A) releases.

In response to the reception of one or more PDSCH (e.g., from an eNB such as the Macro) by the WTRU, the WTRU may transmit the related PDSCH HARQ ACK/NACK using Scheduling Request (e.g., SR) resources and/or signal (e.g., to the eNB or another eNB such as the LPN). After the transmission of one or more PDSCH by an eNB (e.g., Macro), the eNB may receive (or expect to receive) the related PDSCH HARQ ACK/NACK by receiving a signal on SR resources and/or SR signal. An eNB (e.g., LPN) may receive PDSCH HARQ ACK/NACK by receiving a signal on SR resources and/or SR signal. The eNB may provide the feedback to another eNB (e.g., Macro).

A WTRU may bundle the HARQ ACK/NACK bits corresponding to one or more PDSCH, received in a time window, into one or more ACK/NACK bits. The WTRU may receive a configuration of the HARQ bundling time window through higher layer signaling, e.g., from eNB. The HARQ bundling window may be represented with one or more parameters such as window size (possibly represented in number of subframes, e.g., n), window offset (possibly represented in number of subframes, e.g., m), etc. As an example of window size, it may be set to the same value as the number of subframes between two consecutive configured SR resources. As an example for window offset, it may be defined and/or configured as a number of subframes (e.g., m=4) before the subframe including the next SR resource (e.g., the SR resource to be used to carry the corresponding PDSCH HARQ ACK/NACK bits). For example, for a WTRU with n=10 and m=4, the WTRU may receive certain (e.g., all) potential PDSCHs in a window with the size of 10 subframes which may end 4 subframes before the next SR resource. The WTRU may determine the PDSCH HARQ ACK/NACK bits for certain (e.g., all the) received PDSCH data within the window. The WTRU may bundle all those bits into a single ACK/NACK bit, and it may send the bundled ACK/NACK bit using the next SR resource (e.g., to the eNB).

After the reception of a possibly bounded PDSCH HARQ feedback by the eNB, that eNB may apply the received HARQ feedback for certain (e.g., all) PDSCH it may have transmitted to the WTRU during the corresponding PDSCH transmission window.

A WTRU may not send PDSCH negative acknowledgement to the eNB. The WTRU may (or may only) send PDSCH positive acknowledgements to the eNB. The WTRU may send an actual transmission request to the eNB using a PUCCH in the SR resources that may include the same constellation point as for a negative HARQ PUCCH acknowledgement. The WTRU may send a PUCCH in the SR resources to the eNB that may include the same constellation point as for a positive HARQ PUCCH acknowledgement as a positive PDSCH HARQ acknowledgement for the corresponding PDSCH(s). The negative and positive acknowledgment may be presented by different constellation points. The eNB may expect to receive a PDSCH HARQ ACK/NACK within a predefined time frame. If the eNB may not receive a positive acknowledgement during the predefined time frame, it may assume a negative acknowledgment for the corresponding PDSCH(s).

A WTRU may not send PDSCH positive acknowledgement to the eNB. The WTRU may (or may only) send PDSCH negative acknowledgements to the eNB. The WTRU may send an actual transmission request to the eNB using a PUCCH in the SR resources that may include the same constellation point as for a negative HARQ PUCCH acknowledgement. The WTRU may send a PUCCH in the SR resources that may include the same constellation point as for a positive HARQ PUCCH acknowledgement as a negative PDSCH HARQ acknowledgement for the corresponding PDSCH(s). The negative and positive acknowledgments may be presented by different constellation points. The eNB may expect to receive a PDSCH HARQ ACK/NACK within a predefined time frame. If the eNB may not receive a negative acknowledgement during the predefined time frame, it may assume a positive acknowledgment for the corresponding PDSCH(s).

A signal transmitted on SR resources may not include a certain (e.g., any) UL transmission request from the WTRU. The eNB may not interpret every PUCCH received in a SR resource as the one including an actual UL data transmission request from that specific WTRU. The WTRU may send PUCCH to inform the network of its UL transmission request in (e.g., only in) a subset of the SR resources. The WTRU may receive indications on which SR resources to use for this purpose. For example, the WTRU may receive a second configuration for the SR resources. This second configuration may indicate a subset of PUCCH resources provided by the first (e.g., main) configured SR resources. As an example, the WTRU may receive a configuration parameter r that may indicate that every r-th SR resource (e.g., every r-th subframe including SR resources for that WTRU) may carry an actual UL transmission request and/or possibly not the potential PDSCH HARQ ACK/NACK bit(s). The WTRU may send PUCCH to inform the network of its PDSCH HARQ ACK/NACK in (e.g., only in) a subset of the SR resources. The WTRU may receive indications on which SR resources to use for this purpose. For example, the WTRU may receive a second configuration for the SR resources. This second configuration may indicate a subset of PUCCH resources provided by the first (e.g., main) configured SR resources. As an example, the WTRU may receive a configuration parameter r which may indicate that every r-th SR resource (e.g., every r-th subframe including SR resources for that WTRU) may carry PDSCH HARQ ACK/NACK bits and/or possibly not the potential UL transmission request.

The WTRU may not send PDSCH HARQ ACK/NACK bits (e.g., via PUCCH) in an (e.g., every) UL subframe. The WTRU may receive a configuration parameter indicating which subframes the WTRU may use to send PDSCH HARQ ACK/NACK bits (e.g., via PUCCH). The WTRU may receive a configuration parameter r that may indicate that every r-th subframe may include PUCCH resources allocated to the WTRU and/or the WTRU may only transmit PDSCH HARQ ACK/NACK bits (e.g., via PUCCH) in those subframes. Different WTRUs may be configured by the same PUCCH resources and/or the same PUCCH indexes. Different WTRUs may be configured to potentially send PDSCH HARQ ACK/NACK bits (e.g., via PUCCH) in different subframes.

PUSCH-based HARQ ACK/NACK may be provided. A WTRU may transmit a PUSCH carrying the corresponding PDSCH HARQ ACK/NACK bit(s), e.g., when the WTRU receives one or more PDSCH. The WTRU may not transmit a PUCCH including the corresponding PDSCH HARQ ACK/NACK bits, when the WTRU receives one or more PDSCHs. The WTRU may transmit the PDSCH HARQ ACK/NACK bit(s) of one or more PDSCHs in the same PUSCH. For example, the WTRU may transmit the HARQ ACK/NACK bit(s) of each PDSCH received in a certain period of time, e.g., a time window, in the same PUSCH. This window may be referred to as HARQ bundling window. A PUSCH may carry PDSCH HARQ ACK/NACK bit(s) and/or information regarding the corresponding PDSCH(s). For example, the PUSCH may carry indications of the DL HARQ processes of the corresponding PDSCH(s). The PUSCH may carry indications of the frequency and/or time locations the corresponding PDSCH(s) may be received. The WTRU may receive one or more configuration parameters defining the HARQ bundling window, e.g., window size. The size of the bundling window may be a value equal or greater than one. The WTRU may receive one or more UL grants for each window to carry the PDSCH HARQ ACK/NACK bits of the corresponding window. The WTRU may derive the frequency, time location and/or other transmission parameters of the PUSCH carrying the PDSCH HARQ ACK/NACK bits based on one or more DL grants of the PDSCH and/or PDSCH in the corresponding HARQ bundling window. For example, the transmission parameters of the PUSCH carrying the PDSCH HARQ ACK/NACK bits may be derived based on the characteristics of the first (or last) PDSCH grant in the corresponding bundling window. The WTRU may derive the frequency, time location and/or other parameters of the PUSCH carrying the PDSCH HARQ ACK/NACK bits, e.g., based on the boundaries of the bundling window. For example, the related PUSCH may be transmitted in n subframes after the end of the bundling window.

Modified PDSCH HARQ ACK/NACK timing may be provided. The eNB may be configured to expect to receive the PDSCH HARQ ACK/NACK, from the WTRU and/or another network entity, within a predefined and/or configured time window (possibly in terms of subframes), e.g., following the transmission of the corresponding PDSCH. The eNB may be configured to expect to receive the PDSCH HARQ ACK/NACK, from the WTRU and/or another network entity, e.g., after a predefined and/or configured number of subframes following the transmission of the corresponding PDSCH.

A WTRU may be configured for HARQ-less operation for transmission and reception of Physical Uplink Shared Channel (PUSCH) and PDSCH data. The WTRU may rely on RLC AM and ARQ operation for reliable reception and transmission of data. A WTRU without HARQ may not have a reliable delivery mechanism for MAC control elements. Improvements to MAC CE reliability may be provided. For a WTRU with HARQ-less operation, reliability improvements may be provided, e.g., for delivery of msg3 during the RACH procedure, which may operate in RLC transparent mode.

A WTRU may be configured to operate without HARQ processes for transmission and/or reception of PUSCH and PDSCH data, e.g., HARQ-less operation. A WTRU may receive PDSCH data and in response may transmit ACK/NACK in the allocated PUCCH or, if available, in PUSCH. A WTRU may be configured not to transmit any HARQ-ACK response. In HARQ-less operation, a WTRU may not receive a retransmission of PDSCH data corresponding to NACK response as part of the HARQ process. From the UL perspective, a WTRU may not expect to receive HARQ feedback in response to PUSCH transmission on PHICH from the eNB. For example, a WTRU may receive HARQ response on the PHICH, but may not re-transmit the PUSCH data in response to a received NACK. For example, a WTRU may not be allocated with PHICH resource for HARQ-less operation. For UL and DL, the WTRU, on receiving or transmitting the first transmission of data, may consider the HARQ process completed. In an HARQ-less operation, a WTRU may use RLC acknowledged mode and ARQ process for retransmissions for reliable data transfers. The ARQ process of AM RLC ARQ may allow for a less stringent feedback time between the transmitter and the receiver, and may allow for additional delays between UL receiving and DL transmitting eNBs, e.g., in the decoupled UL/DL scenario.

Delivery of MAC CEs between eNB and WTRU may rely on the HARQ processes for feedback and any retransmissions. A WTRU in HARQ-less operation may be configured with RLC AM with ARQ process for data retransmissions and in-sequence delivery of packets. A WTRU may not use HARQ processes as a reliable delivery method for delivery of MAC CEs in HARQ-less operation. The WTRU may be configured with one or more of RLC S/N to MAC CE mapping, individual MAC CE delivery, MAC CE based on HARQ feedback, information included in MAC CE delivered by other layers, or MAC CE including UL grant for reliable delivery of MAC CEs.

A WTRU may associate a MAC CE with the sequence number of RLC PDU to which the WTRU may include the MAC CE to construct the MAC PDU for transmission. The WTRU may allocate a one-to-one mapping between the MAC CE and the RLC PDU. When the RLC, e.g., based on ARQ feedback needs to retransmit the RLC PDU, the WTRU may determine the mapping between the re-transmitted RLC PDU sequence number and MAC CE, and may include the MAC CE in the retransmission of the RLC PDU. For example, the WTRU may transmit a RLC PDU with the MAC CE in the MAC PDU for the first and retransmission for the ARQ process.

A WTRU, e.g., for PDSCH transmissions, may receive a single data packet in PDCP that may be segmented into one or more RLC SDUs (e.g., eight RLC SDUs). Each SDU may be assigned a sequence number (e.g., SN 0~7) to construct RLC PDUs. Each RLC PDU may be assigned to separate HARQ process. The MAC may include a MAC CE to RLC PDU with SN (e.g., SN 7, which for example the WTRU may transmit with errors). The error may be indicated by the receiver RLC entity (e.g., on the network side) with an RLC STATUS PDU, or may be indicated by lower layers, e.g., by an HARQ NACK feedback response from the corresponding HARQ process. In the RLC ARQ retransmission, the WTRU transmitting RLC entity may again provide MAC with RLC PDU with SN7, and the MAC entity, receiving the SN7 may be re-transmitted and based on the mapping between SN and MAC CE may include the MAC CE into the MAC PDU for transmission by a HARQ process.

A WTRU may provide an empty RLC PDU to the MAC layer with headers such that the MAC layer may include MAC CE with the RLC PDU, e.g., to construct the MAC PDU. A WTRU may use the RLC ARQ process to determine whether the MAC CE has been properly received by the receiver MAC entity, e.g., based on the positive ARQ or negative feedback received. The WTRU MAC entity may determine whether the MAC CE is properly received based on the single HARQ feedback received by HARQ process which sent the MAC CE. If a negative ARQ feedback and/or HARQ feedback is received for the RLC PDU sequence number which included the MAC CE, the WTRU may retransmit the header RLC PDU and the MAC layer may include the same MAC CE for retransmission. On the receiver RLC entity side, an empty RLC PDU may be included into the receiver buffer for the purpose of in-sequence delivery and proper reconstruction of the RLC SDU and for purpose of ARQ process feedback, but otherwise is discarded once the receiver window is moved beyond the RLC PDU, and may not be delivered to high layers.

To indicate to RLC its intention for delivery of a MAC CE, the MAC layer may provide an indication to the RLC layer to provide an empty RLC PDU, e.g., with RLC PDUs to be transmitted in an upcoming grant. For example, the MAC layer may request the empty RLC PDU from any RLC entity associated with the MAC layer, or possibly may request the empty PDU from the RLC entity associated with the lowest logical channel identifier In HARQ-less operation, a WTRU may receive a HARQ feedback for any UL transmission and may transmit HARQ feedback for DL reception but may not transmit or receive any retransmissions for a HARQ process. A WTRU may then determine the reliable transmission and reception of a MAC CE, based on the acknowledgement of the HARQ. For reception of MAC CE in DL, in case a MAC CE reception resulted in NACK, a WTRU may expect the retransmission of MAC CE in another HARQ transmission. In case of decoupled UL/DL, the DL transmission of MAC CE and the resulting feedback may allow for sufficient tolerance of delay between the eNB which receives the HARQ feedback from the WTRU to the eNB which transmits and then retransmits the MAC CE in the next DL opportunity.

For transmission of MAC CE in UL by a WTRU, the WTRU may, based on received NACK feedback for a previous transmission, include the same MAC CE for transmission on a HARQ feedback based on normal procedures for MAC CE inclusion into the MAC PDU for UL transmission. In the transmission, the WTRU may transmit the MAC CE, or may include it into the MAC PDU with data from higher layers. For example, a WTRU may transmit ad/or receive MAC CE in multiple HARQ transmissions, repeated in different HARQ processes. A WTRU may receive and/or transmit multiple repeated MAC CEs regardless of HARQ feedback. A WTRU may include and/or receive a MAC procedure identifier in the MAC subheader along with LCID, which may indicate the MAC CE type, e.g., in order to distinguish between repeated MAC CEs and a different MAC CE. The number of repetitions may be a function of the coverage enhancement mode for which the WTRU may be configured, and may be indicated by higher layer signaling from the eNB.

A WTRU may provide or receive information indicated in a MAC CE by signaling from a layer; for example, by RRC signaling or PDCCH in physical layer. For example, a WTRU may use information related to RACH procedure, e.g., RAR, and timing alignment command for decoupled UL/DL and/or coverage enhancement scenario.

For example, the WTRU may receive the one or more of a timing advance command, an UL grant, or an C-RNTI from RRC or PDCCH. The timing advance command may be one or more bits (e.g., 6 or 11 bits) and may indicate timing adjustment amount. For example, in response to preamble transmission, WTRU may receive this information in PDCCH, e.g., masked with C-RNTI for the WTRU. The UL grant may be one or more bits long (e.g., 20 bits) and may indicate UL resources to be used for transmission by the WTRU. For example, this information may be received by the WTRU in PDCCH masked with C-RNTI. The C-RNTI may be one or more bits long (e.g., 16 bits) and may indicate the WTRU identifier allocated the cell. For example, a WTRU may include C-RNTI as part of a RRC message as part of the scheduling request procedure using RACH for UL transmission of data.

A WTRU, for example, using decoupled UL/DL for reception and transmission, and in coverage enhancements mode may not use certain MAC CEs for the purpose of assisting the eNB scheduler with information for proving UL grants to the WTRU. For example, a WTRU may not be configured to transmit PHR, BSR MAC CEs. For example, a WTRU may expect not to receive commands such as for DRX, MBMS or carrier activation/deactivation, which a WTRU in coverage enhancement mode and decoupled UL/DL may not support.

A WTRU may be indicated with UL grant information that may be included in a MAC CE received from the network. A WTRU may use the included UL grant to transmit the corresponding HARQ feedback of received MAC CE information on the allocated PUSCH. The WTRU may be allocated with PUSCH for the purpose of HARQ feedback rather than using PUCCH in the decoupled UL/DL scenario. For example, a WTRU may receive MAC CE with UL grant information for each scheduled PDSCH reception of data, which may be used by the WTRU to transmit the corresponding HARQ feedback for reception of PDSCH data on PUSCH. The WTRU may receive reduced UL grant information in the MAC CE. The MAC CE UL grant may include RB assignment and/or modulation and coding scheme. The WTRU may receive the UL resources for HARQ A/N transmission, or may include resources for UL data and/or for other UL control information.

As part of RACH related message transmissions, e.g. msg3, WTRU may rely on HARQ process for feedback and retransmissions for increased reliability of signaling. A WTRU, by default may have a radio bearer configuration with RLC in transparent mode. For a WTRU configured for HARQ-less operation, there may be no feedback and retransmission mechanism to ensure reliable signaling for msg3 and possibly RRC connection request for initial connection establishment. For purpose of reliable msg3 transmission in HARQ-less operation, a WTRU may be configured with one or more of the following.

A WTRU may configure a default signaling radio bearer (SRB), e.g., as specified in RRC for UL transmission of msg3 as part of random access procedure. A WTRU may configure the default SRB with RLC acknowledged mode. The WTRU may be configured for SRB with RLC AM, e.g., without explicit configuration signaling from the network with default parameter values as defined in RRC. The WTRU may configure the RLC AM related parameters such as reordering timer (e.g., t-Reordering) with the maximum allowable duration, e.g., 200 ms, to allow for the longest delay for coverage enhancement mode operation in the ARQ process. For example, the WTRU may configure the default SRB with t-Reordering for longer than 200 ms, e.g., depending on the coverage enhancement amount that is specified for the WTRU.

In a HARQ-less operation, if the msg3 transmission fails, e.g., a WTRU does not receive RRC connection setup message, the WTRU may re-attempt the msg3 transmission. The WTRU may be provided with an UL grant, e.g., via PDCCH with the WTRU C-RNTI which may be pre-allocated by the network, or via the TC-RNTI, which may be allocated to the WTRU by the previous reception of RAR from the network. The WTRU may reuse the same resources from the UL grant that was allocated in the initial msg3 transmission attempt. For example, in the UL grant, the WTRU may receive a semi-persistent scheduling of msg3 in case of unsuccessful transmissions. The WTRU may be configured with a re-transmission timer and maximum number of msg3 transmission attempts. For example, the WTRU may use the T300 timer and maxHARQ-Msg3Tx IE values, e.g., as specified in SIB of the cell for the purpose in HARQ-less operation. For example, on expiry of the retransmission timer, the WTRU may attempt a re-transmission of the same msg3 contents in the same UL resource in the next available UL subframe. The WTRU may, on reaching maximum number of msg3 retransmissions, reset MAC and indicate to the higher layers of failure of RRC connection establishment. As part of the re-attempt of msg3 transmission, the WTRU may perform the random access procedure from preamble transmission to the same cell. For example, the WTRU may receive in the UL grant for initial msg3 transmission configuration for dedicated RACH resources for msg3 re-transmission. The WTRU may re-use the same dedicated RACH resources on a re-attempt, e.g., until the number of maximum msg3 transmission re-attempts has been reached.

Power control may be provided. If a WTRU may be unable to receive TPC commands from a node and/or may be unable to measure pathloss for that node, existing means for power control may not work properly. A WTRU may perform a random access process to a node to determine a transmit power to that node where the random access and/or transmit power may not depend on pathloss.

The WTRU may perform a random access process to a certain node (e.g., LPN) with the pathloss set to 0. At the completion of the process, for example, if successful, the WTRU may use its last PRACH transmission power or an adjusted version of that power for certain UL transmissions to the node.

The WTRU may start the RA process to a node at a certain power (e.g., fixed power). The WTRU may transmit a preamble at that power. If the WTRU may not receive a response (e.g., RAR) within the expected time window, the WTRU may ramp the power and try again. The WTRU may repeat (e.g., after waiting a backoff time) the process until it may reach (or exceed) its maximum power and/or until it may reach (or exceed) the maximum number of ramping attempts.

The starting power may be a fixed value such as −10 dB or may be configured, e.g., by a node such as the one to which the preamble may be intended (e.g., LPN) or a specific node (e.g., the Macro). The amount to ramp by and/or the maximum number of ramping attempts may be configured, e.g., by a node such as the one to which the preamble is intended (e.g., LPN) or a specific node (e.g., the Macro). The configuration may be provided by broadcast signaling (e.g., system information such as in a SIB) or dedicated signaling.

The process may be considered or determined to be successful (e.g., by the WTRU) if the WTRU may receive a response before reaching (or exceeding) its maximum power and/or the maximum number of ramping attempts. The PRACH preamble for which a response is received may be referred to herein as the successful preamble. The transmission power the WTRU may use for the successful preamble may be referred to herein as P-PRACHsuccess.

The WTRU may use P-PRACHsuccess to determine the power for certain UL transmissions to the node (e.g., LPN). For example, the WTRU may use P-PRACHsuccess for all UL transmissions to the node or the WTRU may add an offset to P-PRACHsuccess to obtain the transmission power for certain channels. The offset may be the same or different for different UL channels. The offset(s) may be provided by broadcast signaling (e.g., system information such as in a SIB) or dedicated signaling from a node such as the one to which the preamble is transmitted or a specific node (e.g., the Macro). The offset(s) may be reconfigured, e.g., by the node.

The WTRU may use a fixed power transmission for one or more channels. The fixed power may be initially configured by broadcast or dedicated signaling and may be reconfigured by dedicated signaling from one or more of the nodes (e.g., Macro or LPN).

Systems for decoupled scenarios may be provided. For decoupled scenarios, the radio protocol architecture that a particular bearer may use may depend on the bearer setup. The radio bearer may be split between downlink 702 and uplink 704 at the S-GW, as shown in the example system 700 of FIG. 7. As shown in the example system 800 of FIG. 8, the downlink bearer S1-U may come from the S-GW and go to the Macro-eNB, and the uplink bearer may be routed from the LPN 802 to the PDCP 804 on the Macro 806, which may allow for a single bi-directional S1-U link from Macro eNB (MeNB) 806 to the S-GW.

Figure 7:
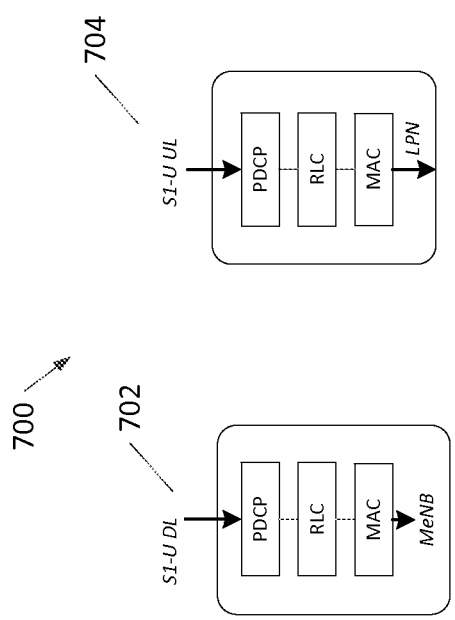
FIG. 7 illustrates another example DL/UL decoupled system.
Figure 8:
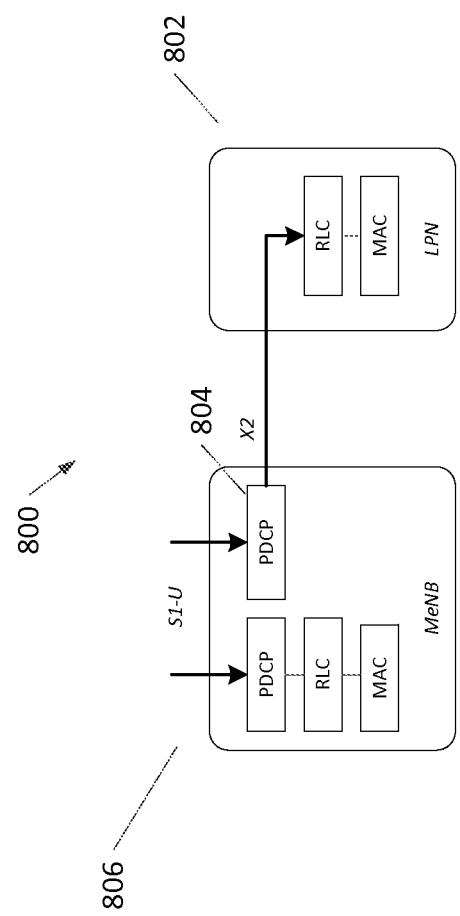
FIG. 8 illustrates another example DL/UL decoupled system.
Figure 9:
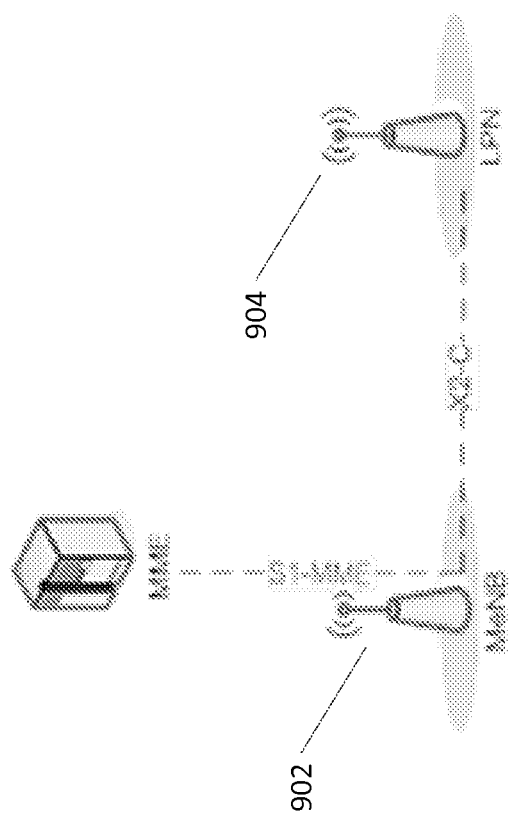
FIG. 9 illustrates an example of C-plane connectivity of eNBs in a decoupled system.

FIG. 9 illustrates an example of C-plane connectivity between eNBs 902, 904 involved in a decoupled scenario. The eNBs 902, 904 (e.g., Macro eNB and LPN) that may be involved in supporting decoupled operation (e.g., as illustrated in FIGS. 7-8) may own its radio resources and may be responsible (e.g., primarily responsible) for allocating the radio resources of its cells. Coordination between MeNB and LPN may be performed by means of X2 interface signaling.

In case of decoupled scenarios, the multi-node nature of the transmission may translate for the WTRU into having two WTRU entities configured, e.g., one MAC entity for MeNB and one MAC entity for LPN.

In case of decoupled scenario, the WTRU may be configured with separate RRC entities for the downlink and uplink nodes, and separate configuration of the decoupled signaling radio bearers. For example, the RRC Connection Setup message may include the configuration of a signaling radio bearer with an indication of downlink bearer configuration associated with one network node (for example, the Macro eNB) and uplink bearer configuration associated with another network node (for example, the LPN node).

The WTRU may be configured with user plane bearers that may (or may need to) operate in decoupled mode, for example using a new or modified user plane configuration. On (or following) receiving the RRC re-configuration message, the WTRU may determine the downlink and uplink links of a logical channel may need to be associated with different network nodes. The WTRU may create separate logical channels for the downlink and uplink directions.

Upon (or following) change of WTRU operation for one or more bearers from coupled mode to decoupled mode or vice versa, the WTRU may (e.g., additionally) be configured to perform a Security configuration/re-configuration with the eNB and/or the MME. The WTRU may be configured to maintain separate AS and NAS security keys for the downlink and the uplink directions of the radio bearer which may be associated with a RAB that may be operating in decoupled mode. For example, when the WTRU may be configured to move one or many bearers to the decoupled mode, the WTRU may receive a modified Security Mode Command or a RRC Reconfiguration message with configuration to create or update the KeNB which may be associated with one or more network nodes.

A WTRU may be camped on a suitable cell (e.g., for downlink), and may (or may need to) initiate a RRC Connection with the network. The WTRU may perform connection establishment, which may include a random access procedure. The random access procedure may include one or more of Message 1-Message 4. The random access procedure may be in accordance with one or more solutions and/or examples described herein.

At Message 1, the WTRU may determine the PRACH resources to use to send RA Message 1 to the network. The WTRU may obtain the PRACH resources to be used for uplink from higher layer signaling (for example, SIB signaling) from the Macro eNB. The PRACH configuration from Macro eNB may indicate one or multiple sets of PRACH resources that may be used to send Message 1. Sets of PRACH resources may be associated with different network nodes.

The WTRU may choose a PRACH resource from the configured set based on one or more of turns, measurements, or configuration priority. The WTRU may select PRACH resources from one set of the configured set at a time. The WTRU may attempt to listen to response message for a preconfigured duration. If WTRU fails to receive a response, the WTRU may be configured to select PRACH resources from another set.

The WTRU may perform and maintain downlink measurements for the neighbor nodes of the network node the WTRU is camped on. The WTRU may maintain an ordered list of the network nodes ordered on the measurement results. The WTRU may select the PRACH resources associated with network node highest on the list, and keep moving down the list until it is successful in obtaining a response to the RACH message.

The WTRU may be configured with a priority in which the PRACH resources may be selected. For example, the WTRU may be configured with a priority of each set of PRACH resources, and may keep moving down the list until it is successful in obtaining a response to the RACH message. The WTRU may be configured to select resources associated with the Macro with the highest priority.

The WTRU may be configured with configuration parameters such as the power to be used to transmit the PRACH and/or the response window to be used to receive the response message. The WTRU may be configured to calculate the power to be used for PRACH transmission. For example, the WTRU may be configured with a value of offset associated with each resource set that may be applied to the power calculated for PRACH transmission to the Macro eNB.

Network nodes (for example, the LPN) that successfully receive a PRACH from the WTRU may be configured to send a message indication to a (or the) Macro eNB. The network node may determine the destination of the indication from the PRACH resource received from the WTRU. For example, a network node (for example, the LPN) may partition its PRACH resources and provide unique sets of PRACH resources to the neighbor Macro eNBs. The LPN may report the reception of PRACH to the Macro eNB. The report may also include the received power of the PRACH, the timing of the message (to be used for calculation of timing advance), and/or an uplink grant that should be sent in the RAR message to the WTRU. The network node (for example the LPN) may create the RAR message and send it in the report as a transparent container to the Macro-eNB.

Upon (or in response to) receiving one or more reports from neighboring nodes (for example, neighboring LPNs), the (or a) Macro-eNB may select the LPN. For example, the Macro-ENB may select the LPN which reported the highest received power in the report.

The Macro eNB may prepare a RAR response using parameters obtained in the report or transparent RAR message received from the LPN, and perform transmission to the WTRU.

At Message 2, the WTRU may receive or expect to receive a Random Access Response (RAR) from a network node. The RAR message may indicate uplink grant and the timing advance to be used by the WTRU for transmission of subsequent messages. The RAR message may indicate the identity of the network node for subsequent transmissions. For example, the RAR message may have the identifier of the LPN node and the timing advance that the WTRU may use for uplink for subsequent transmissions.

At Message 3, the WTRU may transmit the RRC Connection Request message using the configuration parameters in Message 2. In the decoupled scenario illustrated in FIG. 7, the WTRU may be configured to use HARQ-less operation as specified in Section 5.8. In the decoupled scenario illustrated in FIG. 8, the WTRU may be configured to use HARQ to send Message 3.

At Message 4, the WTRU may receive RRC Connection Setup message from the network node associated with the downlink traffic. For example, the RRC Connection Setup message may include the configuration of a signaling radio bearer with an indication of downlink bearer configuration associated with one network node (for example, the Macro eNB) and uplink bearer configuration associated with another network node (for example, the LPN node id).

At Message 5, the WTRU may send the RRC Connection Setup Complete message from the network node associated with the downlink. The WTRU may send a NAS message to the MME piggybacked on the RRC Connection Setup Complete message. The NAS message may be a modified Attach Request or a new message that sends the identifier of the downlink and the uplink network nodes to the MME. The eNB may also add an indicator to the MME to support configuration of S1-MME and S1-U links (for example, S1-U DL to the downlink node and S1-U UL link to the uplink node link).

If the WTRU initiates RRC Connection establishment (e.g., if the WTRU is already connected in the coupled mode), the WTRU may use higher layer signaling (for example RRC signaling) to request the network that the WTRU needs to operate in decoupled mode. The indication may include measurements of neighboring nodes, if available, that triggered the transmission of indication. The WTRU may transmit the indication using pre-configured PRACH resources.

Upon (or following) receiving the indication from the WTRU, the network node may inform the MME to reconfigure the S1 link. For example, the Macro eNB may send a modified Path Switch message or a new S1-C message to the MME with the list of radio bearers that need to be reconfigured. The message may include the identifier of the network nodes associated with the downlink and uplink directions of each RAB that needs to be re-configured. Upon receiving the request from the network node, the MME may send a reconfiguration message (for example, a modified Handover Request Message or a new message) to one or multiple of the network nodes associated with the RABs to be reconfigured. The MME may send the context of the WTRU in the message, including the WTRU context, subscription parameters, etc. The MME may additionally send the Aggregate Maximum Bit Rate (A-MBR) to the network nodes, associated with the direction of the RAB (for example, downlink A-MBR may be sent to the network node associated with downlink RAB and uplink A-MBR may be sent to the network node associated with the uplink RAB).

Radio link monitoring (RLM) for mobility support may be provided. In some cases, the WTRU and/or an LPN may be mobile. If the WTRU is actively transmitting data in the UL, the LPN may be able to determine a possibly worsening link from the WTRU. An actively transmitting WTRU may be a WTRU that has been recently scheduled for PUSCH transmissions or that is expected to be imminently scheduled for PUSCH or that has recently transmitted PUCCH or is expected to be transmitting PUCCH imminently. A recently scheduled or imminent transmission may be one occurring within a possibly pre-configured amount of subframes from the current subframe. An LPN may determine that a link is worsening by a decrease of the MCS; an increase in a threshold number of HARQ retransmissions; a decrease in the overall WTRU throughput; and/or a decrease in the received power of a channel or signal, such as SRS. Such a channel may be one that is used for probing purposes by the WTRU, such as a modified PRACH transmission where no RAR message is expected by the WTRU.

Upon (or following or in response to) detecting degradation in uplink conditions, an LPN associated with the uplink may send a report to the downlink network node (for example the Macro eNB in decoupled scenarios discussed herein) associated with the WTRU. The downlink network node may determine the need to reconfigure the uplink.

A WTRU may determine to perform reconfiguration in the uplink by an explicit command from the network. The WTRU may receive command from the network (for example, higher layer signaling using MAC, RRC) to trigger reconfiguration of the uplink. For example, the WTRU may receive a message or RRC Reconfiguration message with mobility configuration parameters to move the uplink connection from existing LPN node to a new target LPN node.

A WTRU may be configured to determine uplink issues, for example, when the number of RACH failures reaches a configured threshold. For example, a WTRU may initiate RACH to send a SR and/or BSR to request resources, and if the number of RACH attempts exceed a pre-configured threshold, the WTRU may determine uplink issues.

A WTRU may be configured to determine uplink issues if the number of scheduling requests exceed a preconfigured threshold.

The WTRU may send a BSR to request for a grant. If it does not receive a response from the eNB within a preconfigured duration, the WTRU may determine issues in the uplink radio link. For example, a new timer may be started when BSR is sent, or the expiry of an existing timer retxBSR-Timer may trigger the WTRU to detect uplink issues.

A WTRU may be configured to determine it has uplink issues if the HARQ negative feedback to uplink transmissions is above, below, or equal to a configured threshold. For example, a WTRU may be configured to determine it has uplink radio link issues when the number of NACKs received in a certain window reaches or exceeds a configured threshold.

A WTRU may be configured to determine uplink issues if one or more of the specified triggers cause the WTRU to detect Radio Link Failure conditions. For example, the WTRU may determine uplink issues when time T310 or T312 is started or expires. The WTRU may determine uplink issues based on a configured number of consecutive out-of-synch or being in out-of-synch for N TTIs. The WTRU may determine uplink issued based on monitoring the downlink reference signals same or another cell from the uplink LPN node. For example, the WTRU may be performing measurements on reference signals (PSS/SSS, CRS, CSI-RS, DRS, etc.) originating from the LPN node that is also the WTRU's uplink LPN node. The WTRU may detect uplink issues if the measurements in downlink signals falls below a configured threshold. For example, a WTRU may determine uplink issues based on observed downlink signal errors. For example, if the DL BLER is less than, equal to or exceeds a configured threshold, the WTRU may determine uplink errors.

For example, the WTRU may determine uplink issues when the number of RLC retransmissions becomes equal or exceeds a threshold.

On (or following or in response to) detecting uplink issues, the WTRU may initiate radio link recovery procedure for the uplink. The WTRU may perform uplink cell selection, e.g., as described herein, to select the network node to re-establish LPN connection. For example, the WTRU may be configured with a set of LPN neighbor nodes, and may initiate RLF re-establishment procedure with another LPN node in the set.

The WTRU may transmit a new recovery message or modified RLF re-establishment message to the selected network node. This message may include at least one of the following parameters: cause of the failure, the identity of the downlink node associated with de-coupled operation, the identity of the previous uplink node associated with the de-coupled operation, etc.

If the re-establishment is successful, the WTRU may receive a new success message or modified RLF re-establishment success message from a (or the) network node.

If re-establishment is rejected, or the re-establishment response is not received within preconfigured duration, the WTRU may be configured to report to the downlink network node (e.g., the Macro eNB in decoupled scenarios discussed above). The WTRU may be configured to move to RRC_IDLE.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed:

1. A method performed by a wireless transmit/receive unit (WTRU), the method comprising:
    measuring downlink signals transmitted from a plurality of downlink cells;
    selecting a downlink cell from the plurality of downlink cells based on the measurements of the downlink signals;
    determining, based on a measurement of a downlink signal from the downlink cell, that the WTRU is associated with a limited coverage associated with the downlink cell;
    receiving a list from the downlink cell, wherein the list comprises one or more cells that are candidates for an uplink cell selection, wherein the candidates for the uplink cell selection comprise a cell that supports a decoupled mode, and wherein, in the decoupled mode, uplink data is sent via the cell that supports the decoupled mode, and downlink data is received via the downlink cell;
    based on the determination that the WTRU is associated with the limited coverage associated with the downlink cell,
        measuring at least one downlink signal transmitted from the one or more cells that are the candidates for the uplink cell selection,
        selecting the cell that supports the decoupled mode, wherein the selection of the cell is based on the measurement of the at least one downlink signal transmitted from the one or more cells that are the candidates for the uplink cell selection, and
        determining that the downlink cell supports the decoupled mode;
    and
    sending uplink data to the selected cell and receiving downlink data from the downlink cell, wherein the downlink cell and the selected cell are different.

2. The method of claim 1, wherein control information associated with the uplink data that is sent to the selected cell is used in the selected cell.

3. The method of claim 2, wherein the control information is received in a Physical Downlink Control Channel (PDCCH) transmission.

4. The method of claim 1, wherein control information associated with the uplink data that is sent to the selected cell is received via the downlink cell.

5. The method of claim 1, wherein at least one of a Physical Uplink Shared Channel (PUSCH) transmission, a Physical Hybrid Automatic Repeat Request Indicator Channel (PHICH) transmission, or a Physical Downlink Control Channel (PDCCH) transmission is sent using the selected cell.

6. The method of claim 1, wherein at least one of a Physical Downlink Shared Channel (PDSCH) transmission, a Physical Uplink Control Channel (PUCCH) transmission, or a Physical Downlink Control Channel (PDCCH) transmission is received using the downlink cell.

7. The method of claim 1, further comprising discovering a low power node (LPN) using a LPN list.

8. The method of claim 1, further comprising discovering a low power node (LPN) using a Physical Random Access Channel (PRACH) preamble.

9. The method of claim 1, further comprising sending hybrid automatic repeat request (HARQ) feedback to a low power node (LPN).

10. The method of claim 1, wherein the limited coverage associated with the downlink cell prevents the WTRU from sending an uplink transmission using the downlink cell.

11. A wireless transmit/receive unit (WTRU) comprising:
a processor configured to:
measure downlink signals transmitted from a plurality of downlink cells;
select a downlink cell from the plurality of downlink cells based on the measurements of the downlink signals;
determine, based on a measurement of a downlink signal from the downlink cell, that the WTRU is associated with a limited coverage associated with the downlink cell;
receive a list from the downlink cell, wherein the list comprises one or more cells that are candidates for an uplink cell selection, wherein the candidates for the uplink cell selection comprise a cell that supports a decoupled mode, and wherein, in the decoupled mode, uplink data is sent via the cell that supports the decoupled mode, and downlink data is received via the downlink cell;
based on the determination that the WTRU is associated with the limited coverage associated with the downlink cell,
measure at least one downlink signal transmitted from the one or more cells that are the candidates for the uplink cell selection,
select the cell that supports the decoupled mode, wherein the selection of the cell is based on the measurement of the at least one downlink signal transmitted from the one or more cells that are the candidates for the uplink cell selection, and,
determine that the downlink cell supports the decoupled mode;
and
send uplink data to the selected cell and receive downlink data from the downlink cell, wherein the downlink cell and the selected cell are different.

12. The WTRU of claim 11, wherein control information associated with the uplink data that is sent to the selected cell is used in the selected cell.

13. The WTRU of claim 12, wherein the control information is received in a Physical Downlink Control Channel (PDCCH) transmission.

14. The WTRU of claim 11, wherein control information associated with the uplink data that is sent to the selected cell is received via the downlink cell.

15. The WTRU of claim 11, wherein at least one of a Physical Uplink Shared Channel (PUSCH) transmission, a Physical Hybrid Automatic Repeat Request Indicator Channel (PHICH) transmission, or a Physical Downlink Control Channel (PDCCH) transmission is sent using the selected cell.

16. The WTRU of claim 11, wherein at least one of a Physical Downlink Shared Channel (PDSCH) transmission, a Physical Uplink Control Channel (PUCCH) transmission, or a Physical Downlink Control Channel (PDCCH) transmission is received using the downlink cell.

17. The WTRU of claim 11, wherein the processor is further configured to discover a low power node (LPN) using a LPN list.

18. The WTRU of claim 11, wherein the processor is further configured to discover a low power node (LPN) using a Physical Random Access Channel (PRACH) preamble.

19. The WTRU of claim 11, wherein the processor is further configured to send hybrid automatic repeat request (HARQ) feedback to a low power node (LPN).

20. The WTRU of claim 11, wherein the processor is configured to:
transmit a physical random access channel (PRACH) preamble to the selected cell; and
receive a random access response (RAR) message from the downlink cell.

21. The WTRU of claim 11, wherein the limited coverage associated with the downlink cell prevents the WTRU from sending an uplink transmission using the downlink cell.

* * * * *